(12) United States Patent
Krahn

(10) Patent No.: US 12,351,281 B2
(45) Date of Patent: Jul. 8, 2025

(54) MULTIPURPOSE SELECTIVE FISH CAPTURE SYSTEM

(71) Applicant: Peter Karlheinz Krahn, North Vancouver (CA)

(72) Inventor: Peter Karlheinz Krahn, North Vancouver (CA)

(*) Notice: Subject to any disclaimer, the term of this patent is extended or adjusted under 35 U.S.C. 154(b) by 167 days.

(21) Appl. No.: 17/921,944

(22) PCT Filed: Apr. 28, 2021

(86) PCT No.: PCT/CA2021/050589
§ 371 (c)(1),
(2) Date: Oct. 27, 2022

(87) PCT Pub. No.: WO2021/217260
PCT Pub. Date: Nov. 4, 2021

(65) Prior Publication Data
US 2024/0286717 A1    Aug. 29, 2024

Related U.S. Application Data

(60) Provisional application No. 63/018,468, filed on Apr. 30, 2020.

(51) Int. Cl.
*B63B 35/34* (2006.01)
*A01K 73/02* (2006.01)
(Continued)

(52) U.S. Cl.
CPC ............ *B63B 35/34* (2013.01); *A01K 73/025* (2013.01); *A01K 73/04* (2013.01); *A01K 73/063* (2022.02); *A01K 73/12* (2013.01);
*B63B 35/14* (2013.01); *B63B 35/32* (2013.01); *B63B 35/44* (2013.01); *B63B 2035/4453* (2013.01)

(58) Field of Classification Search
CPC ......... B63B 35/34; B63B 35/14; B63B 35/12; B63B 35/32; B63B 35/44
See application file for complete search history.

(56) References Cited

U.S. PATENT DOCUMENTS 3,656,623 A * 4/1972 Quase ................... E02B 15/046
                                                      210/242.3
5,030,363 A * 7/1991 Pole ...................... E02B 15/103
                                                      210/776
(Continued)

FOREIGN PATENT DOCUMENTS

CN           1655983 A  *  8/2005  ............. B63B 35/16
CN        107719593 A      2/2018
(Continued)

*Primary Examiner* — S. Joseph Morano
*Assistant Examiner* — Jovon E Hayes
(74) *Attorney, Agent, or Firm* — Seed IP Law Group LLP

(57) ABSTRACT

A multipurpose portable or transportable selective fish capture system and no touch transport system is described that comprises an interconverting pontoon platform which can be adapted to include a solar and/or hydro electrical energy collection, conversion, storage and distribution system and to convert between a selective fish capture system and no touch fish transport system and an for emergency response for search and rescue or oil spill response support and oil spill collection and oil transport system.

18 Claims, 55 Drawing Sheets

(51) Int. Cl.
  *A01K 73/04*    (2006.01)
  *A01K 73/12*    (2006.01)
  *B63B 35/14*    (2006.01)
  *B63B 35/32*    (2006.01)
  *B63B 35/44*    (2006.01)

(56) References Cited

U.S. PATENT DOCUMENTS

| | | | | |
|---|---|---|---|---|
| 5,173,182 | A | * | 12/1992 | Debellian ............ E02B 15/046 |
| | | | | 114/61.1 |
| 5,215,654 | A | * | 6/1993 | Karterman ............. B63B 35/32 |
| | | | | 210/255 |
| 2006/0065586 | A1 | * | 3/2006 | Walczyk ............... E02B 15/048 |
| | | | | 210/242.1 |
| 2010/0275833 | A1 | * | 11/2010 | Jarvinen ................ B63B 35/32 |
| | | | | 114/343 |
| 2021/0139113 | A1 | * | 5/2021 | Aguilera ............... E02B 15/104 |

FOREIGN PATENT DOCUMENTS

| | | | | |
|---|---|---|---|---|
| WO | WO-2017058098 A1 | * | 4/2017 | ............. B63B 35/00 |
| WO | WO-2018234601 A1 | * | 12/2018 | ............. A01D 44/00 |
| WO | WO-2021217260 A1 | * | 11/2021 | ........... A01K 73/025 |

* cited by examiner

MULTIPURPOSE SELECTIVE FISH CAPTURE SYSTEM

BACKGROUND

Technical Field

The present disclosure relates to the field of selective fish harvesting and, in particular, to a selective fish capture system that is portable and adaptable to multiple applications including renewable solar and hydro-electric power generation and storage, emergency search and rescue, and aquatic oil spill response support and oil spill collection from water bodies.

Description of the Related Art

Current commercial fishing gear and practices have had drastic and deleterious effects on aquatic ecosystems, including depletion of commercial stocks, reductions in fish average body size, loss of genetic diversity within a species, extirpation of species and changes in the species composition in an ecosystem. This has led to loss of potential food resources for humans and other fish dependent endangered species such as endangered southern resident killer whales, habitat degradation due to loss of nutrients and spawning area renewal, and closure of first nation, sport and commercial fishing resulting in the loss of employment in the fishing, tourism, fish processing and export industries creating negative economic impacts. As a result, efforts have been made by governments and the industry to research and develop policies and practices that focus on the goal of conserving and sustainably using marine resources.

The ability to fish selectively, avoiding capture or releasing unharmed non-target fish, invertebrates and marine mammals, is a fundamental component to achieving conservation and economic goals. Several harvesting techniques have been described and adapted for selective harvesting of fish. Most of these techniques have involved the adjustment or adaptation of existing fishing practices to the goal of selective harvesting. For example, time and area restrictions for fishing to avoid non-target species and stocks, adjustment of mesh size of nets to avoid trapping non-target fish, dip-netting fish from the water for sorting out non-target fish, and allowing species of concern to recuperate in revival tanks before release, are methods that have been applied to existing fishing practices.

In addition to modified fishing practices, improvement to fishing gear design is needed to effectively and economically fish selectively to minimize mortalities and maximize the chances for post release survival of bycatch, i.e., non-target fish, invertebrates, seabirds, and marine mammals.

Pound net traps have been used as a fish harvesting method originated by the indigenous peoples of North America centuries ago with little modification. A pound net trap is typically a fixed, semi-permanent, passive, stationary, type of fishing gear that is generally set close to shore and typically fished throughout a season. Pound nets consist of guidance/diversion net that leads fish into an enclosed impoundment net or "Pound Net". Pound nets are generally constructed using a series of posts or large pilings and attached netting extending from the high-water mark to the river or estuary bottom. Pound nets are set close to shore and a guidance or diversion net is set perpendicular or at an angle to the shore to guide migrating fish into the pound net. In operation, the guidance or diversion net interrupts the movement of target fish and directs the fish to an impoundment or into a heart-shaped enclosure that funnels fish into the pound net via the no return mesh tunnel. Fish harvested via pound nets are captured by concentrating the catch in one corner of the impoundment and removing the targeted fish with a dip net. The series of nets are anchored to the bottom perpendicular to shore and are set in nearshore areas, with depth often increasing toward the pound for the live-entrapment of the target fish.

In contrast to conventional commercial fishing gear which entangle the teeth and/or gills of all captured fish (resulting in physical damage and high rates of mortality), pound net traps passively corral fish into the pound thereby allowing harvesting of the fish with little to no air exposure or handling by fishermen. In spite of these advantages, pound net traps are generally difficult to use in deep waters, and are limited to use in calm shallow water and relatively soft bottom conditions. Pound net traps are also semi-permanent or permanent structures offering limited portability, cumbersome mobilization and setup, and requiring additional costly equipment, time, and human resources to deploy. Current designs of pound nets entail very large configurations of large diameter permanent pilings which can extend significant distances (100 meters) 330 ft plus into waterways. These structures are expensive to construct and have a larger environmental and navigable waterways impact and very limited locations where they can be installed.

For these reasons, pound net traps have found limited application beyond near shore small scale fishing. Therefore, there continues to be a need for selective fish capture systems that are adaptable to the environment, portable, scalable, and that offer versatility in application.

This background information is provided for the purpose of making known information believed by the applicant to be of possible relevance to the present disclosure. No admission is necessarily intended, nor should be construed, that any of the preceding information constitutes prior art against the present disclosure.

BRIEF SUMMARY

The present disclosure relates generally to a multipurpose selective fish capture system. In accordance with one aspect, the disclosure relates to an interconverting pontoon platform adapted to convert between a selective fish capture system and an oil spill response system, comprising:

a pair of opposing pontoon floats arranged in parallel and having an upper surface and a lower surface, the upper surface of each float configured to support a mounting riser extending the length of each float;

a support frame having an upper surface and a lower surface, the support frame comprising a series of parallel beams arranged transverse to the pair of opposing floats and mounted on the mounting risers, wherein the series of beams maintain the distance between each float to the other;

a rail assembly attached to the lower surface of the support frame, the rail assembly comprising a pair of curtain track I beams or C channels that each support a curtain track rail assembly containing a plurality of curtain track roller hooks, the curtain track I beams or C channels and curtain track rail assembly arranged in parallel to each other and extending the length of the interior facing side of each float to define a containment enclosure therebetween;

a deck mounted on the upper surface of the support frame, the deck sized to provide a working surface and comprising at least one access hatch centrally located on the deck to provide access to the containment enclosure below the deck, the access hatch having an end-facing side;

a retractable gate containing a release gate net positioned at the end-facing side of the access hatch, wherein the retractable gate extends below deck to close off one end of the containment enclosure when in the deployed position and the release gate net is retracted to a raised position to open the containment enclosure to allow release of its contents. The retractable gate is raised to a position above the deck or stored on the deck when it is not required;

at least one connector assembly attached to the underside of the deck at one or both ends of the deck, the connector assembly comprising a pair of inner curtain track beams and a pair of outer curtain track beams that each supports a curtain track rail assembly that contains a plurality of curtain track roller hooks, the inner curtain track beams are configured to have an apex that points towards the containment enclosure and the outer curtain track beams are configured to have an apex that points away from the containment enclosure;

The front connector assembly can be modified to attach to directional wing nets or beach seine nets or purse seine nets.

a series of net lift-line access hatches equally distributed along each opposing side of the platform, wherein the net lift-line access hatch comprises a corresponding cleat on or below the working surface of the deck; and at least one mounting bracket at one or both ends of the deck to receive a corresponding outboard motor.

In accordance with another aspect, the disclosure relates to a pontoon platform as described herein, converted to a selective fish capture system, and comprising:

a containment net suspended from the rail assembly to hang vertically below the deck to form opposing side walls and a bottom floor for the containment enclosure, the containment net extending the length of the platform from an entry end to an exit end wherein the interior volume of the containment enclosure gradually decreases at the exit end, and wherein the containment net is suspended at the entry end by the connector assembly on the underside of the deck to form a pair of entry panels that form a tapered V-shaped entry into the containment enclosure;

a plurality of removable containment net stabilization poles and brackets may be installed on opposing sides of the containment net to facilitate stability of the containment net during use in higher river current locations and a guidance net comprising a pair of wing nets, wherein each wing net is attached at a fixed end to the connector assembly to form a passage leading to the entry of the containment enclosure, and wherein each wing net has a terminal end that extends outwards from the entry of the containment enclosure to form a progressively widening configuration.

In one non-limiting embodiment, the containment net comprises:

a retraction line attached to the top of the containment net for removable attachment of the containment net to the curtain track roller hooks on the rail assembly and the connector assembly;

a plurality of spreader bars attached to the bottom of the containment net arranged in a parallel series to maintain the configuration of the bottom floor of the containment enclosure, wherein each spreader bar spans the width of the bottom floor of the containment enclosure defined by the rail assembly;

a pair of net lift-lines attached to opposing ends of each spreader bar and extending up to the working surface of the deck through the respective net lift-line access hatch; and a triangular spreader bar having dimensions that correspond to the connector assembly, the triangular spreader bar attached at the bottom of the containment net to the bottom ends of the entry panels to maintain the tapered V-shaped entry into the containment enclosure defined by the connector assembly.

In further non-limiting embodiments, each wing net comprises:

a plurality of floats attached along the length of the top of the wing net;

a triangular bottom net;

a weighted line attached along the length of the bottom of the wing net;

a support float at the top of the terminal end of each wing net; and a tow pole vertically attached to each terminal end of the wing net to which a tow line is attached at the upper end and the lower end of the tow pole to allow each wing net to be connected to a respective boat for setting and maintaining the progressively widening configuration of the guidance net.

In alternative embodiments, each wing net comprises:

a plurality of floats attached along the length of the top of the wing net;

a triangular bottom net;

a weighted line attached along the length of the bottom of the wing net;

a support float at the top of the terminal end of each wing net; and an anchor at the bottom of the terminal end of each wing net for setting and maintaining the progressively widening configuration of the guidance net.

In further embodiments, each wing net comprises:

a plurality of floats attached along the length of the top of the wing net;

a weighted line attached along the length of the bottom of the wing net; and a plurality of posts vertically attached along the length of each wing net for temporarily fixing the wing net in place at a site and for setting and maintaining the progressively widening configuration of the guidance net.

In further non-limiting embodiments, the plurality of posts comprises:

a slide hammer having a longitudinal bore through which the post is received, the slide hammer being slidable along a length of the post;

a detachable lift cable attached to the slide hammer to permit lifting of the slide hammer along at least a portion of the length of the post;

a percussion plate affixed to the post at or near a first end thereof and configured to receive percussive driving force from the slide hammer;

an anchor tip adapted to connect to the first end of the post below the percussion plate, wherein the anchor tip can be driven into the ground to a depth that does not exceed the percussion plate; and a suspension cap adapted to connect to a second end of the post for raising and lowering the post when in use.

In accordance with another aspect, the disclosure relates to an equipment storage system which provides secure storage of components to lower the center of gravity and reduce the risk of instability due to load shifting consisting of a lower portion for fuel storage, storage of fence and pole attachments, and an upper portion for the storage of poles and oil containment booms and a roller mechanism to facilitate the deployment of oil containment booms.

In accordance with another aspect, the disclosure relates to a pontoon platform as described herein, converted to an emergency search and rescue platform and oil spill response system, and comprising:

a pair of oil containment booms suspended from the rail assembly to hang vertically below the deck to form opposing side walls for the containment enclosure, the containment booms extending the length of the platform from an entry end to a rear end and across the rear end back to the entry end, and wherein the rear end of the containment enclosure is further supported by the deployed retractable gate;

a pair of oil collection booms, wherein each oil collection boom is attached at a fixed end to the connector assembly to form a widening V-formation that leads to the entry of the containment enclosure, and wherein each oil collection boom has a terminal end that extends outwards from the entry of the containment enclosure to form a progressively widening configuration; and a tow line attached at the terminal end of each oil collection boom adapted for connection to a respective tow boat for setting and maintaining the progressively widening configuration.

In one non-limiting embodiment, the oil spill response system further comprises:

an oil skimmer positioned in the access hatch to remove oil/water emulsion collected in the containment enclosure; and an oil/water emulsion holding tank on the deck, the oil holding tank in fluid connection with the oil skimmer to collect the oil removed by the oil skimmer.

According to a further aspect, the interconverting pontoon platform can be further adapted to include renewable solar-electric and hydro-electric energy generation, the interconverting pontoon platform comprising:

a pair of opposing pontoon floats arranged in parallel and having an upper surface and a lower surface, the upper surface of each float configured to support a mounting riser extending the length of each float;

a support frame having an upper surface and a lower surface, the support frame comprising a series of parallel beams arranged transverse to the pair of opposing floats and mounted on the mounting risers, wherein the series of transverse beams maintain the distance between each float to the other;

a connector assembly attached at one end or both ends of the support frame comprising a central support beam that provides the base for an inward facing triangular beam structure and an outward facing triangular beam structure. The inward facing triangular beam structure having an underlying curtain track assembly that contains a plurality of curtain track roller hooks forming a support for a V-shaped entry into a fish containment net. The outward facing triangular beam structure having an underlying curtain track assembly that contains a plurality of curtain track roller hooks forming a connection to a guidance net or wing net. The connector assembly supports the contiguous interface between the guidance net or wing net and the containment net which forms the impoundment. The connector assembly also similarly provides support for and connection between an oil collection boom and the oil containment boom.

an I beam rail or C channel assembly attached to the lower surface of the support frame, the rail assembly comprising a pair of I beams or C channels that support a pair of curtain track rail assemblies that support a plurality of curtain track roller hooks, the curtain track I beams or C channels arranged in parallel to each other and extending the length of the interior facing side of each float up to and including the connector assemblies to define a containment enclosure therebetween;

a deck mounted on the upper surface of the support frame, the deck sized to provide a working surface and comprising at least one access hatch centrally located on the deck to provide access to the containment enclosure below the deck, the access port having an end-facing side;

a removable retractable release gate with a raisable release gate net positioned in a release gate hatch at the end-facing side of the access port, wherein the removable retractable release gate extends below deck to close off one end of the containment enclosure when in the deployed position and the release gate net is lowered and engaged in brackets at the bottom of the release gate. The release gate net can be raised to open the containment enclosure to allow release of captured non-harvestable fish. The removable retractable release gate can be removed to accommodate the other functions of the pontoon platform, namely deployment of the oil spill containment boom or for transport of the pontoon platform to and from fishing and/or oil spill containment locations. In some configurations the raisable release gate net can be replaced with a fixed vinyl curtain to provide end support to the oil containment boom;

a series of net lift-line access hatches equally distributed along the length of the pontoon platform located directly above the I beam or C channel located on each opposing side of the center access hatch, wherein the net lift-line access hatches comprise a corresponding cleat on or below the working surface of the deck; and at least one mounting bracket at one or both ends of the deck or the ends of the supporting pontoon to receive a corresponding outboard motor.

In accordance with another aspect, the disclosure relates to a pontoon platform as described herein, converted to a selective fish capture system, and comprising:

a containment net suspended from the I beam or C channel rail assembly and curtain track rail assembly to hang vertically below the deck to form opposing side walls and a bottom floor for the containment enclosure, the containment net extending the length of the pontoon platform from an entry end to an exit end wherein the interior volume of the containment enclosure remains constant to the exit end, and wherein the containment net is suspended at the entry end by the connector assembly on the end of the support frame under the deck to form a pair of entry panels that form a tapered V-shaped entry into the containment enclosure; and a stationary or mobile wing net fish guidance system in multiple configurations attached at a fixed end to the connector assembly to form a passage leading to the entry of the containment enclosure, and wherein each wing net has a terminal end that extends outwards from the entry of the containment enclosure to form a progressively widening configuration.

In one non-limiting embodiment, the containment net comprises:
- a retraction line attached to the top of the containment net for removable attachment of the containment net to the curtain track roller hooks on the I beam or C channel rail assembly and the connector assembly;
- a single triangular spreader bar attached to the bottom interior entrance of the containment net arranged to maintain the V-shaped entry configuration of the side entry panels and bottom floor of the containment enclosure, wherein the triangular spreader bar spans the width of the bottom floor of the containment enclosure and just less than the width defined by the I beam or C channel rail assembly. The triangular spreader bar functioning as the support when the V-shaped entry is open to receive fish and as the closure gate to the entrance of the containment net when it is lifted using the net lift lines attached to each end of the triangle base bar;
- a plurality of linear spreader bars attached to the bottom interior of the containment net arranged in a parallel series to maintain the configuration of the bottom floor of the containment enclosure, wherein each spreader bar spans the width of the bottom floor of the containment enclosure and just less than the width defined by the I beam or C channel rail assembly;
- a pair of net lift-lines attached to opposing ends of the base bar of the triangular spreader bar and at the opposing ends of each spreader bar and extending up to the working surface of the deck through the respective net lift-line access hatch; and
- the volume of the containment enclosure being decreased from the rear to the front when the triangular spreader bar is lifted to close off the containment net followed by sequential lifting of the linear spreader bars from the back to the front of the containment enclosure.

In further non-limiting embodiments, each mobile wing net towed in deep water comprises:
- a plurality of floats attached along the length of the top of the wing net;
- a weighted line attached along the length of the bottom of the wing net;
- additional weights which may be added to the bottom of the wing net;
- a support float at the top of the terminal end of each wing net; and
- a tow pole vertically attached to each terminal end of the wing net to which a tow line is attached at the upper end and the lower end of the tow pole to allow each wing net to be connected to a respective tow boat for setting and maintaining the progressively widening configuration of the guidance net.

In further non-limiting embodiments, each mobile wing net towed in deep water comprises:
- a plurality of floats attached along the length of the top of the wing net;
- a triangular bottom net at the converging end of the wing nets;
- a weighted line attached along the length of the bottom of the wing net;
- additional weights which may be added to the bottom of the wing net;
- a support float at the top of the terminal end of each wing net; and
- a tow pole vertically attached to each terminal end of the wing net to which a tow line is attached at the upper end and the lower end of the tow pole to allow each wing net to be connected to a respective tow boat for setting and maintaining the progressively widening configuration of the guidance net.

In alternative embodiments, each wing net fixed in deep water comprises:
- a plurality of floats attached along the length of the top of the wing net;
- a weighted line attached along the length of the bottom of the wing net;
- additional weights which may be added to the bottom of the wing net;
- a support float at the top of the terminal end of each wing net; and
- an anchor at the bottom of the terminal end of each wing net for setting and maintaining the progressively widening configuration of the guidance net.

In alternative embodiments, each wing net fixed in deep water comprises:
- a plurality of floats attached along the length of the top of the wing net;
- a triangular bottom net at the converging end of the wing nets;
- a weighted line attached along the length of the bottom of the wing net;
- additional weights which may be added to the bottom of the wing net;
- a support float at the top of the terminal end of each wing net; and
- an anchor at the bottom of the terminal end of each wing net for setting and maintaining the progressively widening configuration of the guidance net.

In further embodiments, each wing net fixed in shallow water comprises:
- a plurality of floats attached along the length of the top of the wing net;
- a weighted line attached along the length of the bottom of the wing net;
- additional weights which may be added to the bottom of the wing net; and
- a plurality of posts vertically attached along the length of each wing net for temporarily fixing the wing net in place at a site and for setting and maintaining the progressively widening configuration of the guidance net.

In further non-limiting embodiments, the plurality of posts which comprises:
- a removable suspension cap having a loop at its top end and a threaded connector at its bottom end. The loop at its top end to facilitate the attachment of a suspension line with a detachable connector for suspending a post for insertion or extraction from the substrate of a water body or attachment of a net suspension snubber with dual detachable connectors for suspension of a wing net or a heart shaped net. The threaded connection of the suspension cap at its bottom end into which the threaded top end of a post can be mated for the purpose of suspending a post for insertion or extraction from the substrate of a water body or maintaining the post connected to a wing net or a heart shaped net;
- a post with a threaded top end and a threaded bottom end;
- a removable slide hammer having an attachment for connecting a detachable lift cable to its outer circumference and a concentric longitudinal bore through which the post is received, the slide hammer being slidable along a length of the post. The slide hammer when lifted with a detachable lift cable and then released imparts a downward shock force onto a percussion plate for insertion of the post and detachable tip into the substrate of the water body. The slide hammer when lifted with a detachable lift cable and then striking the removable cap imparts an upward shock force onto the cap to facilitate extraction of the post and the detachable tip from the water substrate;

a detachable lift cable attached to the attachment on the outer circumference of the slide hammer to permit lifting and releasing in downward free fall of the slide hammer along at least a portion of the length of the post to insert the post into the substrate of the water body or in an upward motion to extract the post from the substrate of the water body;

a percussion plate which has a concentric threaded coupling fixed flush with its upper surface and into which the top end of the threaded coupling can receive the threaded bottom end of the post and the bottom end of the threaded coupling can receive the threaded top end of an anchor tip; and an anchor tip adapted at its top end to connect to the threaded bottom end of the coupling below the percussion plate and adapted at its bottom end to form a sharp point, wherein when a shock force is applied to the top of the percussion plate by the slide hammer, the anchor tip can be driven into the ground to a depth that does not exceed the percussion plate.

In accordance with another aspect, the disclosure relates to a pontoon platform as described herein, converted to an oil spill response system, and comprising:

a pair of oil containment booms suspended from the I beam or C channel rail assembly consisting of a pair of underlying curtain rail tracks and a plurality of curtain track roller hooks to hang vertically below the deck to form opposing side walls and end wall for the oil containment enclosure, the containment booms extending the length of the pontoon platform from an entry end to a rear end, across the rear end and back to the entry end, wherein the rear end of the oil containment boom is further supported by the deployed retractable and removable gate which has a vinyl film across it;

a pair of oil collection booms, wherein each oil collection boom is attached at a fixed end to the connector assembly to form a widening V-formation that leads to the entry of the containment enclosure, and wherein each oil collection boom has a terminal end that extends outwards from the entry of the containment enclosure to form a progressively widening configuration; and a tow line attached at the terminal end of each oil collection boom adapted for connection to a respective tow boat for setting and maintaining the progressively widening configuration.

In one non-limiting embodiment, the oil spill response system further comprises:

a retractable ramp for all terrain vehicle access to facilitate emergency search and rescue and an oil skimmer positioned in the center rear access hatch of the pontoon platform to remove oil collected in the oil containment enclosure; and an oil holding tank on the deck, the oil holding tank in fluid connection with the oil skimmer to collect the oil/water emulsion removed by the oil skimmer. The oil holding tank may be fixed to the pontoon platform or be removable by crane and/or helicopter.

In accordance with another aspect, the disclosure relates to a pontoon platform as described herein, adapted to include a solar-electric energy to electrical energy conversion, storage and distribution system, and comprising:

a frame mounted canopy system which extends partially or fully over the surface of the pontoon platform;

a series of solar-electric energy collection panels mounted on the outer surface of the mounted canopy system on the pontoon platform;

a series of solar-electric energy collection panels mounted on the interior and extractable to the exterior fence of the pontoon platform;

a series of solar-electric energy conversion controllers;

a series of storage batteries for storage of direct electrical current (DC); and a series of electrical converters capable of converting stored DC electrical energy into AC electrical energy for transmission to a shore based electrical system.

In accordance with another aspect, the disclosure relates to a pontoon platform as described herein, adapted to include a hydro energy to electrical energy conversion system, and comprising:

an articulating bracket mounted on the front or on the sides of the pontoon platform;

a series of rotating hydro-electric turbines attached to the articulating mounted bracket and capable of converting rotating motion into alternating current (AC) electrical energy;

a series of electrical converters capable of converting AC electrical energy into stored electrical battery energy;

a series of electrical storage batteries for direct electrical current (DC) storage; and a series of electrical converters capable of converting stored DC electrical energy into AC electrical energy for transmission to a shore based electrical system.

BRIEF DESCRIPTION OF THE SEVERAL VIEWS OF THE DRAWINGS

These and other features of the disclosure will become more apparent in the following detailed description in which reference is made to the appended drawings.

FIG. 52 also provides a top view of the containment net with modified front panels to accommodate the increased length of the front connector extension bar. FIG. 52 also has a side cross section perspective of the terminal end of the front connector extension bar with a slidable or fixable post. The stabilization posts may be in pairs when used with beach seine nets or purse seine nets according to embodiments of the present disclosure.

DETAILED DESCRIPTION

Figure 1:
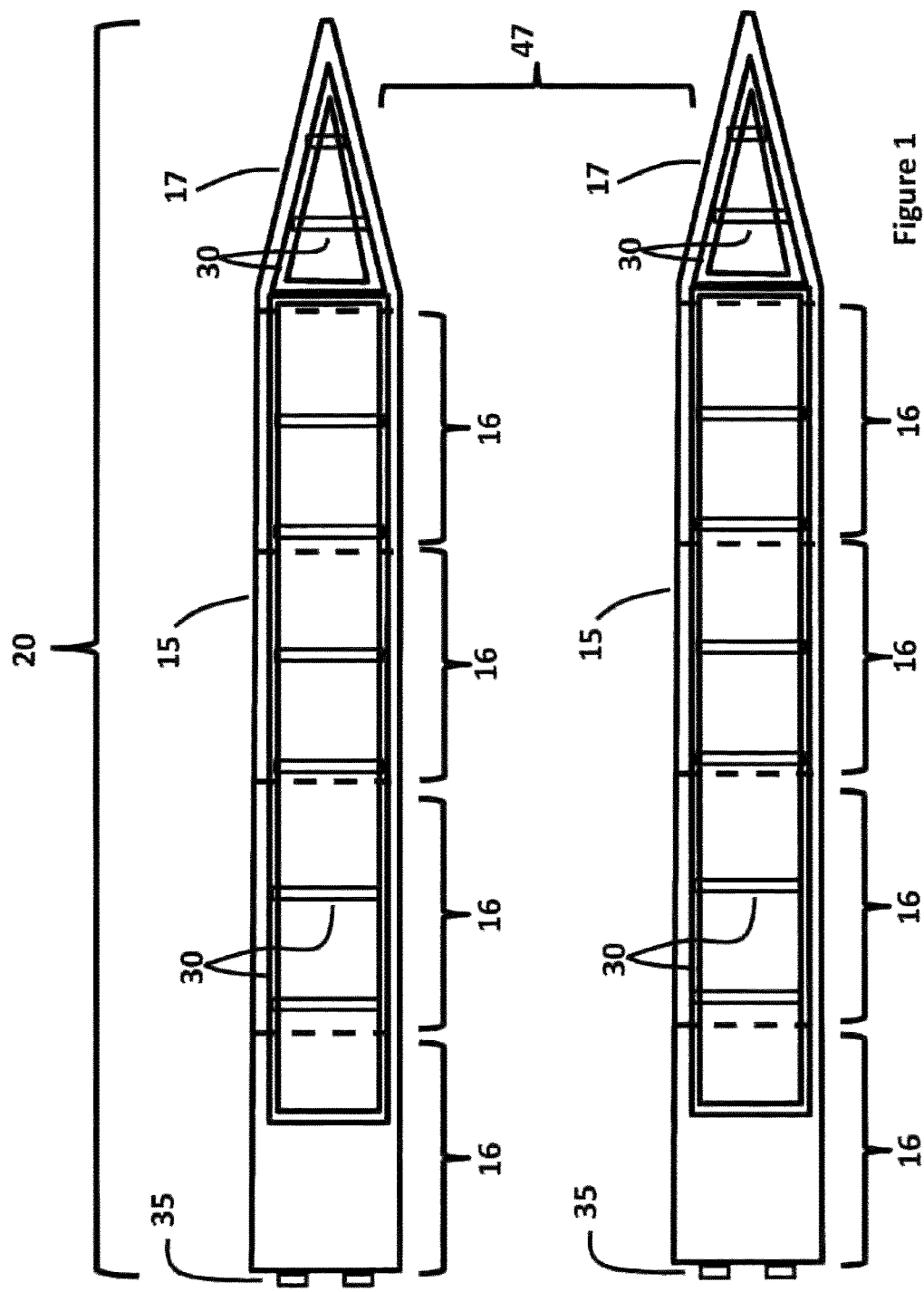
FIG. 1 is a schematic diagram of the top of parallel pontoons according to an embodiment of the present disclosure.

A multipurpose selective fish capture system is disclosed herein that is particularly suited for selective harvesting of fish populations in a range of conditions. In contrast to prior art systems which are fixed in place at a single location and not capable of mobile deployment, the selective fish capture system of the present disclosure is designed for versatility and mobility. The system is not limited to a single fixed-form installation but can be deployed in a multitude of fixed or mobile formats to adapt to changes in fishing needs and environmental conditions or convert to co-generate renewable solar or hydro-electric energy or perform oil spill support or oil spill response capabilities. According to certain embodiments, the system can be installed as a fixed installation with fencing and float supported wing nets in shallow near-shore applications or anchored with float only supported wing nets in deeper off-shore environments. According to other embodiments, the system can be adapted for use as an unanchored float only supported wing nets selective fish capture system that is designed to allow mobility during operation in a drifted fishing format. Mobile embodiments of the system allow unrestricted positioning of the system to desired locations, for example to locations where targeted fish are migrating or in accordance with unpredictable water conditions typical in open water environments. In this way, the system is not limited to use in shallow near-shore applications but can be utilized in deeper waters in fixed or drift fishing techniques in accordance with fish migration patterns or environmental conditions.

The selective fish capture system of the present disclosure is a self-contained system designed for simplified deployment of a temporary, removable, and adjustable fish capture system. The self-contained design of the system further allows it to be portable, for example using a trailer system, and easy to assemble and disassemble for storage, relocation, or reconfiguration. The self-contained design of the system comprises an interconverting pontoon platform that is adapted to convert the system for its multiple applications. The pontoon platform provides a support structure that is adapted to support a net capture system from either end (front or rear) of the pontoon platform. In this way, the system can be readily converted to its multiple configurations that may require the system to operate from the bow end or the stern end.

According to certain embodiments of the present disclosure, the pontoon platform is converted to a selective fish capture system. The selective fish capture system generally comprises a net system that includes a retractable containment net detachably suspended from a support frame on the underside of the pontoon platform deck to form a containment enclosure having a tapered V-shaped entry that is operably connected to a guidance net. The guidance net can be arranged in a variety of desired configurations to effectively direct fish through the tapered entry into the containment enclosure resulting in the live entrapment of the fish. On entering the containment enclosure, the fish are entrapped where they can be sorted, sampled, selectively harvested, or released, with minimal to no human contact. Upon extraction of the fish from the containment enclosure generally using a dip net, the fish can be placed in a fish lift system comprising a circular or cubical waterproof basket supported by an external detached frame. The basket containing water and the fish can be lifted and transported by crane or most commonly by helicopter over longer distances for release into the same or different water body.

The net system, according to embodiments of the present disclosure, does not rely on pilings or other permanent ecologically unfriendly structures for deployment at a target site. The containment net is fully supported by the pontoon platform and the guidance net can be configured in a variety of arrangements with a minimal number of pilings or completely without the use of any such pilings or permanent structures. The absence of permanent pilings also reduces the conflict with navigable waters requirements as structures are either not permanently fixed or are operated in a moveable format. In this way, the selective fish capture system can be configured with relatively minimal restriction and very limited if any environmental impact to the habitat. According to stationary embodiments of the present disclosure, the net system can be temporarily anchored into a desired position. According to certain stationary embodiments, the guidance net can be positioned using a plurality of posts to which the guidance net is attached so that the net extends from the shoreline or shallow areas near the shore to progressively deeper water. The posts, according to certain embodiments, comprise a manually operated percussive driving apparatus for installing the posts into position. In this way, the posts can be installed without the need for cumbersome equipment such as electrical or carbon base fuel generators or air compressors and with minimal environmental impact. The same manual percussive driving apparatus can be operated in reverse for extracting the posts in an efficient manner which allows adaptability and economical net location/relocation and installation design. This all-in-one design of the posts allow the posts to be installed in a desired location in a range of water bed conditions while also providing unrestricted freedom to arrange the posts in any desired configuration. The posts further allow the temporary placement of the guidance net which can be removed with relative ease as needed. In this way, the configuration of the guidance net can be set up in any desired shallow location and quickly adjusted with minimal ecological impact and a significantly lower labor cost than other systems. The selective fish capture system is further adaptable to being moveable without the net system being fixed by posts. In such embodiments, the guidance net and the pontoon platform is adapted to be held in position in deeper water utilizing temporary anchors. According to further embodiments, the system can be deployed without the use of anchoring means to allow the selective fish capture system to freely drift with the current and/or be towed through waters to effectively intercept moving fish and direct them to the capture enclosure.

The interconvertible design of the pontoon platform allows it to be adapted to applications that complement the fish capture function. According to certain embodiments, the fish capture system can be customized to the environmental need. The pontoon platform provides ample working deck space to accommodate customization of the pontoon platform with specialized equipment allowing the system to be used for a variety of purposes including, without limitation, performing research sampling on captured fish, and to generate renewable electrical energy by either solar collectors or small hydro-electric turbines or both or to respond to environmental events like oil spills.

According to certain embodiments, the solar collectors can be mounted on the safety fences on the sides of the pontoon platform and/or on the top of a canopy while the net system is in place in the stationary or mobile formats.

In certain embodiments, the small hydro-electric turbines can be mounted on articulating brackets at the side or the ends of the pontoon platform and lowered facing into the current of the water body while the net system is in place in the stationary formats.

According to certain embodiments, the pontoon platform is convertible to an oil spill response support and oil collection system by replacing the net system with oil collection and containment booms. In this way, the fish capture system can be readily adapted to an oil spill response system.

According to certain embodiments, the pontoon platform may have a containment net release gate that is released by removal of quick release pins or quick release kick plates.

According to certain embodiments, the pontoon platform may have a plurality of removable containment net stabilization posts inserted into slidable brackets to allow the containment net to operate in higher river currents.

According to certain embodiments, the pontoon platform may have an extended containment net and a pair of front connector extension bars which allow the platform to be used in conjunction with beach seine nets or purse seine nets.

According to certain embodiments, the pontoon platform may have an equipment storage system that allows fuel storage, and the secure storage of fence components, posts and oil spill containment booms which are fixed in place with fitted shelves or tiedown posts and tiedown straps to provide a balanced and secure weight load distribution on the platform.

Definitions

Unless defined otherwise, all technical and scientific terms used herein have the same meaning as commonly understood by one of ordinary skill in the art to which this disclosure belongs.

As used herein, the term "about" refers to an approximately +/−10% variation from a given value. It is to be understood that such a variation is always included in any given value provided herein, whether or not it is specifically referred to.

The term "plurality" as used herein means more than one, for example, two or more, three or more, four or more, and the like.

The use of the word "a" or "an" when used herein in conjunction with the term "comprising" may mean "one," but it is also consistent with the meaning of "one or more," "at least one," and "one or more than one."

As used herein, the terms "comprising," "having," "including," and "containing," and grammatical variations thereof, are inclusive or open-ended and do not exclude additional, unrecited elements and/or method steps. The term "consisting essentially of" when used herein in connection with an apparatus, system, composition, use or method, denotes that additional elements and/or method steps may be present, but that these additions do not materially affect the manner in which the recited apparatus, system composition, method or use functions. The term "consisting of" when used herein in connection with an apparatus, system, composition, use or method, excludes the presence of additional elements and/or method steps. An apparatus, system composition, use or method described herein as comprising certain elements and/or steps may also, in certain embodiments consist essentially of those elements and/or steps, and in other embodiments consist of those elements and/or steps, whether or not these embodiments are specifically referred to.

Interconverting Pontoon Platform

Figure 2:
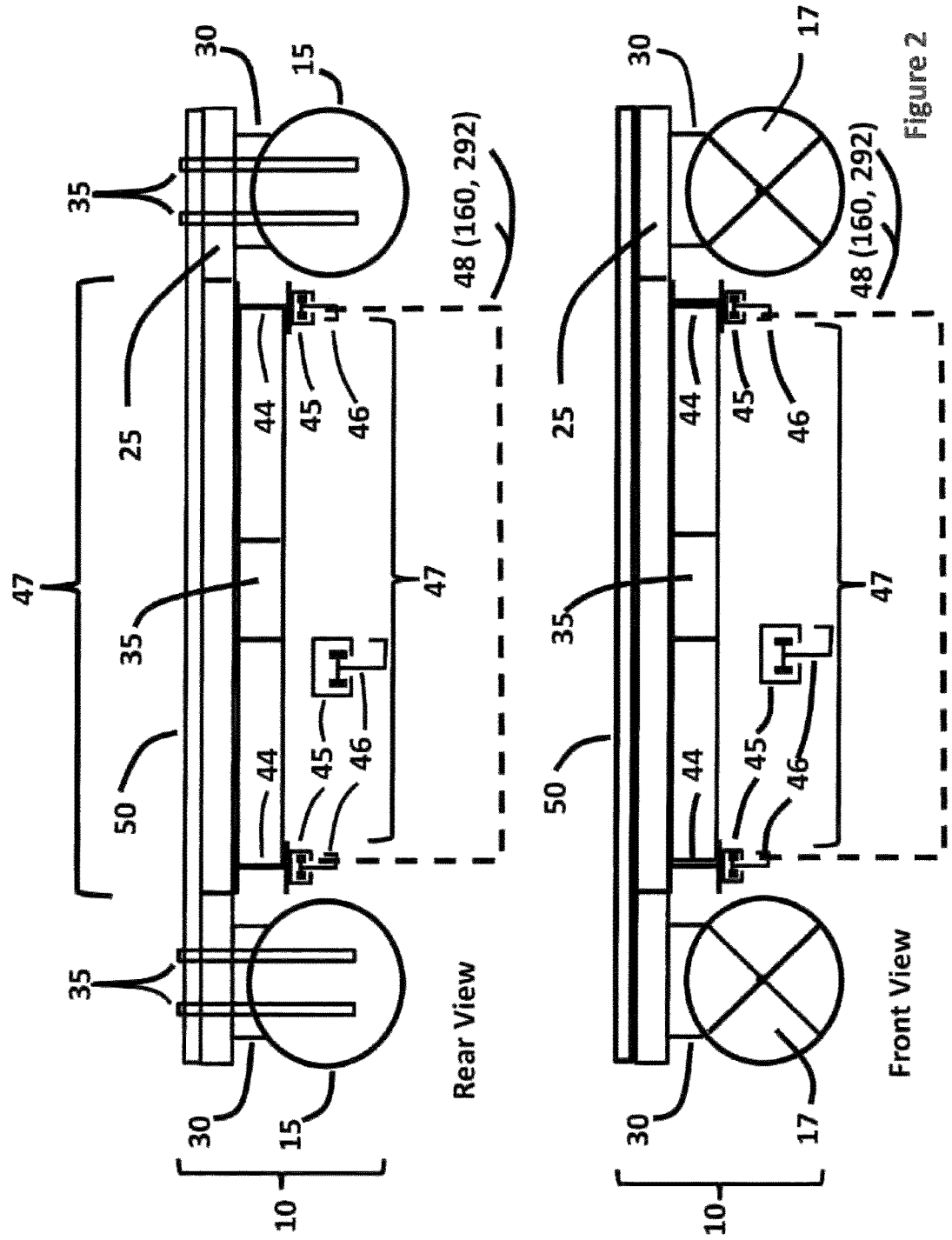
FIG. 2 is a schematic diagram of the front end and rear end views of the pontoon platform according to an embodiment of the present disclosure.
Figure 3:
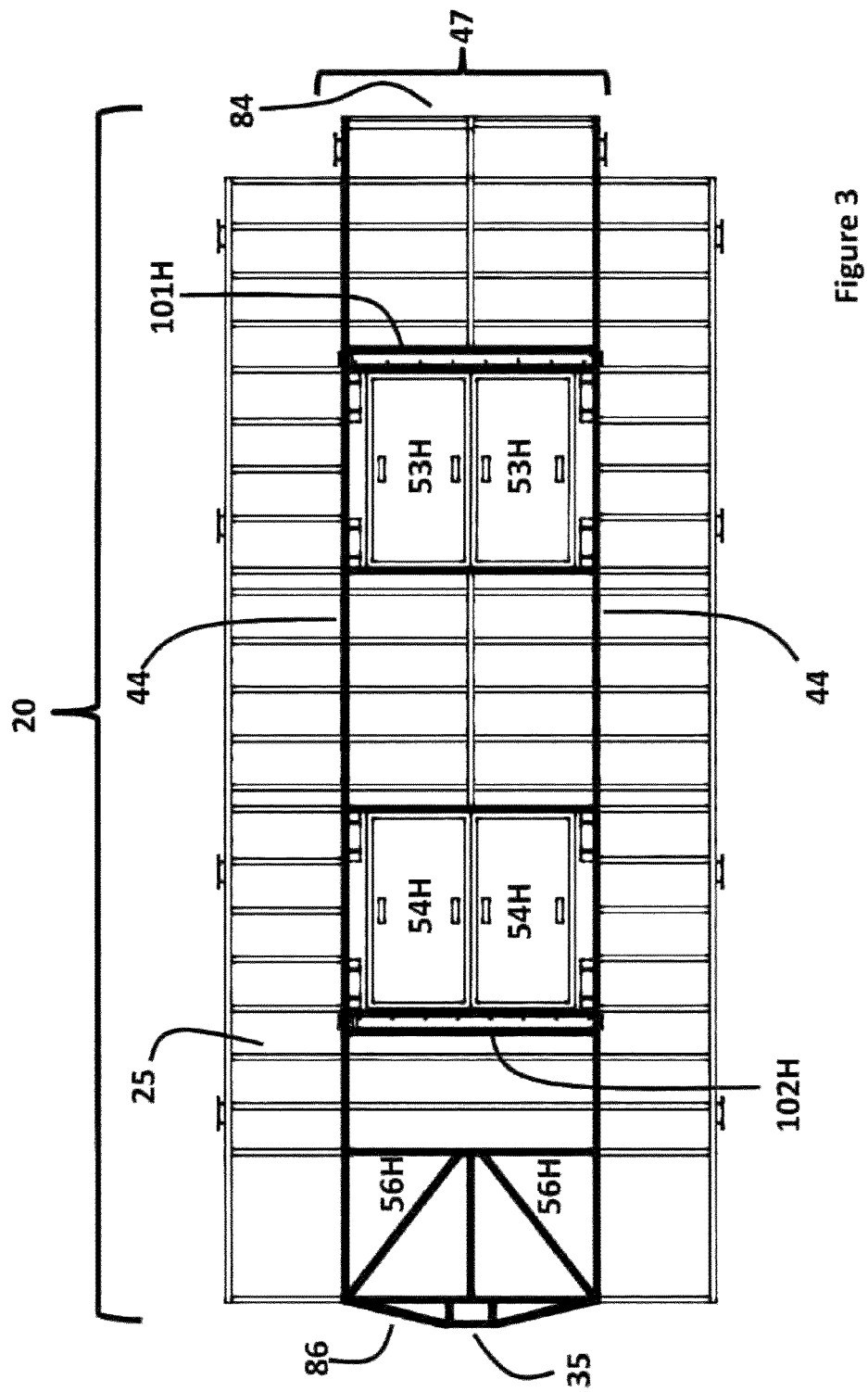
FIG. 3 is a schematic diagram of the top of an interconverting pontoon platform frame with a single connector assembly at the rear end of the pontoon platform according to an embodiment of the present disclosure.
Figure 4:
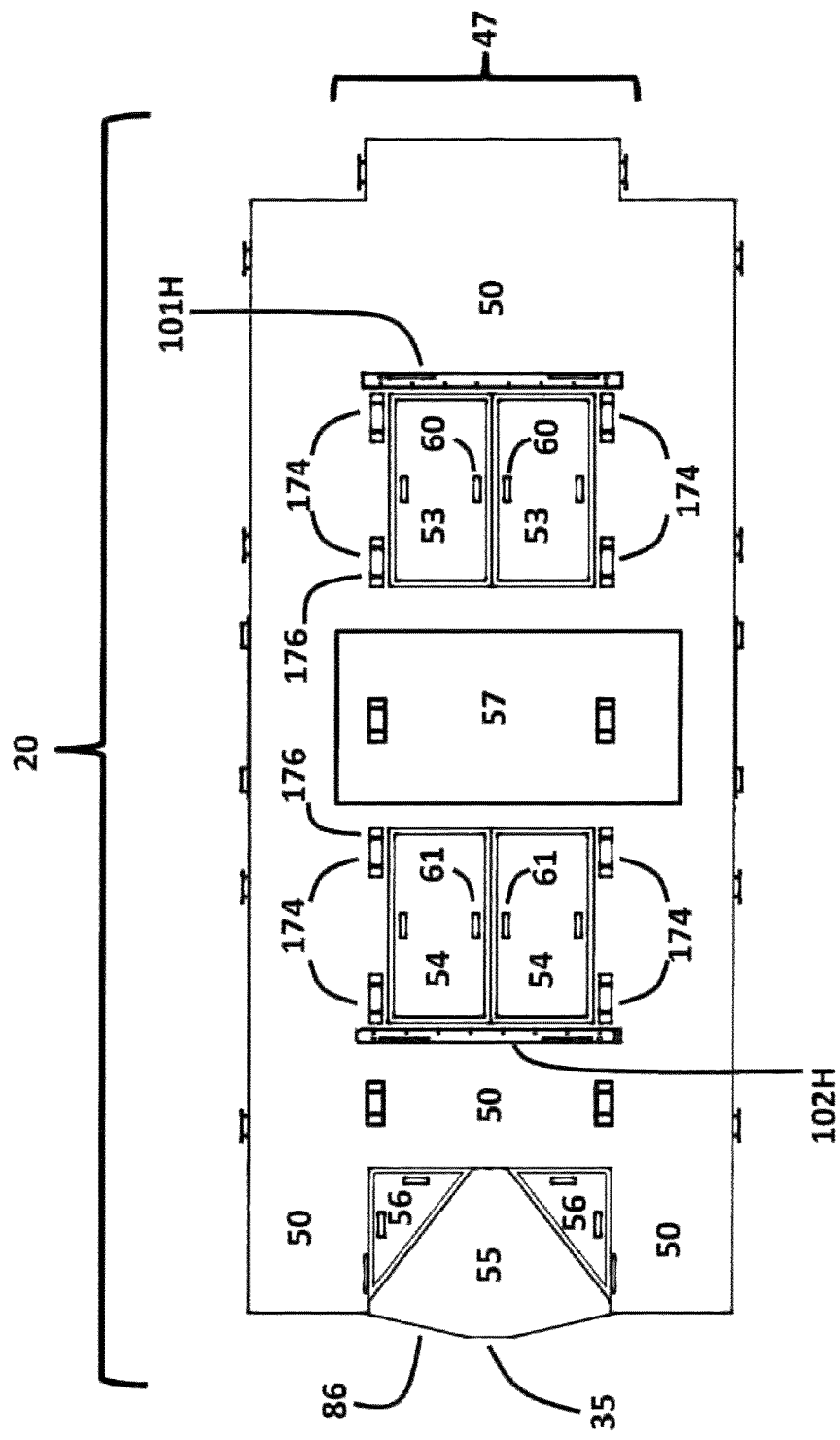
FIG. 4 is a schematic diagram of the top of the interconverting pontoon platform shown in FIG. 3 with a deck plate supported by the frame.
Figure 5:
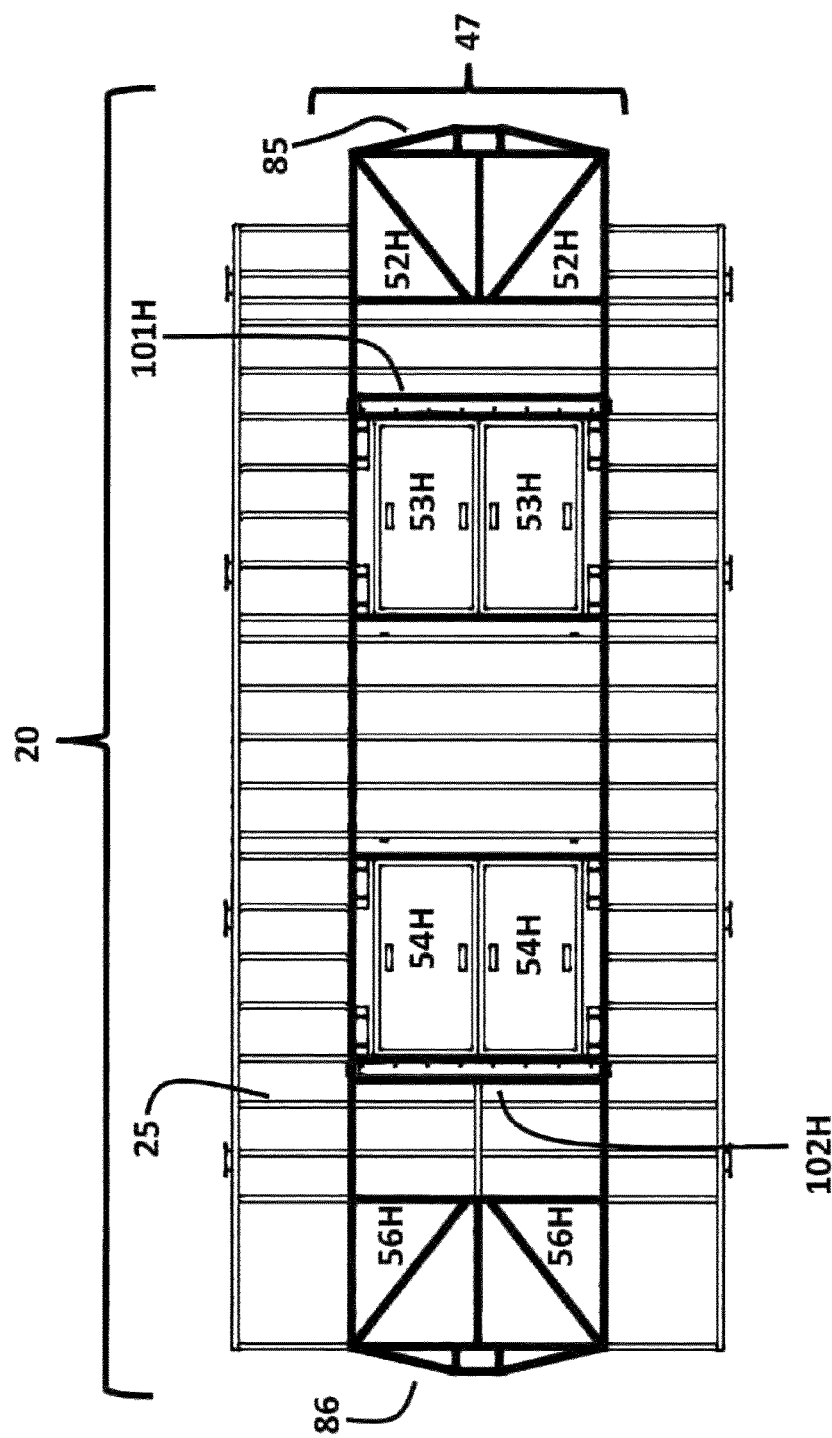
FIG. 5 is a schematic diagram of the top of an interconverting pontoon platform frame with a connector assembly at each end according to an embodiment of the present disclosure.
Figure 6:
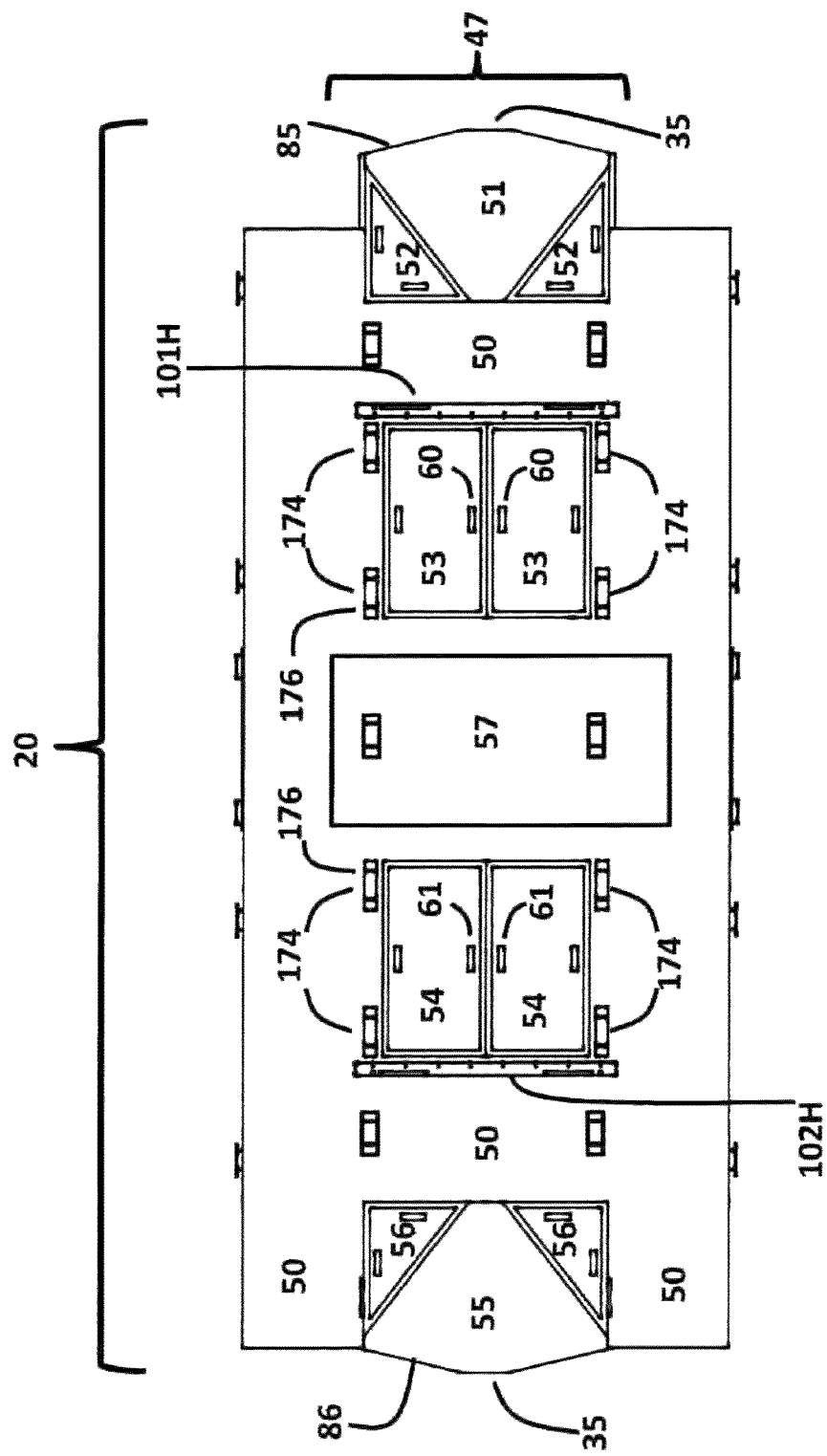
FIG. 6 is a schematic diagram of the top of the interconverting pontoon platform shown in FIG. 5 with a deck plate supported by the frame.

The pontoon platform provides the interconverting support structure for the multiple configurations of the selective fish capture system disclosed herein. In one embodiment FIG. 1 illustrates the pontoon floats 15 and the mounting risers 30 and the sealed internal sections 16 of the pontoon floats 15. FIG. 2 illustrates the front view and the rear view of the pontoon platform 10. FIG. 3 illustrates the support frame of a single directional pontoon platform main deck plate 50 with a rear connector assembly 86. In the same embodiment, FIG. 4 illustrates the pontoon platform main deck plate 50 with a rear connector assembly 86 of the present disclosure. In another embodiment FIG. 5 illustrates the support frame of a dual directional pontoon platform main deck in plate 50 with a front 85 and rear 86 connector assembly. In the same embodiment, FIG. 6 illustrates the pontoon platform main deck plate 50 with a front 85 and rear connector assembly 86 of the present disclosure.

Referring to FIGS. 1, and 2 the pontoon platform 10 comprises a pair of opposing pontoon floats 15 that are arranged in parallel which each support a mounting riser 30, each pontoon float supporting a transverse series of parallel beams 25 which in turn support a main deck plate 50. The opposing pontoon floats 15, according to certain embodiments, range in length from 12' to 30' (3.7 m to 9.1 m), or in certain embodiments can be longer, and in diameter from 20" to 30" (0.5 m to 0.76 m), or in certain embodiments can be larger. As shown in FIGS. 1 and 2, the float 15 typically includes a nose cone 17 at the bow of the pontoon platform 10, suitable for the required buoyancy of the pontoon platform and, according to embodiments, has a length of up to 5' (1.5 m). The pontoon float 15 typically includes sealed internal sections 16 which, according to embodiments of the disclosure, are set every 4' (1.2 m) to 5' (1.5 m) of the length of the pontoon float 15.

Figure 7:
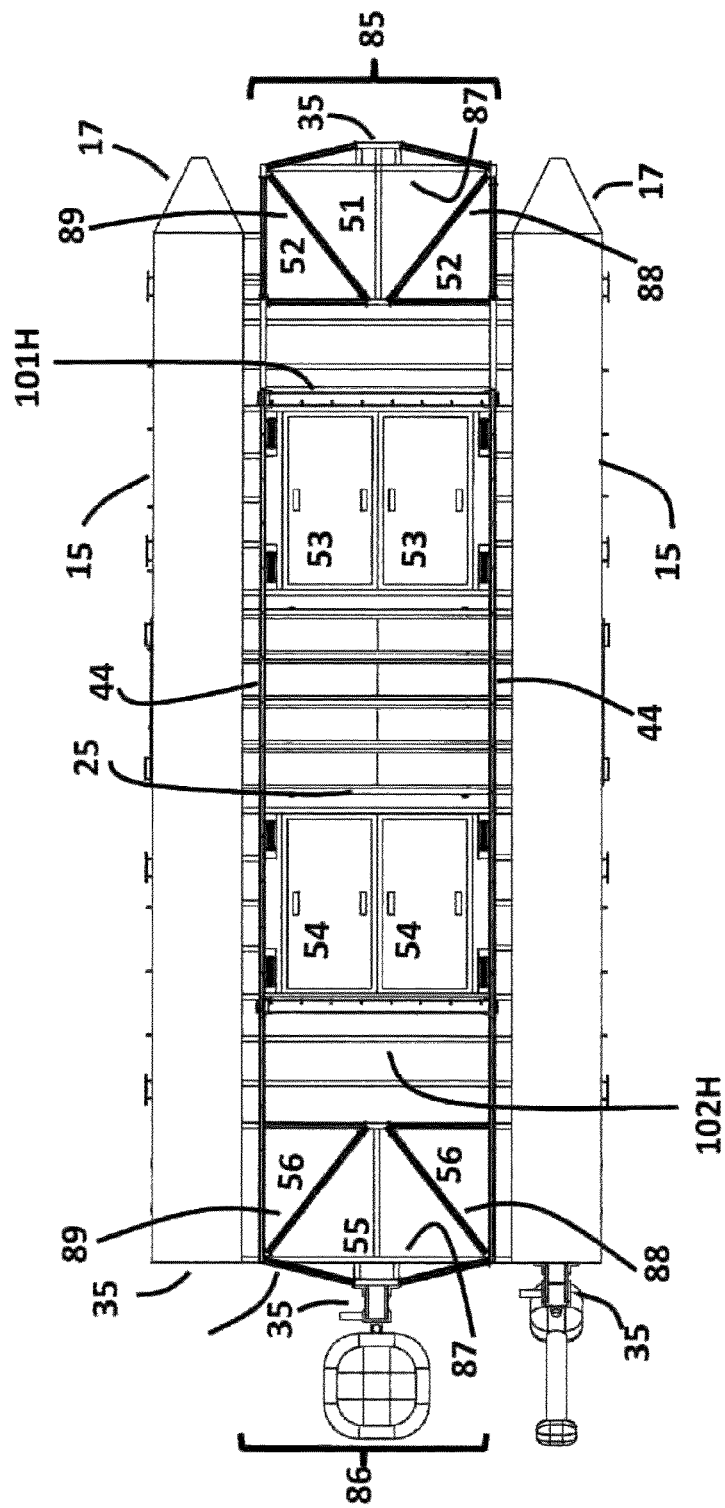
FIG. 7 is a bottom view of the pontoon platform shown in FIGS. 5 and 6, with pontoons, showing the pontoon platform converted to a selective fish capture system according to an embodiment of the present disclosure.
Figure 8:
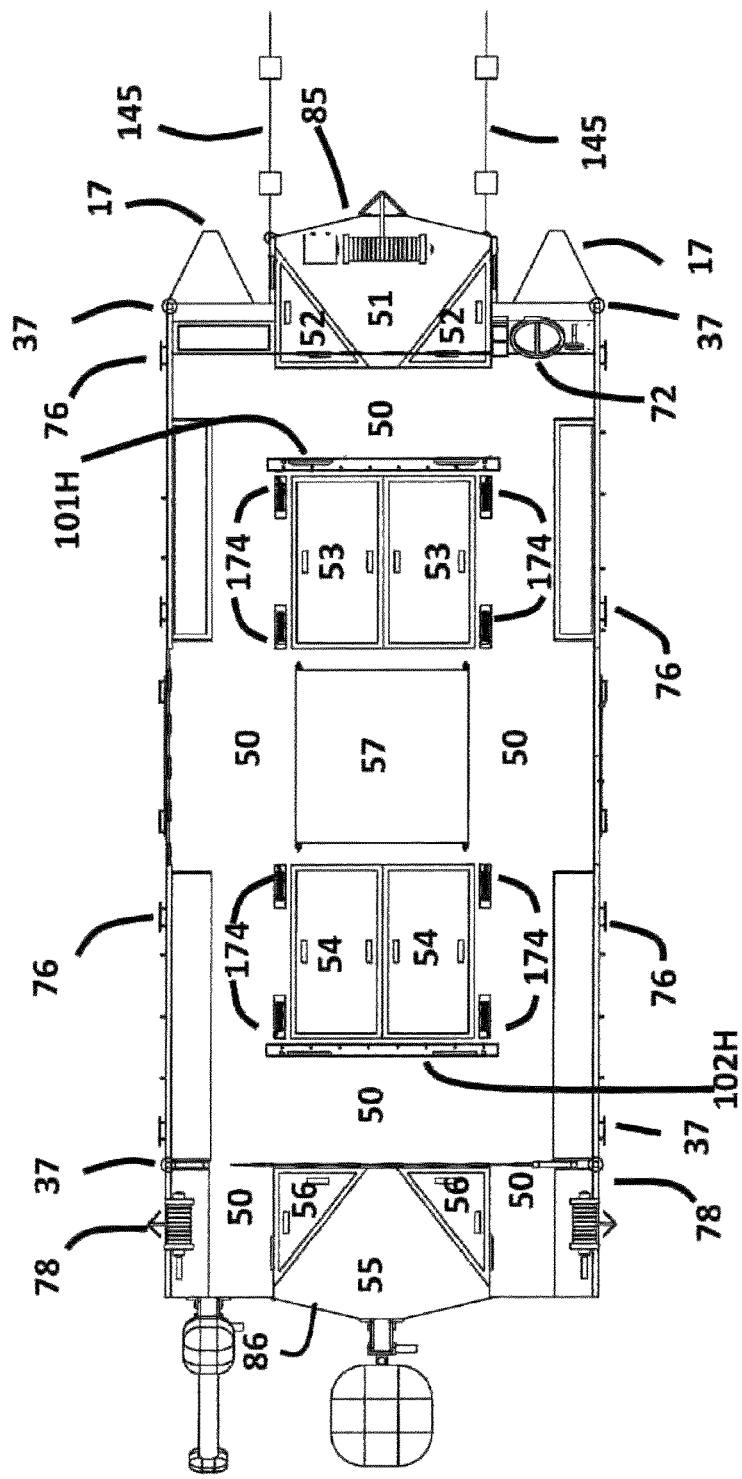
FIG. 8 is a top view of the pontoon platform shown in FIG. 7 converted to a selective fish capture system according to an embodiment of the present disclosure.

The pontoon platform 10 has at least one outboard motor mounting bracket 35 at the stern that is configured to support an outboard motor that is suitable for the particular application. The pontoon floats 15 may also each have one outboard motor mounting bracket 35. As shown in FIG. 7 and according to certain embodiments, the pontoon platform 10 and the pontoon floats 15 combined, may have up to four outboard motor brackets 35. As shown in FIGS. 7 and 8, the outboard motor mounting brackets 35 are typically connected to the rear end of each pontoon float 15 with a third outboard motor mounting bracket 35 connected to the pontoon platform 10 at the rear or in the front in between the pair of pontoon floats 15.

As shown in FIGS. 3 and 5, a support frame 20 that comprises a series of parallel beams 25 that are arranged transverse to the pair of pontoon floats 15, forms the crossbeams for the pontoon platform 10 and defines the width of the pontoon platform 10. As shown in FIGS. 1, 2, 3 and 5 and according to embodiments of the present disclosure, each pontoon float 15 comprises a longitudinal mounting riser 30 along its top length to which the transverse crossbeams 25 are attached. The transverse cross beams 25 connect the pontoon floats 15 to each other to maintain the distance between them and form the support frame 20. The dimensions of the pontoon floats 15 and support frame 20 define the size and load capacity of the pontoon platform 10. By way of example, and according to embodiments of the present disclosure, the pontoon platform 10 is designed to have a width of 8', 10', 12', (2.4 m, 3.0 m, 3.7 m), or according to certain embodiments can be larger. According to certain embodiments, the pontoon platform 10 is designed to have a length of 10', 12', 14', 16', 18', 20', 22', or 24', 32' (3.0 m, 3.7 m, 4.3 m, 4.9 m, 5.5 m, 6.1 m, 6.7 m, 7.3 m, 9.8 m), or according to certain embodiments can be larger.

According to embodiments of the present disclosure, as shown in FIGS. 2, 3 and 5, a containment enclosure frame 47 is defined by a pair of curtain track I beams or C Channels 44 attached to the underside of the support frame 20, extending across the plurality of cross members 25, and continuously attached in the same plane as the connector assembly 85 and/or 86 at one or both ends of the pontoon platform 10. In one embodiment, the containment enclosure frame 47 has a single connector assembly 86 attached at the rear of the pontoon platform 10. In another embodiment the containment enclosure frame 47 has a connector assembly 86 attached at the rear and a connector assembly 85 attached at the front of the pontoon platform 10. The curtain track I beams or C Channels 44 run parallel to and inside the pontoon floats 15. According to embodiments of the present disclosure, as shown in FIG. 2, a pair of curtain track rail assemblies 45 are attached to the underside of the curtain track I beams or C Channels 44. According to embodiments of the present disclosure, the curtain track rail assemblies 45 are configured to receive a plurality of curtain track roller hooks 46 that allow slidable suspension of a containment net 160 or oil containment booms 418 depending on the desired application.

In one non-reversible embodiment as shown in FIG. 3, the support frame 20 is configured to support a main deck plate 50, a pair of front main deck access hatches 53H, a pair of rear main deck access hatches 54H and a pair of rear connector access hatches 56H. In this embodiment, the lower containment enclosure frame 47 consists of a front bar assembly 84, two parallel I beams or C Channels 44 and a rear connector assembly 86.

In one non-reversible embodiment as shown in FIG. 4, the support frame 20 is configured to support an upper main deck plate 50, two front main access hatch plates 53, two rear main access hatch plates 54, a rear connector plate 55, two rear connector access hatch plates 56 and a lower containment enclosure frame 47. In this embodiment as shown in FIG. 3, the lower containment enclosure frame 47 consists of a front bar assembly 84, two parallel I beams or C Channels 44 and a rear connector assembly 86.

In one reversible embodiment as shown in FIG. 5 the support frame 20 is configured to support a main deck plate 50, a pair of front connector access hatches 52H a pair of front main deck access hatches 53H, a pair of rear main deck access hatches 54H and a pair of rear connector access hatches 56H. In this embodiment, the lower containment enclosure frame 47 consists of a front connector assembly 85, two parallel I beams or C Channels 44 and a rear connector assembly 86.

In one reversible embodiment as shown in FIG. 6, the support frame 20 is configured to support an upper main deck plate 50, a front connector plate 51, two front connector access hatch plates 52, two front main access hatch plates 53, two rear main access hatch plates 54, a rear connector plate 55, two rear connector access hatch plates 56 and a lower containment enclosure frame 47. In this embodiment as shown in FIG. 5, the lower containment enclosure frame 47 consists of a front connector assembly 85, two parallel I beams or C Channels 44 and a rear connector assembly 86.

Referring to FIG. 3, the pontoon platform deck hatches 53H, 54H, 56H are located in the support frame 20 and are sized to provide a suitable access below the support frame 20 for the particular non-reversible application. Referring to FIG. 4, the pontoon platform main deck plate 50, and the connector plate 55 are fixed plates, and plates 53, 54, 56 are removable plates mounted on the upper surface of the support frame 20 and are sized to provide a suitable working surface for the particular non-reversible application.

Referring to FIG. 5, the pontoon platform deck hatches 52H, 53H, 54H and 56H are located in the support frame 20 and are sized to provide a suitable access below the support frame 20 for the particular reversible application. Referring to FIG. 6, the pontoon platform main deck plate 50, and connector plates 51, and 55 are fixed plates and hatch access plates 52, 53, 54, and 56 are removable plates mounted on the upper surface of the support frame 20 and are sized to provide a suitable working surface for the particular reversible application.

According to embodiments, the deck plates 50, 51, 52, 53, 54, 55 and 56 are plywood decks with an anti-slip decking surface. According to further embodiments, the deck plates 50, 51, 52, 53, 54, 55 and 56 are aluminum decks with an anti-slip decking surface.

According to embodiments of the present disclosure and as illustrated in FIG. 4, the pontoon platform 10 comprises a main deck plate 50 which further comprises at least one deck access hatch 53H and one access hatch plate 53 centrally located on the front deck surface to provide access into the containment enclosure 48 for management of a containment net 160 and access to captured fish or oil containment booms 418 and oil skimmer 420 below. According to further embodiments and as illustrated in FIG. 6, the pontoon platform 10 comprises two access hatches 53H and 54H. The first access hatch 53H, according to such embodiments, is located at the front center-front half of the main deck plate 50 above the containment enclosure 48, and the second access hatch 54H is located at the center-rear half of the main deck plate 50 above the containment enclosure 48. Each access hatch 53H and 54H is sized to fit between the confines of the I beam or C Channel rail assembly 44 defining the width of the containment enclosure 48. According to certain embodiments, the access hatches 53H, 54H are rectangular in shape and measures up to 5' (1.5 m) wide by 4' (1.2) long. According to further embodiments, as shown in FIGS. 4 and 6 the access hatch plates 53 and 54 each have a corresponding safety latch 60, 61 that allows the access hatches 53H and 54H to be closed when not in use.

Reversible Containment Enclosure

Figure 9:
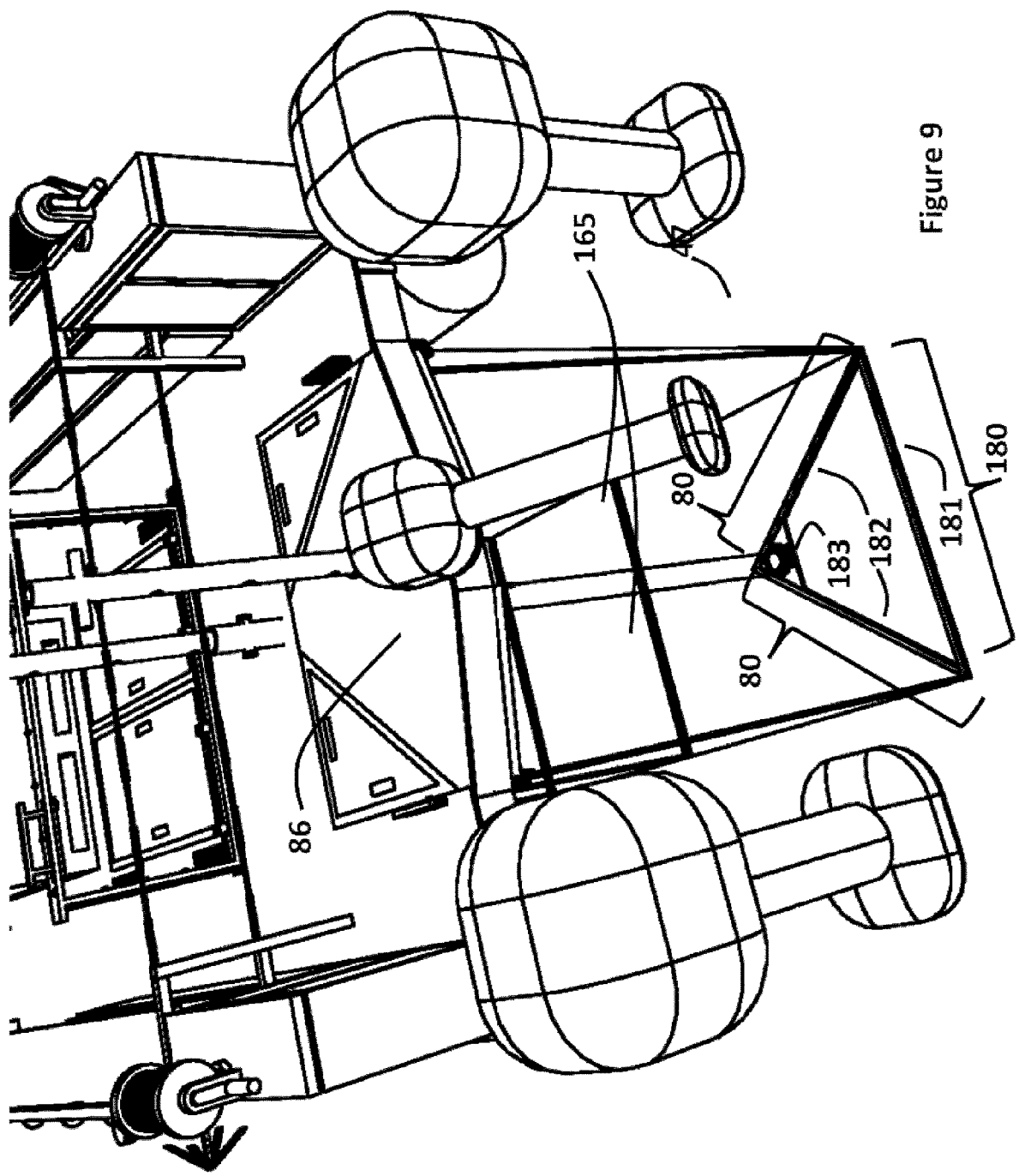
FIG. 9 is a rear perspective view of a pontoon platform showing the rear connector assembly configured as a selective fish capture system according to an embodiment of the present disclosure.

The containment enclosure 48 supported by the underside of the pontoon platform 10 is configured to capture and contain fish, or oil-spill depending on the desired application, that is guided into the containment enclosure 48 through a V-shaped entry 80 as depicted in FIG. 9 that progressively widens outwards from the entry of the containment enclosure 48. According to embodiments of the present disclosure, the pontoon platform 10 comprises a reversible V-shaped entry 80 to the containment enclosure. The pontoon platform 10 can be adapted to have the V-shaped entry 80 at the stern of the pontoon platform 10 or reversed to the bow of the pontoon platform 10. This reversibility of the V-shaped entry 80 between the bow and stern of the pontoon platform 10 allows the pontoon platform 10 to interconvert between its multiple configurations, for example, mobile and fixed selective fishing versions and the mobile oil spill response and collection versions.

The V-shaped entry 80 is defined by connector assemblies 85 and, 86 at one or both ends of the pontoon platform 10. According to certain embodiments, the pontoon platform 10 comprises a single connector assembly 86 at the stern. According to preferred embodiments, the pontoon platform 10 comprises a connector assembly 85 and 86 at both the bow and at the stern of the pontoon platform 10.

Figure 10:
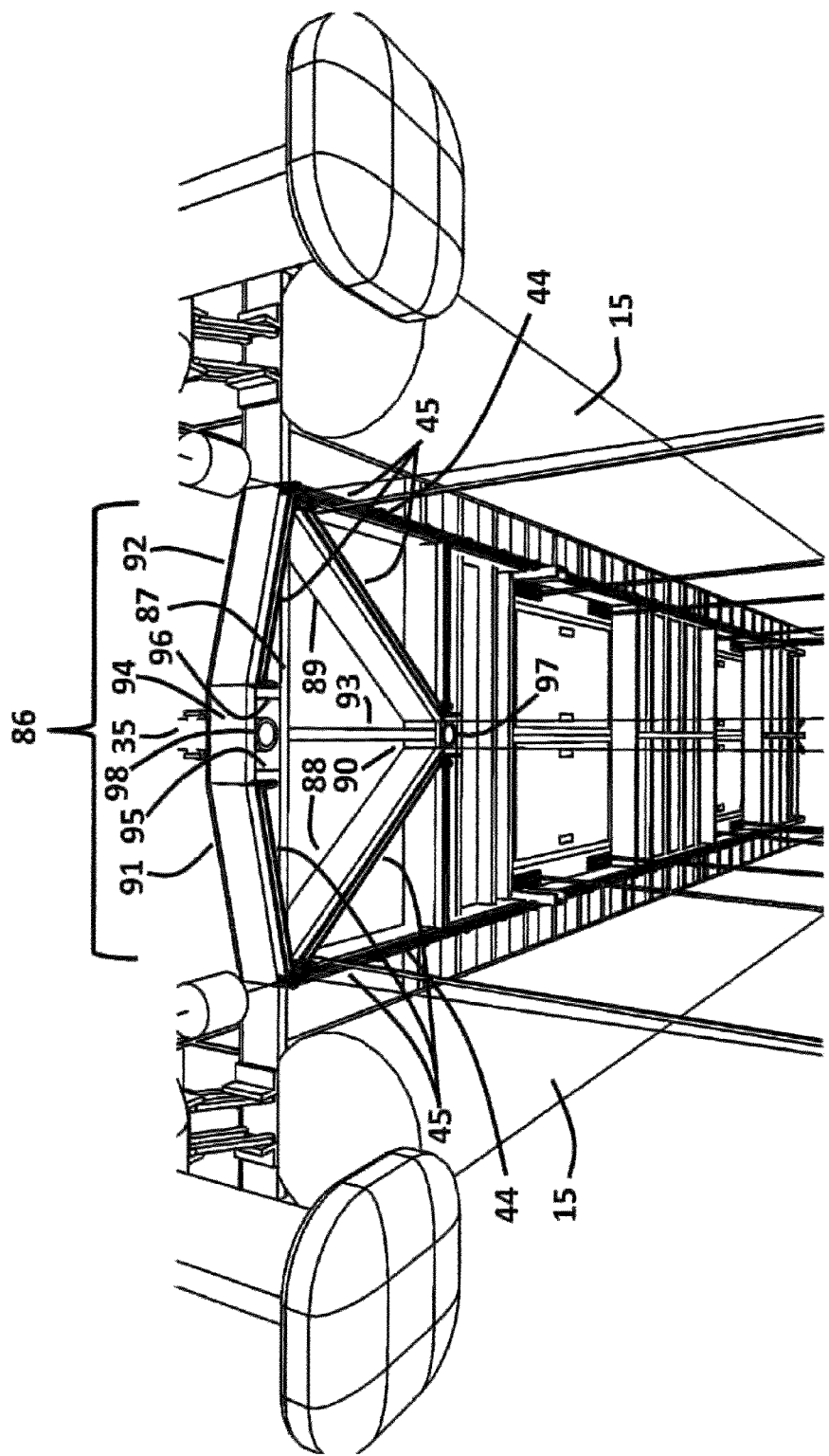
FIG. 10 is a bottom view of the rear connector assembly of the pontoon platform shown in FIG. 9.

As shown in FIG. 9, the triangular spreader bar 180 forms the bottom of the V-shaped entrance 80 to the containment enclosure frame 47. The triangular spreader bar 180 consists of a triangular spreader bar base 181 and two triangular spreader bar arms 182 and an optional passive integrated transponder (PIT) plate 183. FIGS. 3, 5 and 10, show the inner and outer triangle frames of the connector assemblies 85 and 86. A base beam 87 forms the base of the inner and outer triangle frames of the connector assemblies 85 and 86.

The inner triangle frames of the connector assemblies 85 and 86 form the top of the V-shaped entrance 80 to the containment enclosure frame 47. The outer triangle frames of the connector assemblies 85 and 86 form the connection between the containment enclosure frame 47 and the outer directional wing nets 145.

Referring to FIGS. 3, 5 and 10, the inner triangle is formed by two curtain track beams 88 and 89 that are connected to the ends of the curtain track I beams or C Channels 44 and converge to form a V-shaped triangle with an apex 90 towards the entry of the containment enclosure frame 47.

The curtain track rail assemblies 45 travel continuously on the underside of and along the curtain track I beams or C Channels 44 and then reverse along curtain track beams 88 and 89 until they meet at the apex 90 of the triangular connector assemblies 85 and 86.

Referring to FIGS. 3, 5 and 10, the outer triangle is formed by two curtain track beams 91 and 92 that are connected to the ends of the curtain track I beams or C Channels 44 and converge outwards to form a V-shaped triangle with an apex 94 towards the directional wing nets 145. In another embodiment, the two curtain track beams 91 and 92 are connected to the ends of the curtain track I beams or C Channels 44 and converge to form a blunted V-shaped triangle with an apex 94 towards the directional wing nets 145. The directional wing nets are connected to the curtain track beams 91, 92. The ends of the directional wing nets 145 can spread apart along the curtain track beams 91 and 92 and create an open channel allowing fish to swim into the V-shaped entry 80. In another embodiment, the ends of the directional wing nets 145 can be pulled towards each other along the curtain track beams 91 and 92 and create a closed channel preventing fish from swimming into the V-shaped entry 80.

According to certain embodiments, the connector assemblies 85 and 86 comprises an additional center support beam 93 that is connected at the center of the base beam 87 and extends perpendicularly through the center of the inner triangle to the apex 90 of the triangular connector assemblies 85 and 86.

According to certain embodiments, the outer triangles of the connector assemblies 85 and 86 comprise two outer center support beams 95 and 96 which connect from either side of the center of the base beam 87 and to the outer curtain track beams 91, 92 to provide support for and forming an outboard engine support extension 94 for the optional attachment of an engine mounting bracket 35.

Referring to FIG. 10 and according to certain embodiments, the connector assemblies 85 and 86 comprise two tow post receivers 97, 98. The inner tow post receiver 97 is located at the inner apex 90 of the inner triangle and the outer tow post receiver 98 is located at the apex of the outboard engine support bracket 94.

Figure 11:
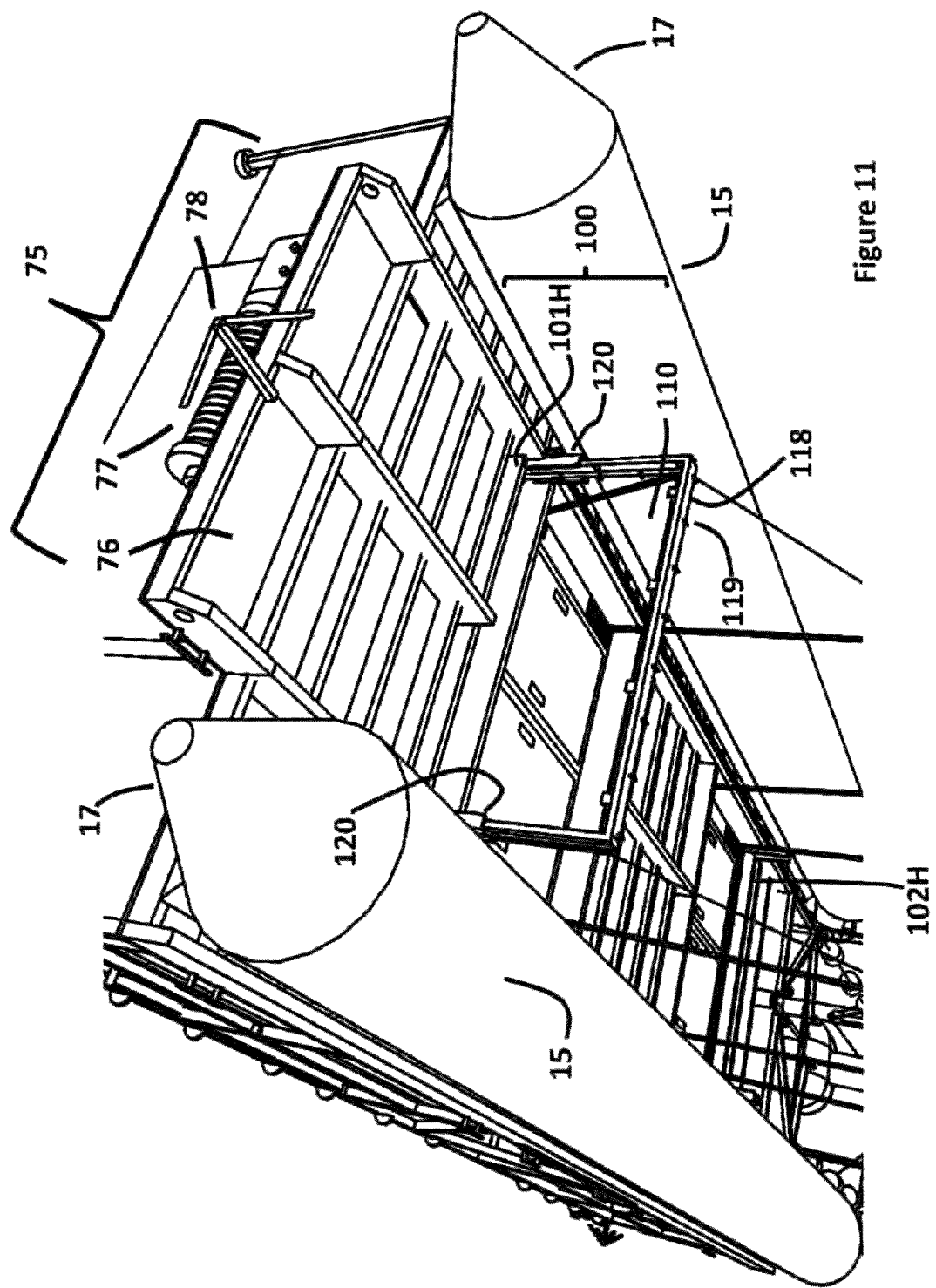
FIG. 11 is a bottom view of the front end of a selective fish capture system with a single rear connector assembly showing the retractable and removable release gate in the front release gate hatch in the deployed position according to an embodiment of the present disclosure.
Figure 12:
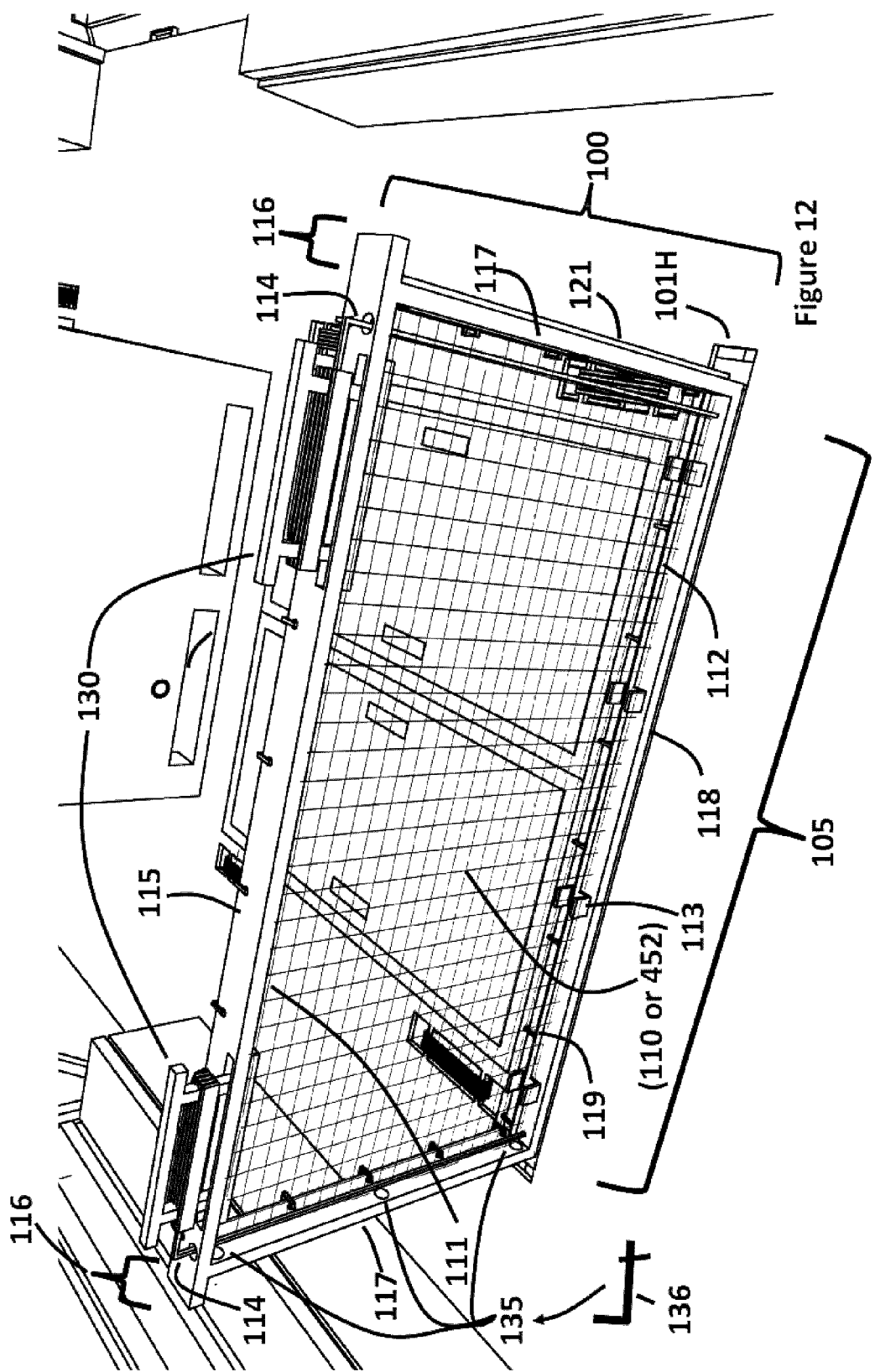
FIG. 12 is a top view of the pontoon platform shown in FIG. 11 showing the retractable and removable release gate, with a release gate net and emergency release mechanism, in the stored position according to an embodiment of the present disclosure.

Referring to FIGS. 9, 11 and 12, the entry of the containment enclosure 48 is defined by the V-shaped entry 80 of connector assemblies 85, 86 and can be closed at the opposite exit end by a single retractable and removable release gate 100. The release gate 100 can be moved from one end of the pontoon platform 10 to the other according to the embodiment.

According to one embodiment of the present disclosure and with reference to FIGS. 8, 11 and 12, the pontoon platform 10 comprises a single front release gate hatch 101H into which the release gate 100 is deployed. In this embodiment, fish enter the V-shaped entrance 80 defined by rear connector assembly 86 and then enter into the containment enclosure 48. In the same embodiment the fish which are not harvested can exit the front of the containment enclosure 48 via the release gate 100 which has been inserted into the single front release gate hatch 101H.

According to another embodiment of the present disclosure and with reference to FIGS. 8, 11 and 12, the pontoon platform 10 comprises a front release gate hatch 101H and a rear release gate hatch 102H into which the release gate 100 can be deployed. In this embodiment, the pontoon platform 10 can be operated in a forward or reverse mode utilizing the connector assembly 85 or 86 as entrance to the containment enclosure 48. This reversibility allows the release gate 100 to be moved to the opposite end from the connector assembly 85 or 86 whichever is being used to create the entrance to the containment enclosure 48. In this way, in one embodiment, fish enter the V-shaped entrance 80 defined by the front connector assembly 85 and progress into the containment enclosure 48, and then the fish which are not harvested can exit the containment enclosure 48 when the release gate 100 is deployed in the rear release gate hatch 102H. In another embodiment, fish enter the V-shaped entrance 80 defined by the rear connector assembly 86 and progress into the containment enclosure 48, and then the fish which are not harvested can exit the containment enclosure 48 when the release gate 100 is deployed in the front release gate hatch 101H. In these configurations, the containment enclosure 48 is reversible.

Referring to FIGS. 12, 13, 14, 15 and 49, a release gate 100 with a release gate net 110 is sized to span the width 105 of the containment enclosure 48. The release gate top bar 115 rests on the top of the main deck plate 50, when the release gate 100 is inserted into the release gate hatches 101H or 102H. The release gate side bar 117 has a release gate lock tab 122 at its upper end which extends up through the release gate top bar 115 and into which the release gate quick release pin 123 or quick release kick plate 124 is inserted. When the quick release kick plate 124 is used a quick release bracket 125 is attached to the gate top bar 115. When the release gate quick release pin 123 or quick release kick plate 124 is retracted the release gate 100 drops freely below the main deck plate 50. The release gate net is suspended on top from a release gate net hanger bar 111 and held down at the bottom by a release gate net anchor bar 112 (FIG. 14) The release gate net pull chords 114 are attached to the release gate net anchor bar 112 and rise vertically up through a hole in the release gate top bar 115 and are tied off onto the release gate lift cleats 130. In one embodiment the release gate 100 is positioned to be inserted into the front release gate hatch 101H. In another embodiment, the release gate 100 is inserted into the rear release gate hatch 102H of the containment enclosure 48. The insertion of the release gate 100 is always at the end opposite to the placement connections of the wing nets 145. The release gate 100 is fixed in place for the entire duration of fish capture. In every embodiment, to open the containment enclosure 48 and release fish which will not be harvested, the release gate net 110 is lifted vertically with the release gate net pull chords 114 that are tied off on the release gate lift cleats 130 to allow fish to escape the containment enclosure 48. When the fish have been released, the release gate net pull chords 114 are untied and the release gate net 110 lowers and re-seats the release gate net anchor bar 112 into the release gate anchor bar brackets 113 at the bottom of the release gate 100 and closes off the containment enclosure 48. When the release gate 100 is not required it is vertically retracted through the release gate hatch 101H or 102H to a raised position above the main deck 50 and either locked into the raised position using the release gate frame locking pins 136 or removed for storage (FIG. 12).

Figure 13:
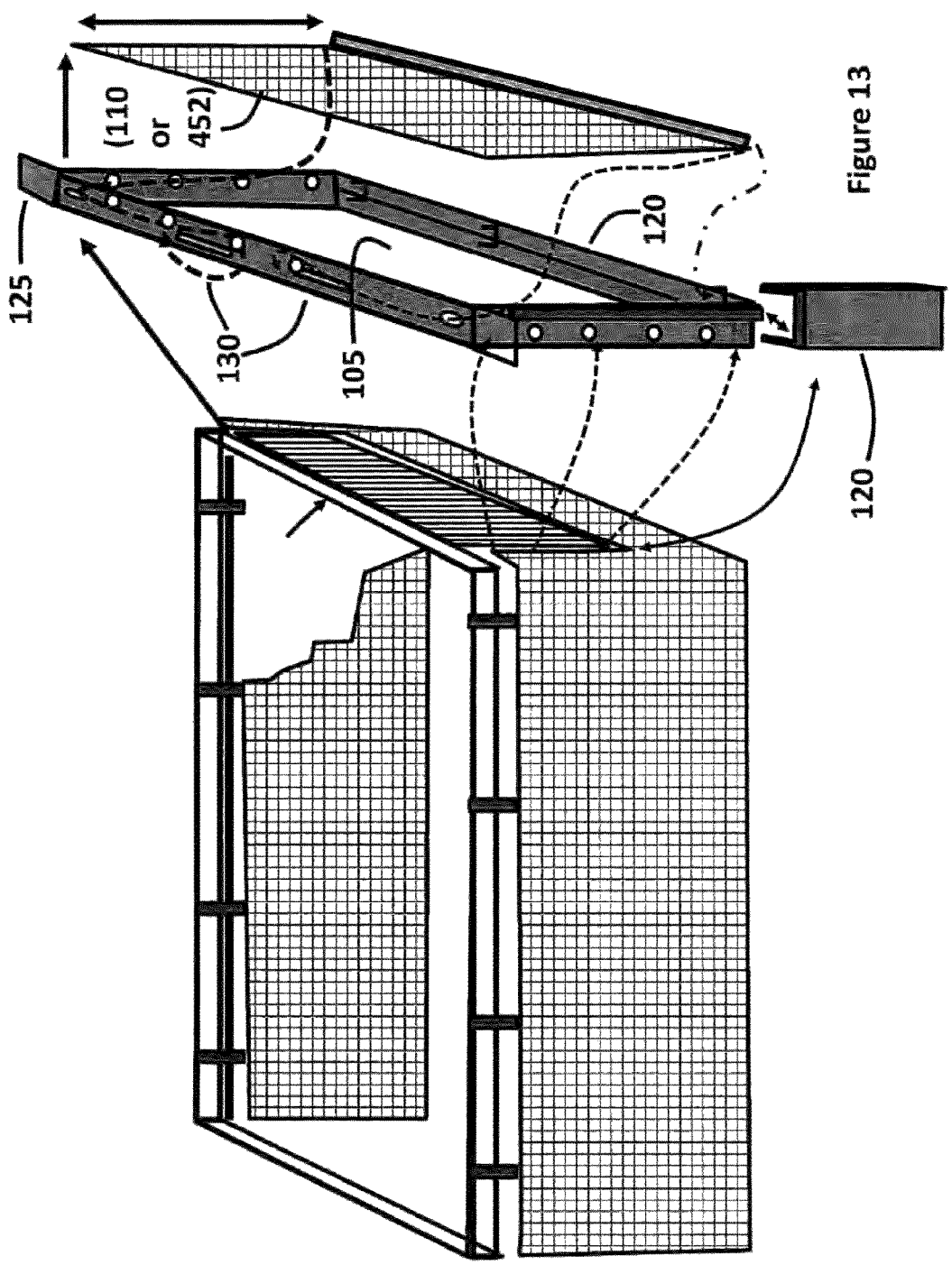
FIG. 13 is an exploded side view of the retractable and removable release gate with a release gate net shown in FIG. 12.
Figure 14:
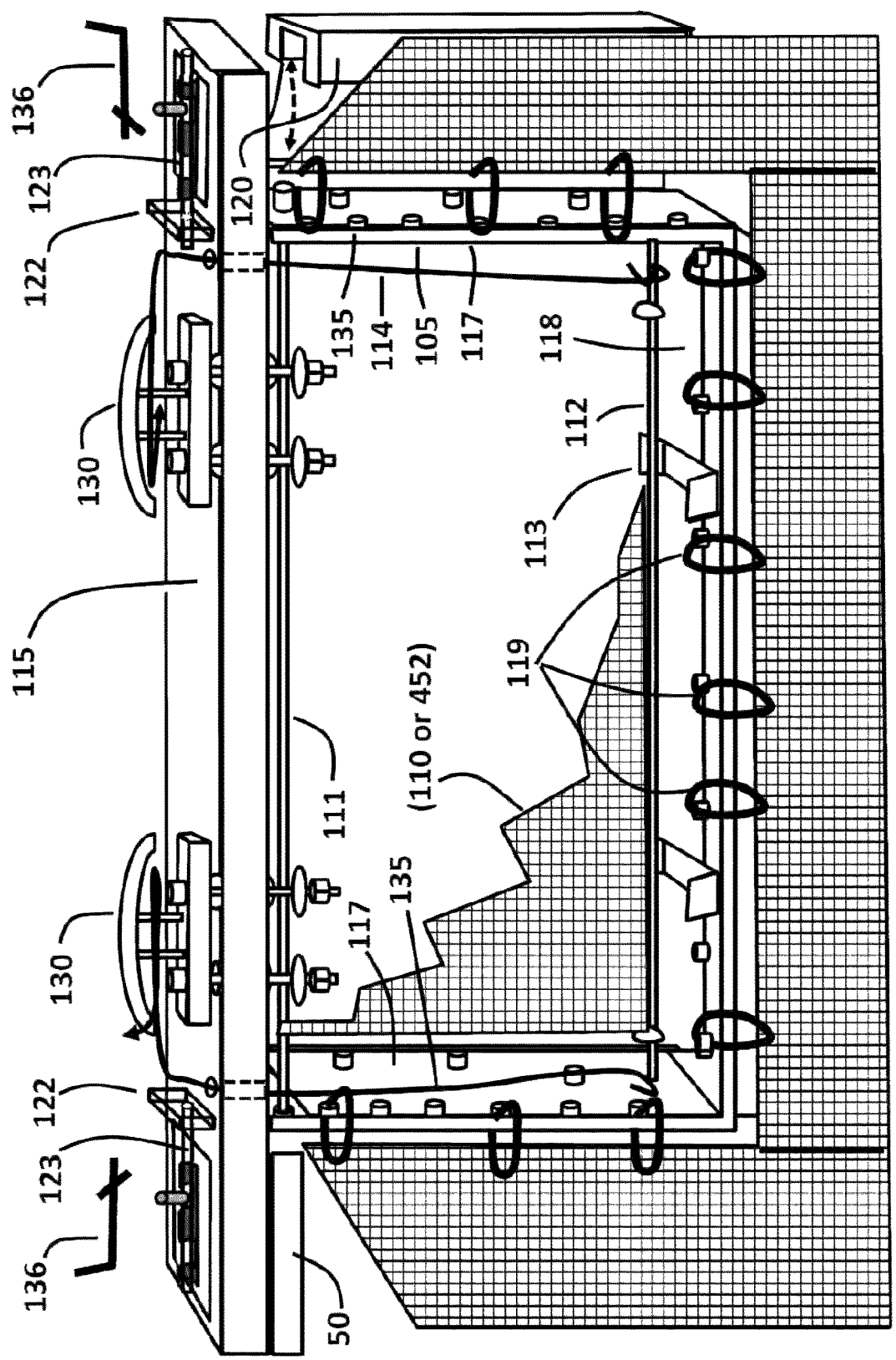
FIG. 14 is a schematic end view diagram of the retractable and removable release gate with a release gate net and emergency release mechanism shown in FIG. 12.

As shown in FIGS. 12, 13, and 14, the release gate 100 comprises a gate frame having top 115, side 117 and bottom 118 bars. According to an embodiment of the disclosure, the release gate net 110 is attached to the release gate net hanger bar 111 which spans the opening 105 of the release gate frame 100. When deployed, the side guide bar 121 of the release gate frame 100 slidingly engages with release gate guide channels 120 below the main deck 50 that guide the release gate frame 100 into the lowered position and supports the release gate frame 100 when in the deployed position. The release gate guide channels 120 comprise two opposing channeled side brackets that are sized to receive the side guide bar 121 of the release gate frame 100 when deployed. The release gate side guide bars 121 of the release gate frame 100 engage with the release gate side channels 120 until the release gate top bar shoulders 116 come to rest on the surface of the main deck plate 50. The release gate 100 is then said to be in the deployed position.

As shown in FIG. 12, the release gate 100 is raised and lowered within the release gate guide channels 120 by lift cleats 130 slidingly attached at the top of the release gate bar 115. According to embodiments of the disclosure, the release gate 100 can be lowered to incremental depths within the lower release gate guide channels 120. According to such embodiments, the release gate 100 further comprises release gate frame holes 135 in the release gate frame side bars 117 for holding the release gate 100 at the desired height above the main deck plate 50. According to certain embodiments, the release gate frame pins 136 are inserted into the release gate frame holes 135 in the gate frame side bars 117 at the desired height above the main deck plate 50. The release gate frame pins 136 prevent the release gate 100 from dropping lower than the release gate frame hole 135 into which the gate frame pin 136 was inserted.

Selective Fish Capture System

Figure 15:
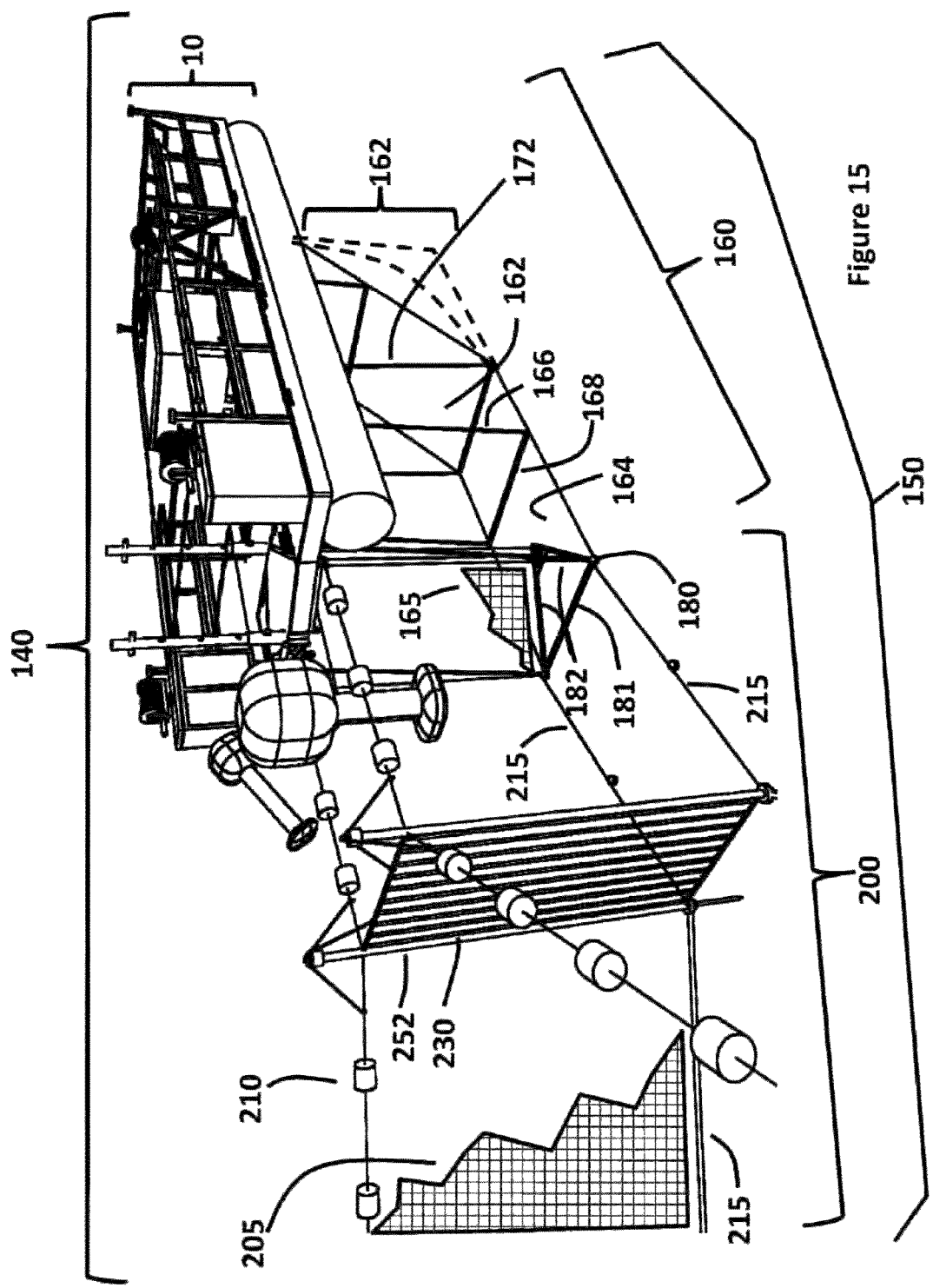
FIG. 15 is a side perspective view of a selective fish capture system according to an embodiment of the present disclosure.
Figure 16:
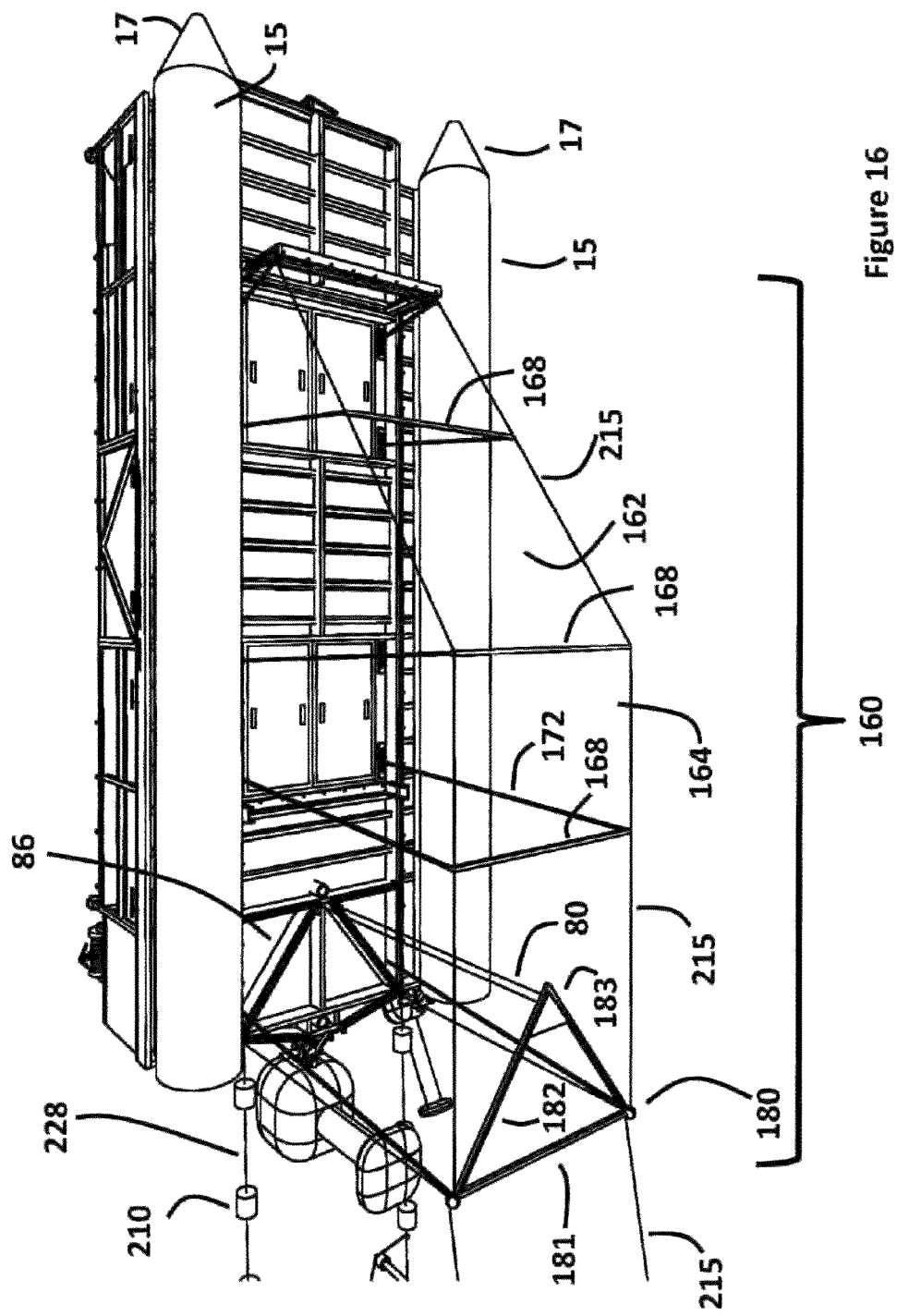
FIG. 16 is a bottom perspective view of the selective fish capture system shown in FIG. 15.

The selective fish capture system 140 consists of an interconverting pontoon platform 10 and a net assembly 150 (FIG. 15). The net assembly 150 is configured as a containment net 160 connected to a guidance net 200. In various embodiments, the connection of the containment net 160 to the guidance net 200 is facilitated by a connector assembly 85 or 86. Referring to FIGS. 15 and 16, in one embodiment the containment net 160 is suspended from the containment enclosure frame 47 on the underside of the pontoon platform 10 to form the containment enclosure 48. The containment enclosure 48 consists of fish netting forming containing side walls 162, bottom floor 164, and entry panels 165 and an internal triangular spreader bar 180 at the entrance and a plurality of linear spreader bars internal to the containment enclosure 48. The rectangular structure of the containment enclosure 48 is maintained by a triangular spreader bar 180 at the bottom of the entrance and a plurality of linear spreader bars 168 equally spaced and fastened to the bottom interior of the net 160. The containment net 160 side walls 162 have side wall extensions to form entry panels 165 that are folded back into the containment enclosure at the V-shaped entry of the containment net 160. The entry panels 165 wrap back into the containment enclosure 48 and are suspended at the top from the curtain track assembly 45 of the connector attachment 85 or 86 and attached at the bottom to the triangular spreader bar arms 182 to form the V-shaped entry 80 of the containment enclosure 48.

Suspended Containment Net

Figure 17:
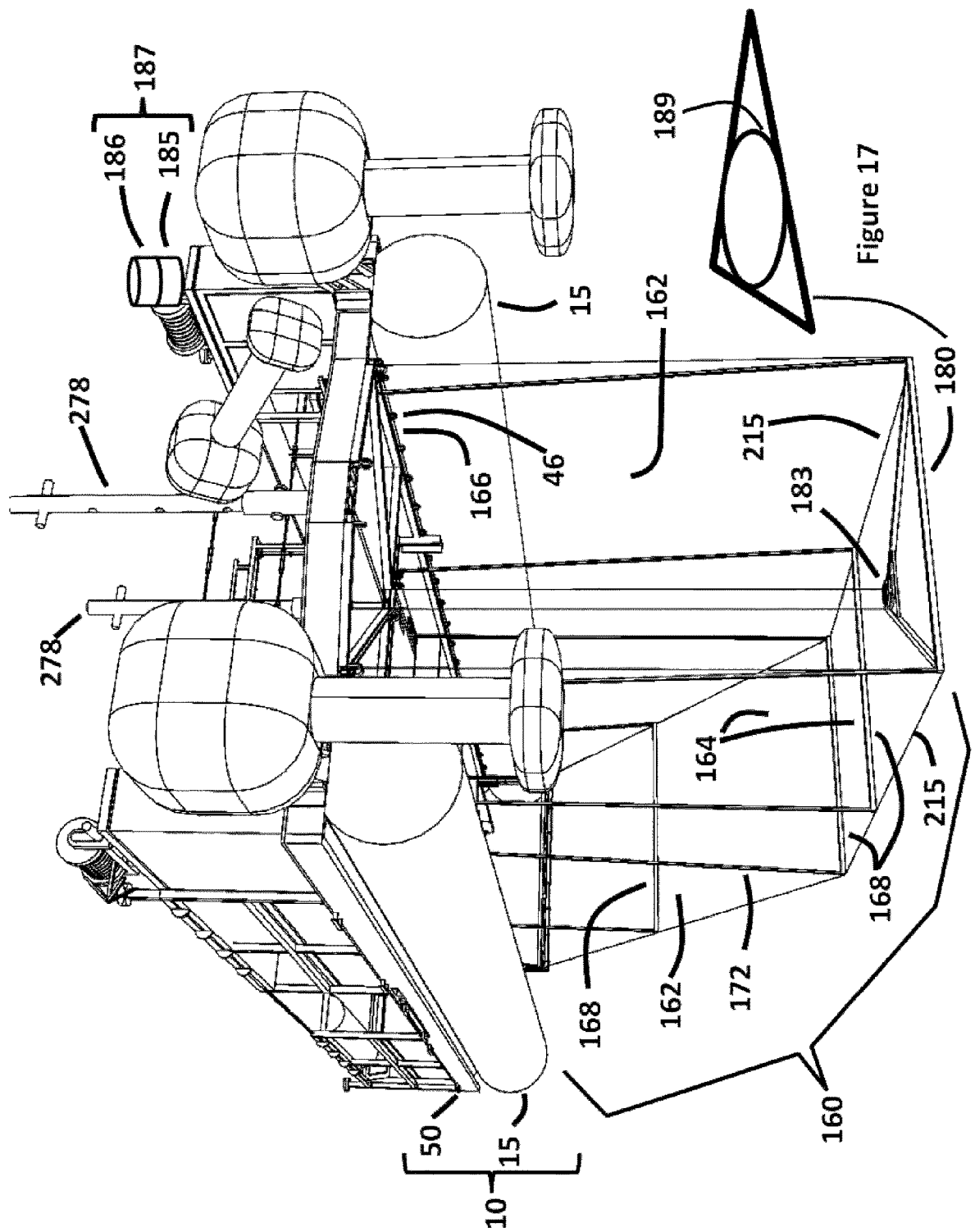
FIG. 17 is a rear perspective view of the entry of the containment enclosure of a selective fish capture system showing the triangular spreader bar with a triangular spreader plate and the linear spreader bars according to an embodiment of the present disclosure.

As shown in FIG. 17, the containment net 160 is suspended from the curtain track roller hooks 46 by the containment net's 160 side edges 162 such that the containment net 160 hangs vertically below the main deck plate 50 to form opposing side walls 162 and a bottom floor 164 for the containment enclosure 48. According to embodiments of the present disclosure, the curtain track I beams or C Channels 44 support the curtain track rail assemblies 45 so that the containment net 160 is attached to the plurality of curtain track roller hooks 46 to allow the containment net 160 to slidingly be installed and/or removed. According to certain embodiments, a retraction line 166 is threaded along the top edge of the containment net 160. The containment net 160 which is attached to a plurality of curtain track roller hooks 46 may be pulled by the retraction line 166 for attachment onto or removal from the pair of curtain track rail assemblies 45. In such embodiments, the depth of the side walls 162 of the containment net 160 can be adjusted to the depth of the water body by threading the retraction line 166 closer to, or farther away from, the top edge of the containment net 160. In this way, the selective fish capture system 140 can be adjusted to the environmental conditions at the time of use and further allows the selective fish capture system 140 to be used in a range of water body types and depths. In certain embodiments, a plurality of recovery floats 170 are attached to the retraction line 166 and spaced along the top length of the containment net 160.

The bottom floor 164 of the containment net 160 is formed by a triangular spreader bar 180 at its entrance and a plurality of linear spreader bars 168 that are equally spaced and attached in a parallel series to the bottom of the containment net 160. The triangular spreader bar 180 and the linear spreader bars 168 span the width of the bottom floor 164 of the containment net 160 and are attached internally to the bottom of the containment net by a series of industrial connector straps 119. The opposing ends of the base bar of the triangular spreader bar 180 and the opposing ends of the linear spreader bars 168 are attached to a corresponding net lift-line 172. Each net lift-line 172 extends upwards to the working surface of the main deck plate 50 through a respective net lift-line access port 174 situated on opposing sides of the main deck plate 50 and held in place by tying off to a corresponding cleat 176 on the main deck plate 50. In such embodiments, the spreader bars 168 are arranged equally spaced along the bottom floor 164 of the containment net 160 to align with the corresponding net lift-line access hatch 174.

The containment net 160 can be lifted upwards from the bottom up, towards the main deck plate 50, by pulling the net lift-lines 172 beginning from the rear of the containment net 160 to raise the corresponding triangular spreader bar 180 and then in sequence from rear to front, lifting the linear spreader bars 168 carrying the containment net 160 that is attached to it. The suspended length of each net lift-line 172 will determine the depth of the containment net 160 and the interior volume of the containment enclosure. Raising the triangular spreader bar 180 to meet the underside of the connector assembly 85 or 86 will close off the containment enclosure 48. Selectively raising the net lift-lines 172 starting from the triangular spreader bar 180 and progressively raising the adjacent linear spreader bars 168 can modify the interior volume of the containment enclosure 48 which can be used to direct the movement of the fish towards the front of the containment enclosure 48, for example through crowding, and facilitate their capture. The net lift-lines 172 at the exit end of the containment enclosure will typically be raised to shorten the depth of the containment net at the exit end to align with or be slightly higher than the bottom bar 118 of the release gate 100. In this way, the exit end of the containment enclosure 48 will be sized to approximately match the release gate bottom bar 118. As shown in FIG. 15, the net lift-lines 172 lifted in sequence from the triangular spreader bar at the rear towards the release gate 100 at the bow of the pontoon platform 10 results in a gradual decrease of the interior volume of the containment enclosure at the exit end to match the size of the release gate 100 when deployed. As illustrated in FIG. 14, in certain embodiments, the exit end of the containment net 160 is attached to the release gate side bars 117 and the release gate bottom bar 118 by industrial connector straps 119 to secure the exit end of the containment net 160 to the release gate.

Tapered Entry

The V-shaped entry 80 of the containment enclosure 48 is tapered towards the interior of the containment enclosure 48 to create a one-way narrowing entry to restrict the fish from exiting the containment enclosure 48. The triangular configuration of the connector assemblies 85 and 86 connected to the ends of the support frame 20 of the pontoon platform 10 forms the top of the V-shaped entry 80 to the containment enclosure 48. In one non-reversible embodiment, a single connector assembly 86 at the rear end of the support frame 20, forms the V-shaped entry 80 to the containment enclosure 48. In another reversible embodiment, the support frame 20 has dual connector assemblies 85 and 86 attached at the front and rear end of the support frame 20 and each connector assembly 85 or 86 forms the V-shaped entry 80 to the containment enclosure 48. In various embodiments and depending on the purpose and which mode the pontoon platform 10 is operated in, either connector assembly 85 or 86, is used to form the V-shaped 80 entry to the containment enclosure 48 and permits the pontoon platform 10 to operate in a reversible mode.

With reference to FIGS. 9, 10, 15 and 16, and according to one embodiment, the entrance end of the containment net 160 is attached to the connector assembly 86 if the pontoon platform 10 only has one connector assembly and is operated in the non-reversible mode. In reversible embodiments, the entrance end of the containment net 160 is attached to the front connector assembly 85 of the pontoon platform 10. The extended entry panels 165 on the entrance end of the containment net 160 are folded in and the top of the extended entry panels 165 are suspended from a plurality of curtain track roller hooks 46 on the inner curtain track beams 88 and 89 to form a pair of entry panels 165 for the tapered V-shaped entry 80. A triangular spreader bar 180 having dimensions that correspond to the connector assembly 86 is attached to the bottom of the entrance end of the containment net 160 in alignment with the connector assembly 86. The bottom of the extended entry panels 165 of the containment net 160 are attached to the triangular spreader bar arms 182 either by a plurality of industrial connector straps 119 or a plurality of curtain track roller hooks 46 to maintain the position of the entry panels 165 forming the bottom of the tapered V-shaped entry 80 into the containment enclosure 48. In certain embodiments, the triangular spreader bar 180 may have a passive integrated transponder plate 183 attached at the apex of the triangular spreader bar 180.

Figure 18:
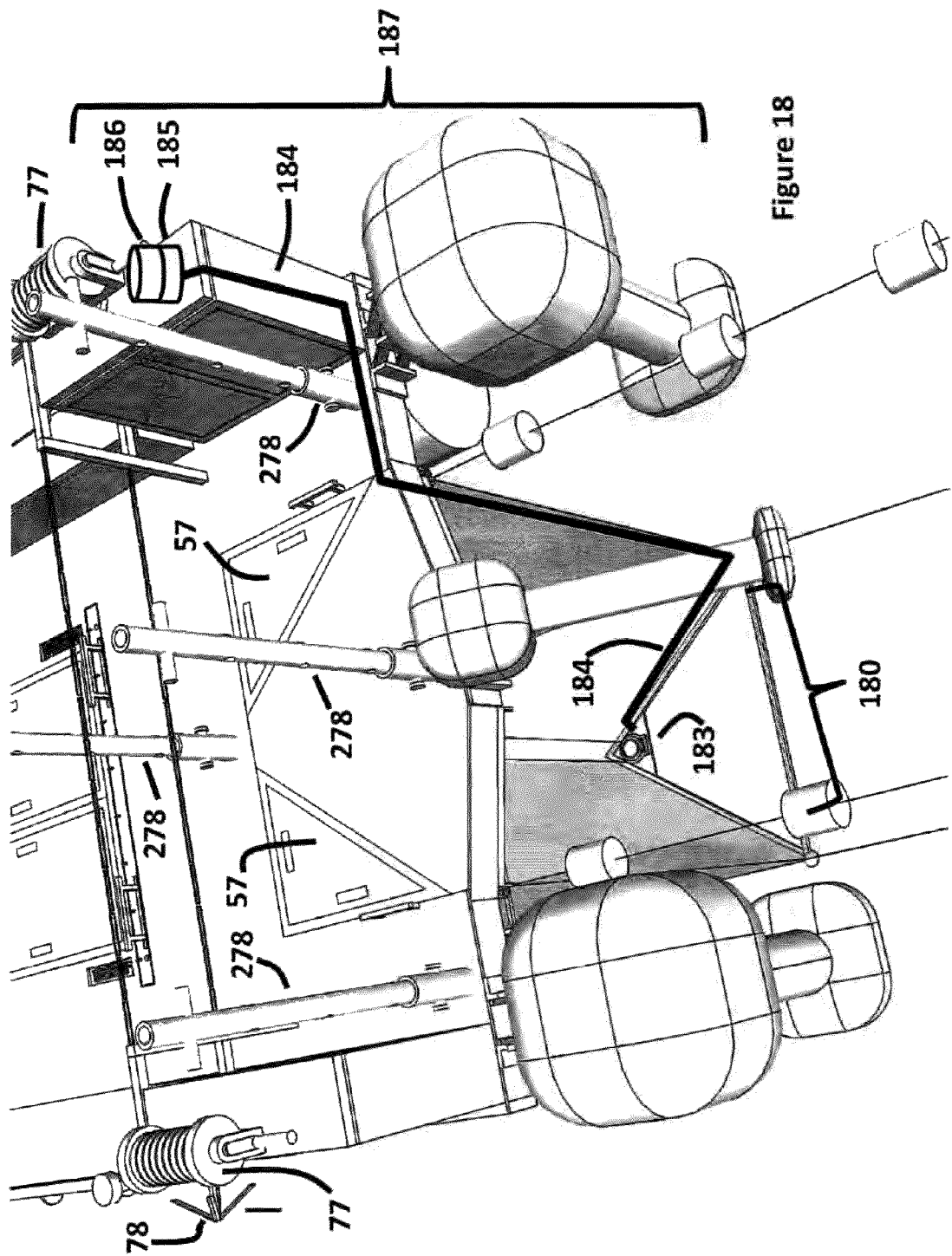
FIG. 18 is top perspective view of the entry of the containment enclosure of a selective fish capture system shown in FIG. 17 showing the rear connector assembly with a passive integrated transponder (PIT) detection and transmission system.

According to certain embodiments, as shown in FIGS. 17 and 18, the selective fish capture system 140 can be adapted to collect data on the fish entering the containment enclosure 48. Fish which have an implanted passive integrated transponder tag (PITT) 188 which contains digital information can thereby be monitored for migration, for example. In such embodiments, a fish sensing system 187 consisting of a passive integrated transponder (PIT) plate 183, or the PIT circular antennae 189 can be attached to the inside circumference of the triangular spreader bar 180 at the entry of the containment enclosure 48 to detect fish which have implanted PIT tags 188. The PIT plate 183 or the PIT circular antennae 189 is connected to a PIT data transmission line 184 which transmits the PIT tag 188 digital information to a PIT data logger 185. The PIT data logger 185 stores the digital information and forwards the digital information to a PIT cellular data transmitter 186. The PIT cellular data transmitter 186 transmits the PIT tag 188 digital information via a cellular network to a computer and thereby measures fish activity and behavior characteristics at the entry. In this way, it is contemplated that the selective capture system 140 may be applied to fisheries research applications.

Variable Selective Fish Capture Systems

The selective fish capture system 140 can have variable configurations. In particular, the interconverting pontoon platform 10 can connect to variable configurations of the net assembly 150 to adapt to available fishing opportunities. According to some embodiments, the net assembly 150 is configured to have the V-shaped entry 80 at the rear of the pontoon platform 10 with the guidance net 200 extending away from the rear of the pontoon platform 10. According to other embodiments, the net assembly 150 is configured in the reverse orientation such that the V-shaped entry 80 is at the bow of the pontoon platform 10 with the guidance net 200 extending away from the bow. The reversibility of the pontoon platform 10 and the variable configuration of the net assembly 150, allows the selective fish capture system 140 to be adaptable to both stationary and mobile operations.

Stationary Fish Capture System

Figure 19:
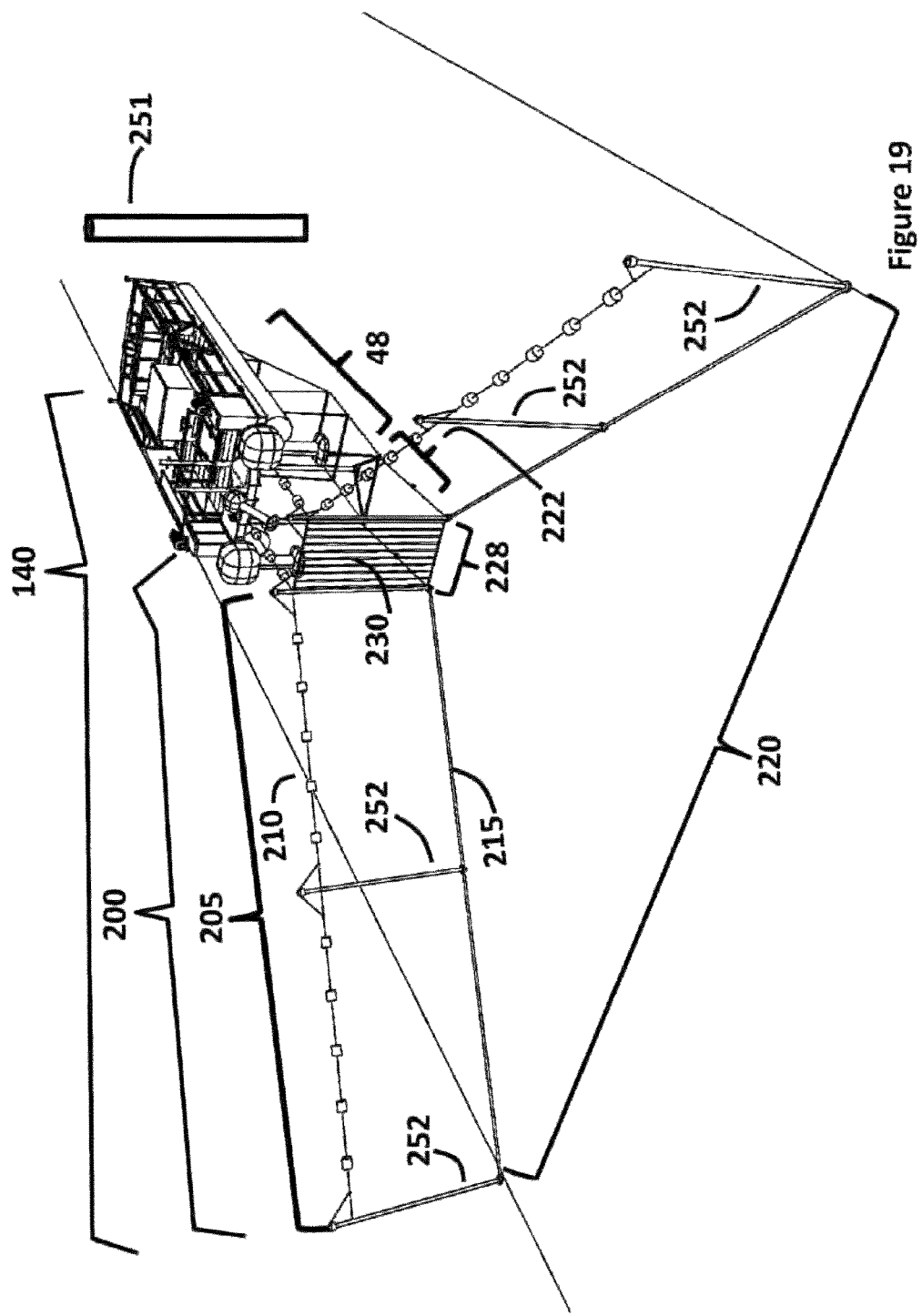
FIG. 19 is a schematic diagram of a fixed in place selective fish capture system in operation with a near-shore guidance net configuration with wing net anchoring posts of a selective fish capture system in operation, according to an embodiment of the present disclosure.
Figure 20:
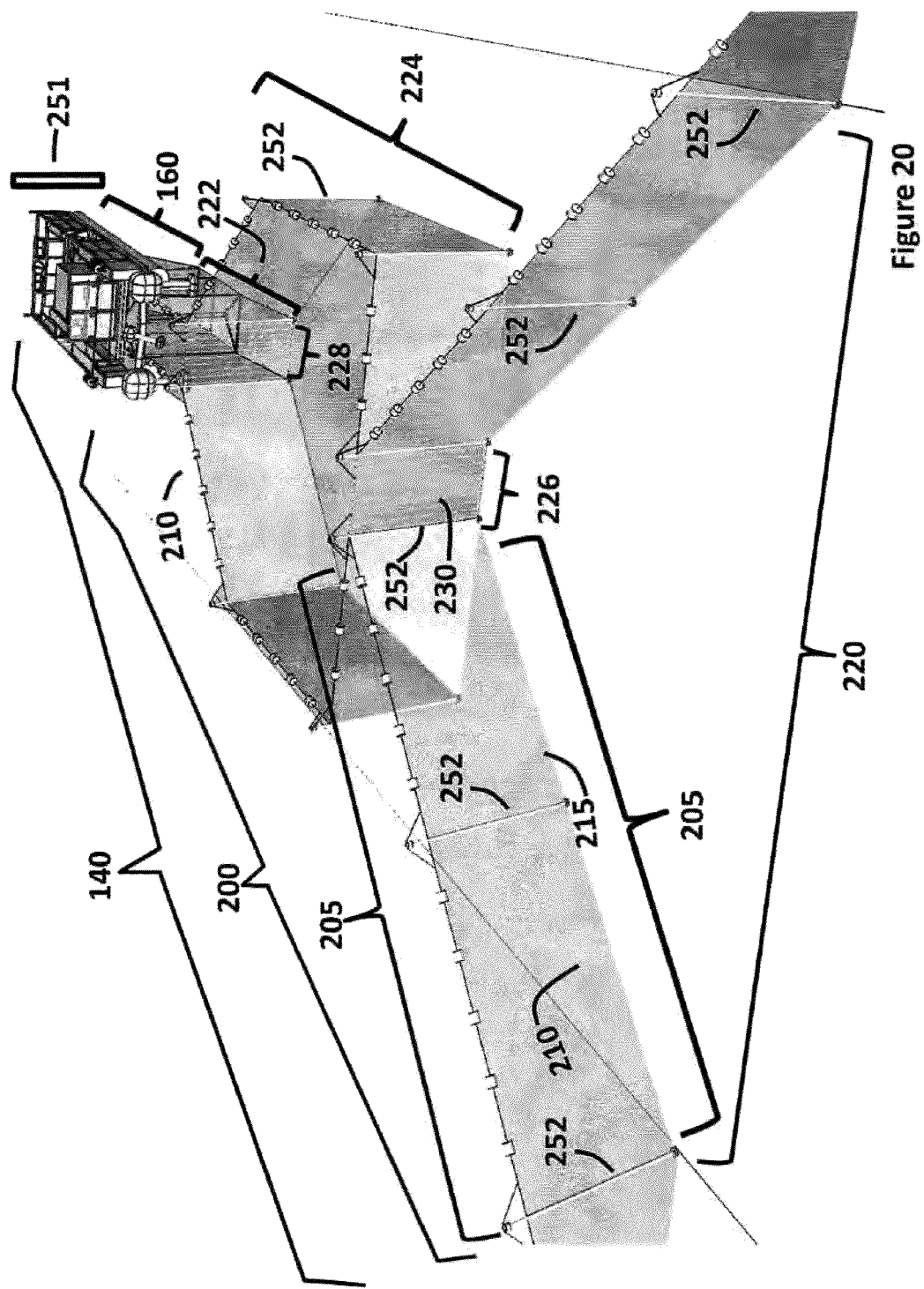
FIG. 20 is a schematic diagram of a fixed in place selective fish capture system in operation with a near-shore guidance net configuration with wing net anchoring posts forming a V-shaped guidance net leading to a heart shaped enclosure and a narrow passageway leading to the V-shaped entrance of the containment net of a selective fish capture system in operation, according to a further embodiment of the present disclosure.
Figure 21:
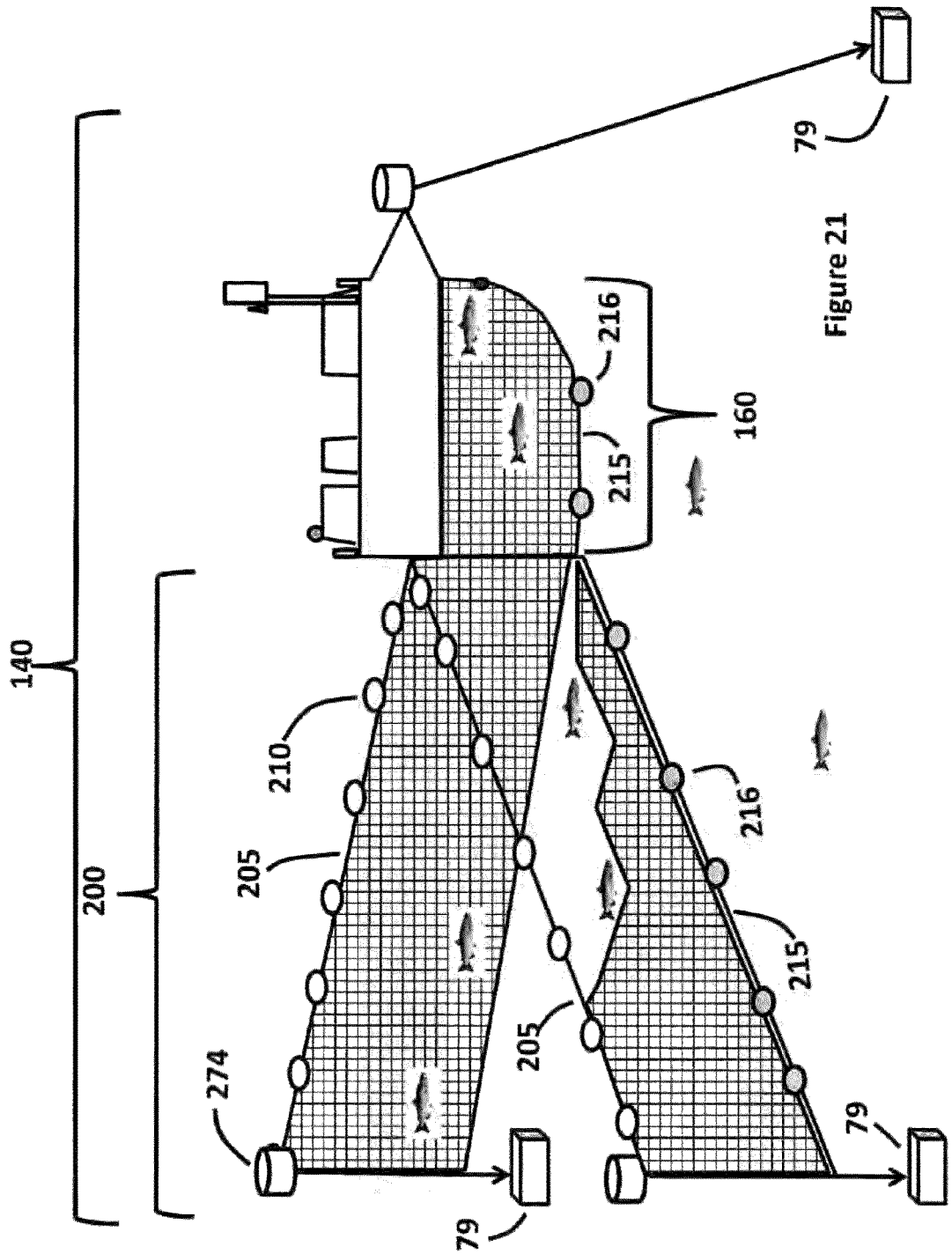
FIG. 21 is a schematic diagram of the fixed in place shallow wing net anchoring weight system without a triangular bottom net of a selective fish capture system in operation according to an embodiment of the present disclosure.
Figure 22:
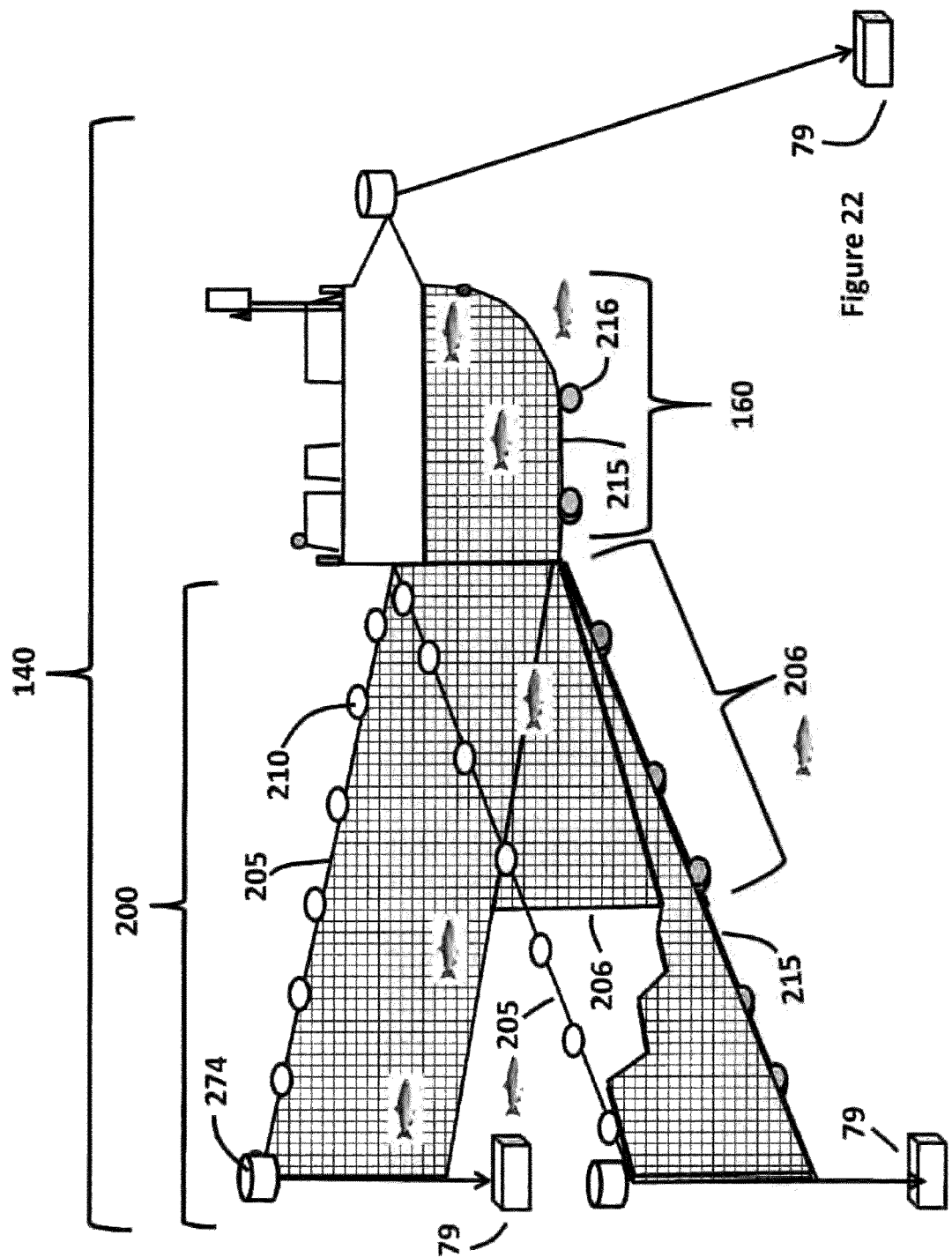
FIG. 22 is a schematic diagram of the deployment of the fixed in place shallow wing net anchoring weight system with a horizontal triangular bottom net of a selective fish capture system in operation according to an embodiment of the present disclosure.
Figure 23:
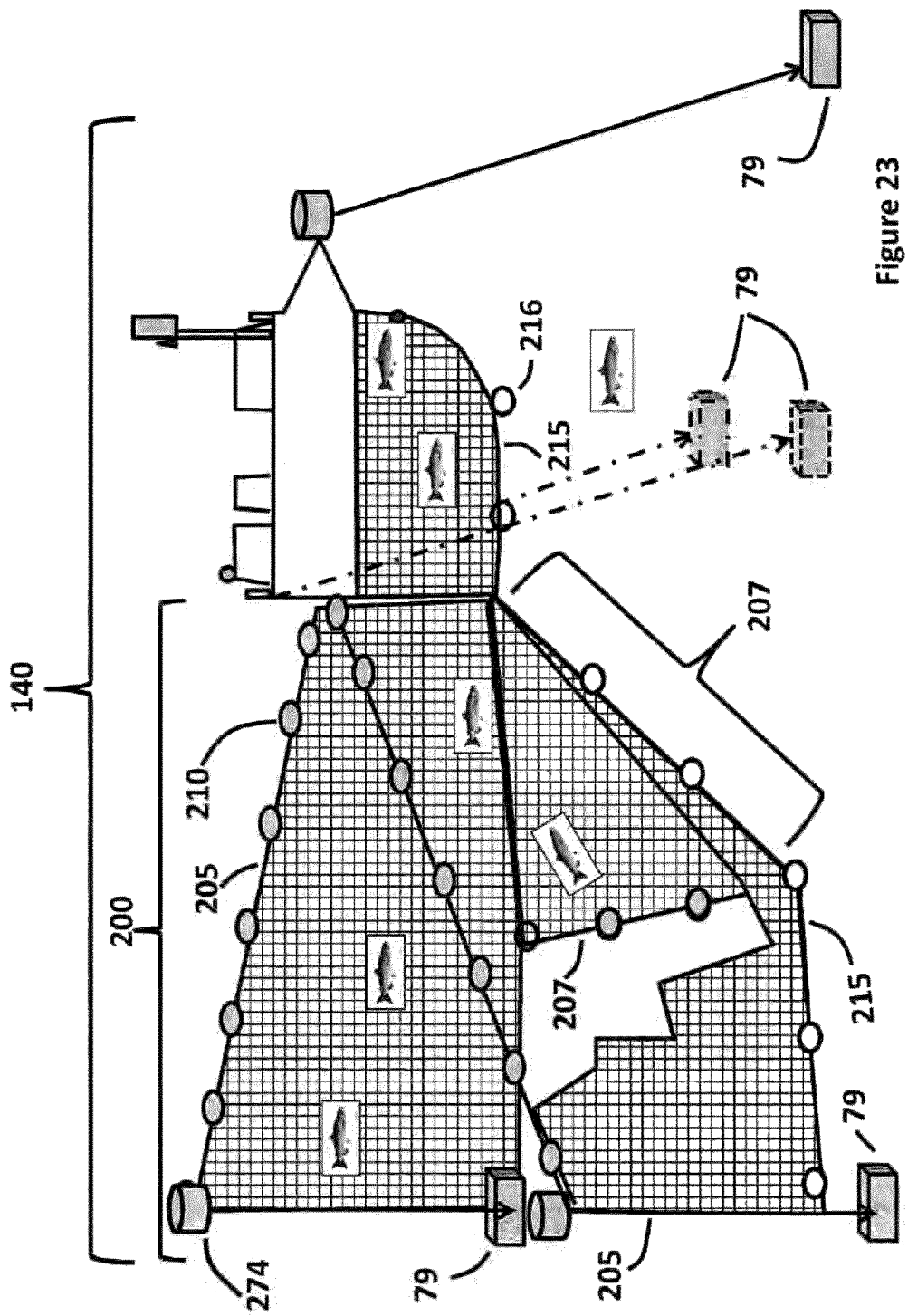
FIG. 23 is a schematic diagram of a fixed in place deep wing net anchoring system with a sloping triangular bottom net of a selective fish capture system in operation, according to an embodiment of the present disclosure.

According to embodiments of the present disclosure and as illustrated in FIGS. 19, 20, 21, 22 and 23, the selective fish capture system 140 is stationary and can be deployed in nearshore or offshore water environments of various depths and current speeds. According to certain embodiments, the selective fish capture system 140 is designed to sustain water current speeds of between 0.3 ft./s to 1.6 ft./s (0.1 to 0.5 meters/second (m/s)). The selective fish capture system 140 is further designed to be deployed in shallow near-shore water depths as well as off-shore water depths. According to certain embodiments as illustrated in FIGS. 19 and 20, the selective fish capture system 140 is designed to be deployed in near-shore water depths of up to 16' (5 m). According to other embodiments as illustrated in FIGS. 21, 22 and 23, the selective fish capture system 140 designed to be deployed in water depths of 16' (5 meters) or deeper. In this way, the selective fish capture system 140 of the present disclosure can be used in environments ranging from placid lake waters and slow moving streams, to harsher river and ocean environments. Deployment of all of these fixed in place embodiments will be limited by the combination of water depth and current speed.

In stationary embodiments, the guidance net 200 will comprise wing nets 205 having dimensions that are suitable for the conditions for deployment. According to embodiments of the present disclosure, the wing nets 205 will range in depth from 3.3' to 13' (1 m to 4 m) and have a length ranging from 29.5' to 59' (9 m to 18 m) or more. Each wing net 205 comprises a plurality of floats 210 attached at regular intervals along the length of the top of the wing net 205. The floats 210 are of an appropriate size, shape, and number that will keep the respective wing net 205 afloat. Each wing net 205 further comprises a weighted line 215 attached along the length of the bottom of the wing net 205 to keep the wing net extended towards the bottom of the water bed. In certain embodiments, additional weights 216 can be attached to the bottom of the wing nets 205 to maintain the position of the wing nets 205.

The wing nets 205, according to stationary embodiments, are set in the desired configuration by anchoring means that temporarily fix the wing net 205 to the bottom of the water body. According to certain embodiments, the anchoring means is attached to at least the terminal end of each wing net 205 to fix and maintain the wing net 205 in the widening configuration that extends from the entry of the containment enclosure 48. According to further embodiments, the anchoring means is attached along the length of the respective wing net 205 to fix and maintain the wing net 205 in a desired configuration.

Stationary Near Shore Selective Fish Capture Systems

According to one embodiment, the selective fish capture system 140 is for deployment in shallow water and utilizes a fixed in place fish guidance net 200 that comprises a pair of wing nets 205 that are each attached directly to a corresponding side of the connector assembly 85 or 86 at the entry of the containment enclosure 48 to form a contiguous passage leading to the V-shaped entry 80 and into the containment enclosure 48. In other embodiments, as shown in FIG. 19, the selective capture system 140 utilizes a fixed in place fish guidance net 200 that comprises a pair of wing nets 205 that are each attached at their converging ends to a narrow passageway 222 which is attached to the connector assembly 85 or 86 at the entry of the containment enclosure 48 to form a contiguous passage leading to the V-shaped entry 80 and into the containment enclosure 48. In certain embodiments, the fixed in place selective fish capture system 140 includes a protection gate 230 which is inserted at the junction of the fixed end of the wing nets 205 and the narrow passageway 222 to block pinnipeds or large sturgeon from entering the containment enclosure 48. In such embodiments, the free end of each wing net 205 extends outwards from the entry of the containment enclosure 48 to form a progressively widening configuration to collect and funnel fish towards the containment enclosure 48.

According to further embodiments, the selective fish capture system 140 can further comprise a heart shaped enclosure 224. In one embodiment, the pair of wing nets 205 are each attached directly to the heart shaped enclosure 224 that is directly connected to the connector assembly 85 or 86 to form the contiguous passage leading to the V-shaped entry 80 and into the containment enclosure 48. In another embodiment, as shown in FIG. 20, the pair of wing nets 205, at their converging ends, are attached directly to a heart shaped enclosure that is attached to the narrow passageway 222 which is fixed to the connector assembly 85 or 86 at the entry of the containment enclosure 48 to form the contiguous passage leading to the V-shaped entry 80 and into the containment enclosure 48. In certain embodiments, a protection gate 230 is inserted at the junction of the fixed end of the wing nets 205 and the heart shaped enclosure 224 to block pinnipeds or large sturgeon from entering the containment enclosure 48. In these embodiments, the heart shaped enclosure 224 and the free end of each wing net 205 extends outwards from the entry of the containment enclosure 48 to form a progressively widening configuration to collect and funnel fish towards the containment enclosure 48.

The protection gate 230 included in certain embodiments, may be of any suitable size and bar spacing. According to certain embodiments, the protection gate 230 is up to 6.5 ft. (2 m) high and up to 5 ft. (1.5 m) wide, and have a bar spacing that is suitable to prevent pinnipeds and large sturgeon from passage. Such bar spacing, according to embodiments, is up to 0.5 ft. (0.15 m) apart.

Near-Shore Wing Net

In shallow near-shore applications as illustrated in FIGS. 19, 20, 24, 25 and 26, the selective fish capture system 140 of the present disclosure comprises anchoring means attached along the length of each respective wing net 205 that extends from the top of the net 205 to the bottom. The anchoring means comprise a plurality of removable posts 252 that are attached along the length of the wing net 205 to fix the wing net 205 in the desired configuration. These removable posts 252 can be employed in combination with a singular anchoring piling 251 or a plurality of anchoring pilings 251 that may be existing at a site or can be installed at a site to complement any other anchoring means. In this way, the wing nets 205 can be arranged in a variety of configurations, as described, without limitation.

Figure 24:
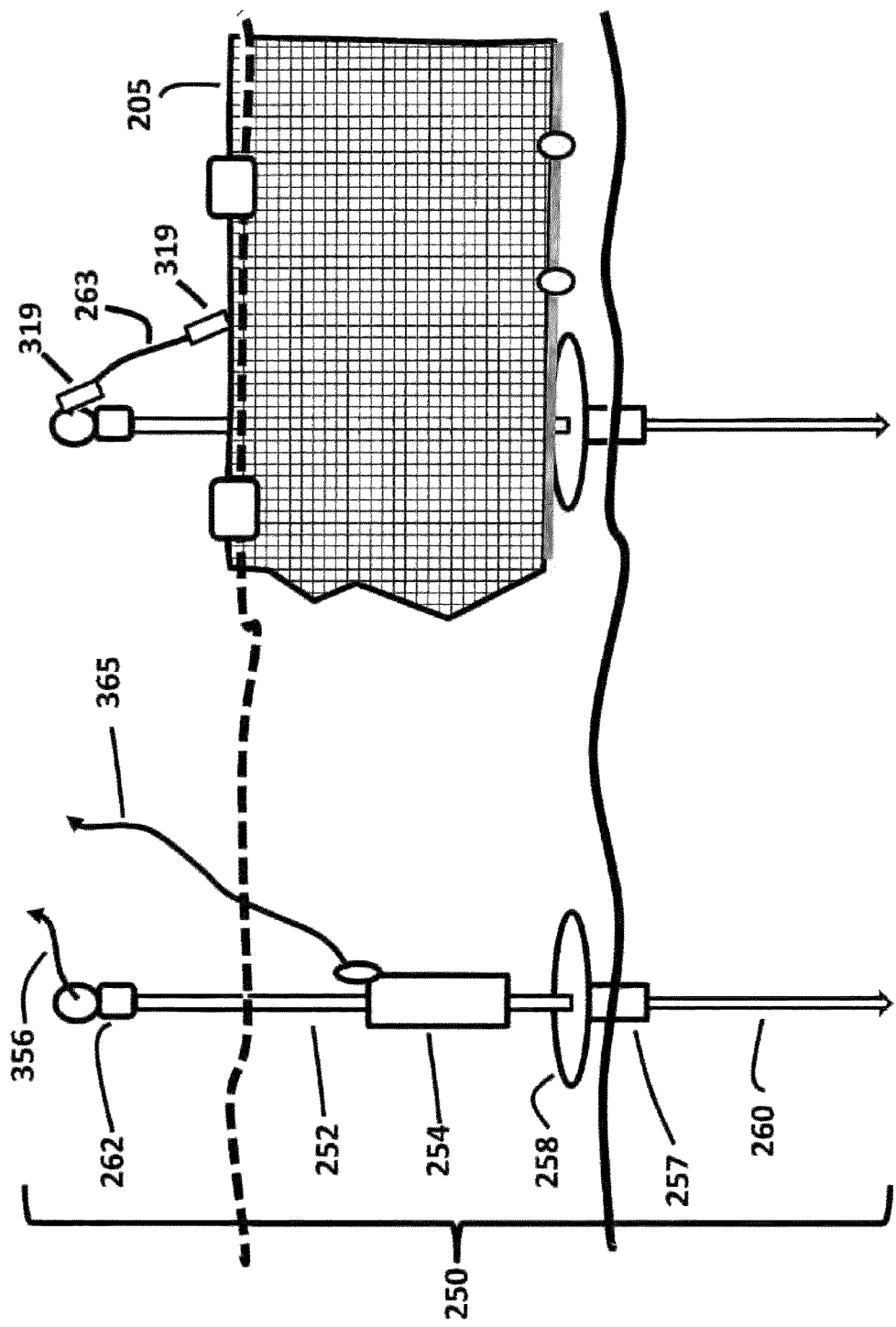
FIG. 24 is a close up schematic diagram of a post based fixed anchoring system for the wing and heart shaped guidance nets of a selective fish capture system, according to a further embodiment of the present disclosure.

According to embodiments of the present disclosure, the anchoring means is an anchoring system 250 that comprises a post 252 with a removable slide hammer apparatus 254 for driving the post 252 into the near-shore water bed without the need for expensive anchoring pilings 251 or cumbersome pile driving equipment (FIG. 24). According to such embodiments, the posts 252 can be deployed in near-shore water beds having a soft bottom of gravel, sand, mud, or having a heavy rock cobble bottom.

Figure 25:
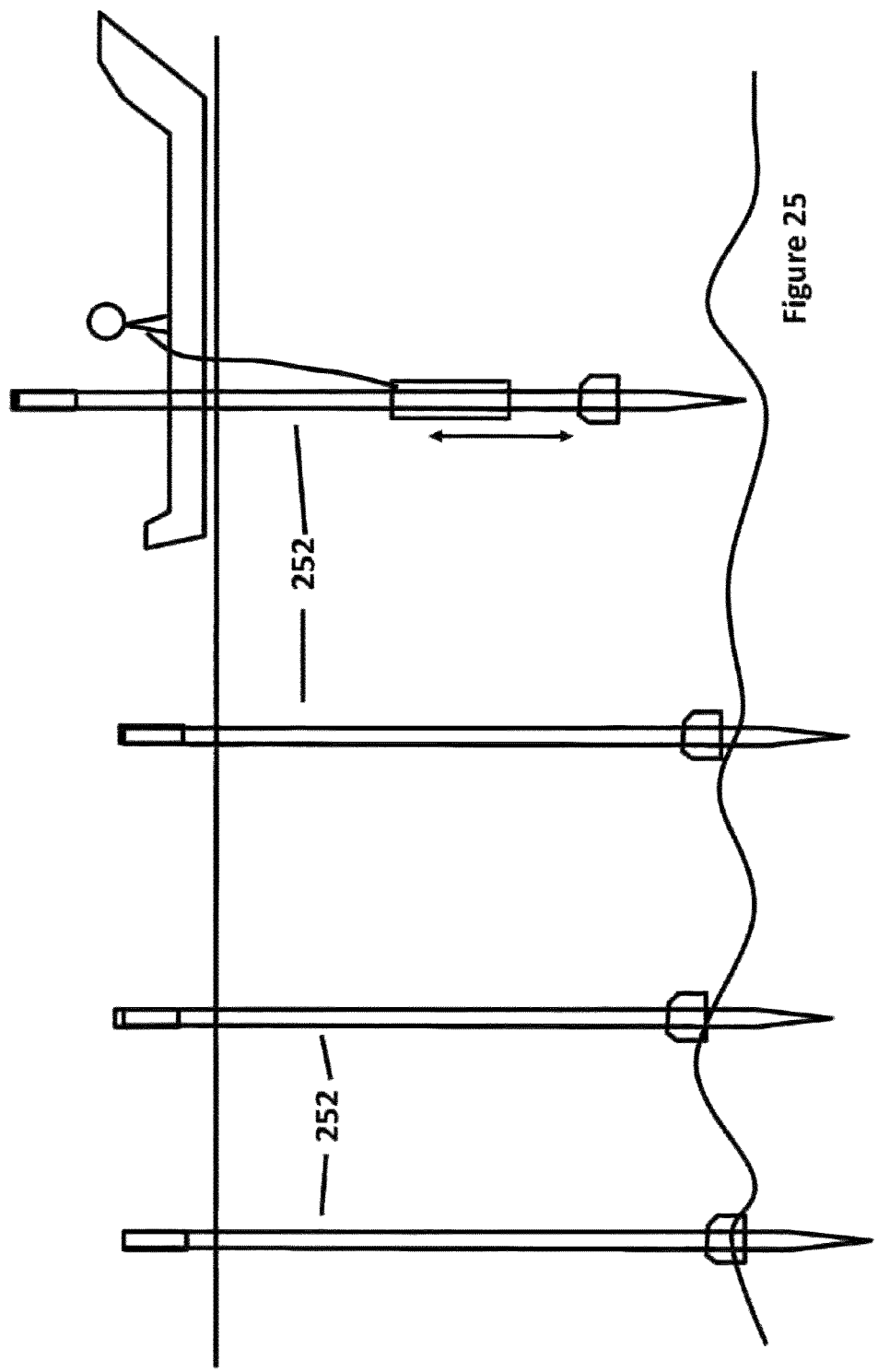
FIG. 25 is a close up schematic diagram of the installation of multiple posts for fixed anchoring of shallow wing and heart shaped guidance nets, according to a further embodiment of the present disclosure.

Referring to FIGS. 24 and 25, the anchoring system 250 includes a post 252 having a length that is suitable for the depth of the water body. The post 252 is typically a metal post that is non-corroding in water such as aluminum, or galvanized steel. The post 252 is adapted to detachably connect to a suspension cap 262 at its top end and at its bottom end detachably inserted into the top of a percussion coupling 257 which is welded to a percussion plate 258. The top of the percussion coupling 257 is mounted into a concentric hole in the percussion plate 258 and welded flush to the top of the center of the percussion plate 258. The percussion plate 258 can be of any thickness and dimension. According to certain embodiments, the percussion plate 258 can be square or round in shape with a diameter of between 0.3 ft. to 0.5 ft. (0.10 m to 0.16 m), and have a thickness of up to 0.03 ft. (0.010 m). An anchor tip 260 of appropriate diameter and variable length is adapted to detachably connect to the bottom side of the percussion coupling 257. According to certain embodiments, the anchor tip 260 is a solid steel bar having a connecting end that is adapted to matingly connect to the bottom end of the percussion coupling 257, and a pointed end for driving into the ground or bottom sediment of a water body. A detachable slide hammer 254 having a longitudinal central bore sized to receive the post 252 is mounted concentrically on the post 252 such that the slide hammer 254 can slide along the length of the post 252. The slide hammer 254 is connected to a detachable slide hammer lift cable 365 to permit the slide hammer 254 to be slidingly raised along the length of the post 252 towards the top end of the post 252 and released to allow the slide hammer 254 to fall and strike the percussion plate 258 thereby creating a driving force which drives the anchor tip 260 into the water bed. The suspension cap 262 is adapted to matingly connect to the top end of the post 252. As shown in FIGS. 24 and 25, the suspension cap 262 can be released from the post 252 to insert the slide hammer 254 onto the post 252 or to remove the slide hammer 254 from the inserted post 252 and transfer the slide hammer 254 to the next post 252 requiring insertion.

Figure 27:
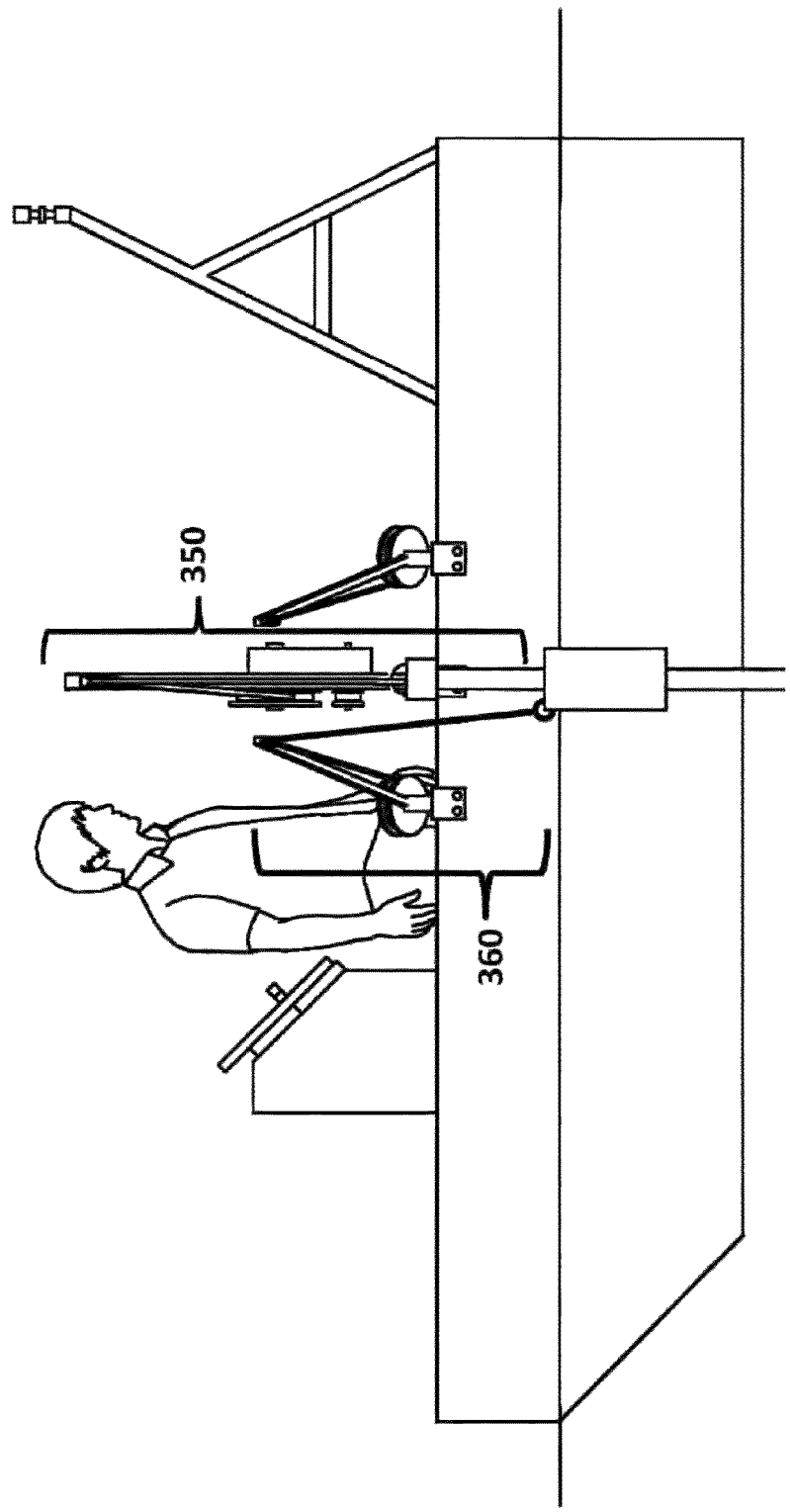
FIG. 27 is a front view close up schematic diagram of a boat platform using a winch based anchoring system to install and extract posts in shallow water, according to a further embodiment of the present disclosure.
Figure 28:
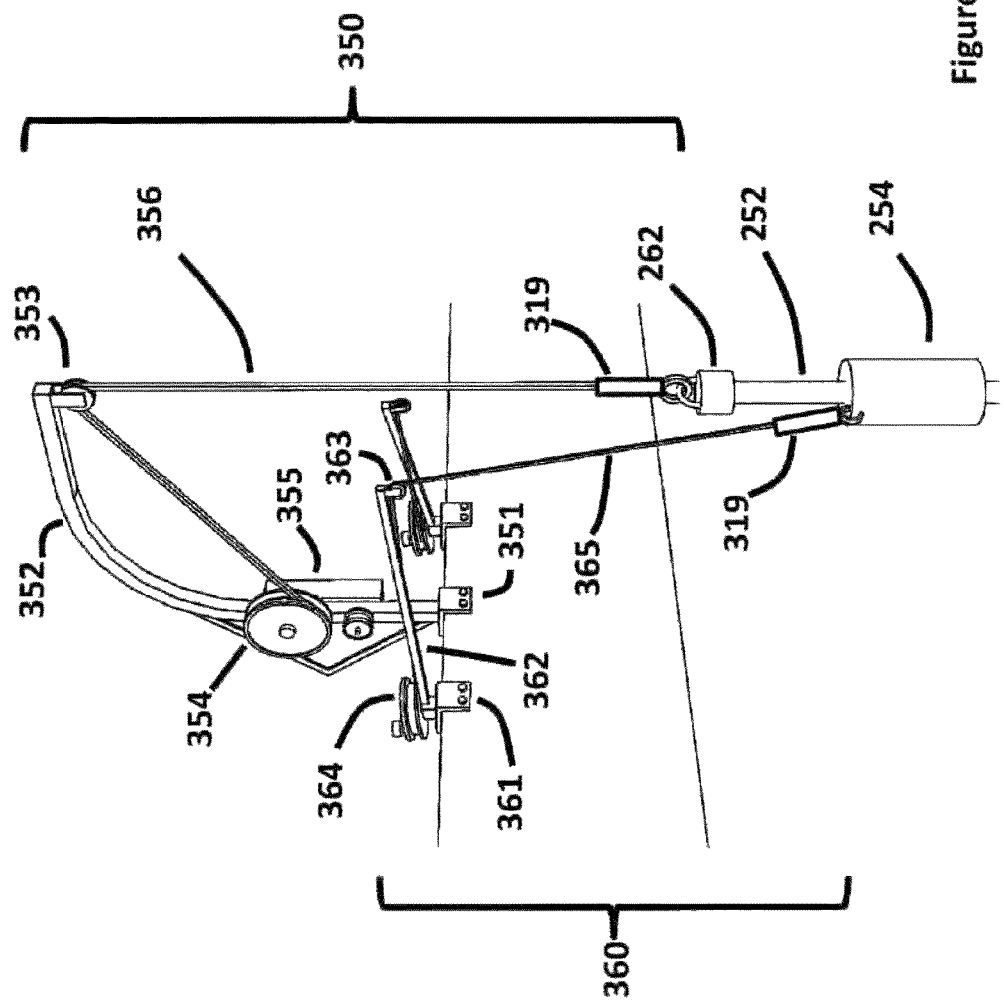
FIG. 28 is a side view close up schematic diagram of a boat platform winch based anchoring system to install and extract posts in shallow water, according to a further embodiment of the present disclosure.
Figure 29:
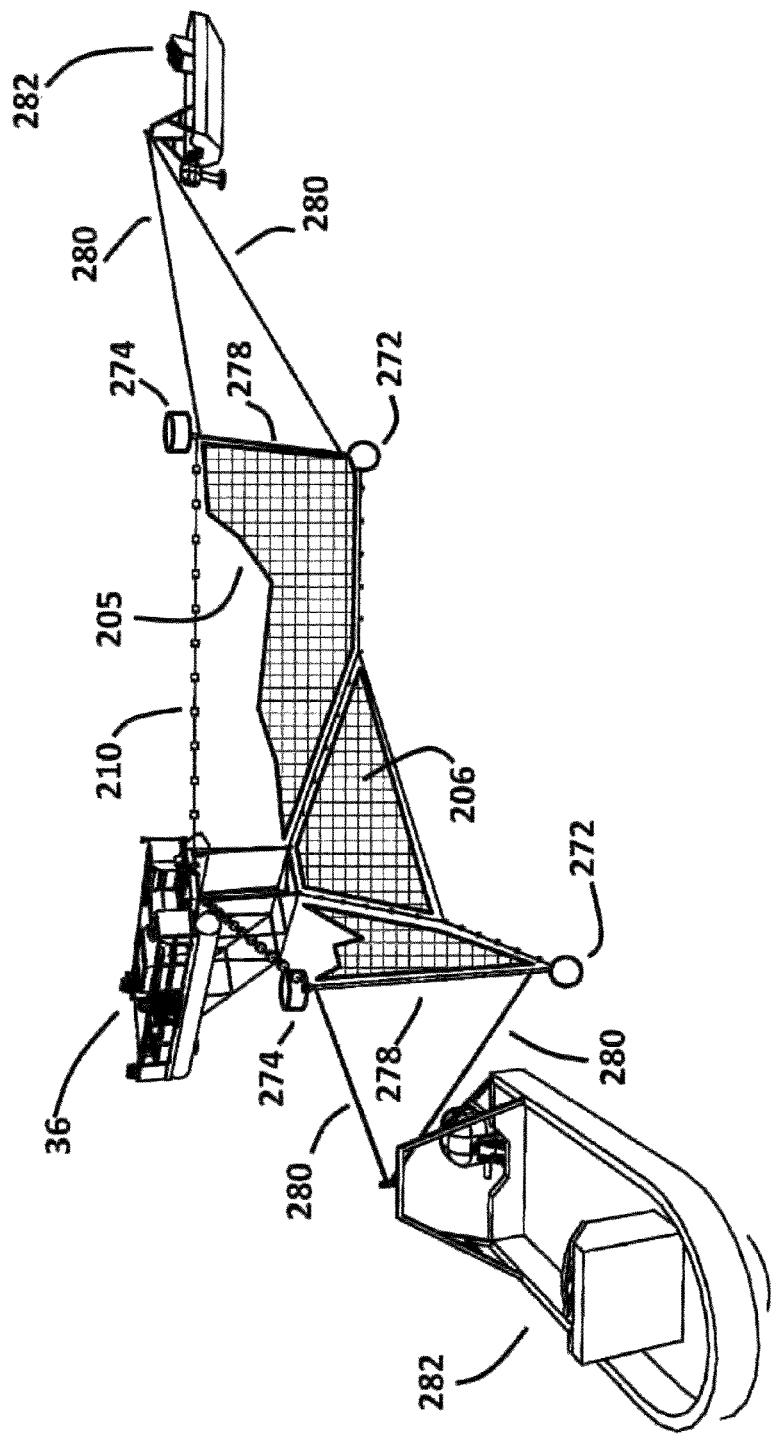
FIG. 29 is a front perspective view of a mobile selective fish capture system in operation with shallow wing nets and a parallel triangular bottom net, according to a further embodiment of the present disclosure.
Figure 30:
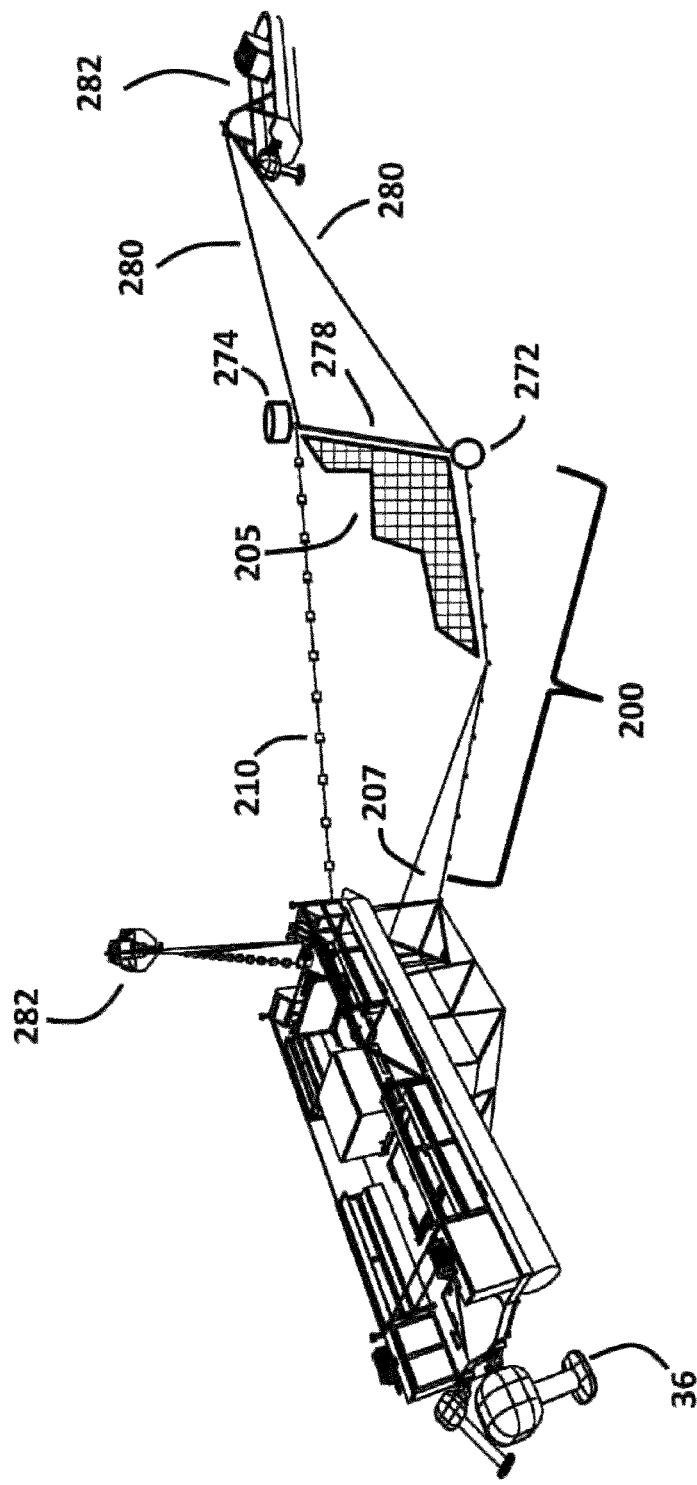
FIG. 30 is a rear perspective view of a mobile selective fish capture system in operation with deep wing nets and a sloping triangular bottom net, according to a further embodiment of the present disclosure.

The anchoring system 250 can be deployed from a boat (FIGS. 25, 26, 27), dock, crane, cable car, helicopter, or manually. According to certain embodiments, the anchoring system 250 is deployed by a post winch system 350 and a slide hammer winch system 360 (FIGS. 27, 28). In one embodiment the post winch system 350 consists of a post winch support clamp 351 connected to a post winch support bar 352, connected to a post winch pulley 353 and a post winch cable dispenser 354 and post winch motor 355. A post winch cable dispenser 354 dispenses a detachable lift cable 356 through the post winch pulley 353 to connect a detachable cable clip 319 to the post suspension cap 262. A post winch motor 355 can rotate the post winch cable dispenser 354 in one direction to lower the post 252 and in another direction to raise the post 252. In another embodiment the slide hammer winch system 360 consists of a slide hammer winch support clamp 361 connected to a slide hammer support bar 362, connected to a slide hammer winch pulley 363 and a slide hammer winch cable dispenser 364. A slide hammer winch cable dispenser 364 dispenses a detachable lift cable 365 through the slide hammer winch pulley 363 to connect a detachable cable clip 319 to the slide hammer 254. The slide hammer winch cable dispenser 364 can rotate in one direction to lower the slide hammer 254 and in another direction to raise the slide hammer 254. In operation, the post winch motor 355 can be used to lower the anchoring system 250 until the anchor tip 260 touches the water bed. The slide hammer lift cable 365 dispenses from the slide hammer winch cable dispenser 364 in proportion to dispensation of the post winch cable 356. The slide hammer lift cable 365 is then raised manually to lift the slide hammer 254 to the upper limit of the post 252 and then the slide hammer lift cable 365 is released allowing the slide hammer 254 to freefall and strike the percussion plate 258. The slide hammer 254 impacts the percussion plate 258 and drives the anchor tip 260 into the water bed. The slide hammer 254 is raised manually and dropped in freefall repeatedly until the percussion plate 258 contacts the water bed. Once fully inserted, the suspension cap 262 is temporarily removed to remove the slide hammer 254 from the inserted post 252 and transfer the slide hammer 254 to the next post 252 to be inserted.

Figure 26:
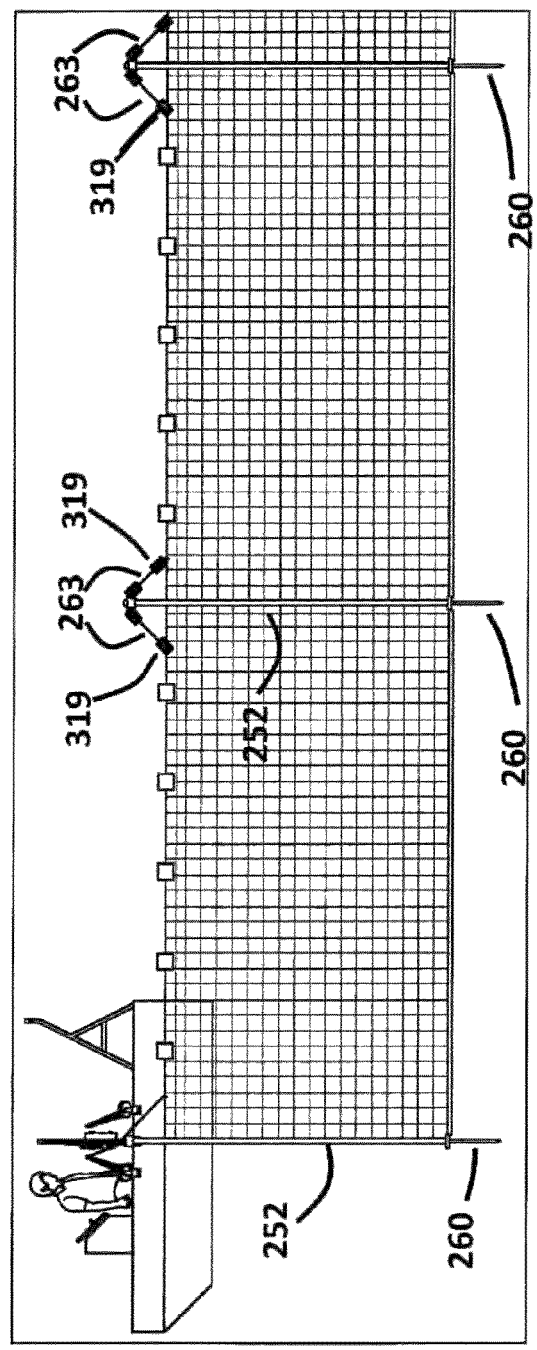
FIG. 26 is a schematic diagram of the installation of multiple posts and nets for fixed anchoring of shallow wing and heart shaped guidance nets deployed from a boat platform using a winch based anchoring system, according to a further embodiment of the present disclosure.

The wing nets 205 are secured to the posts 252 by suspension snubbers 263 which may be elastic and have detachable cable clips 319 at either end (FIGS. 24, 26). The detachable cable clips 319 may be attached to the top or lower mesh loops of the wing nets 205 to adjust the height of the wing net 205 to accommodate changing water depths and flow conditions Stationary Deep Water Selective Fish Capture Systems According to further embodiments, as shown in FIG. 21, the selective fish capture system 140 can be configured for deployment in deep water. Such embodiments utilize an anchored fish guidance net 200 that comprises a pair of wing nets 205 that are each attached directly to a corresponding side of the connector assembly 85 or 86 at the entry of the containment enclosure 48 to form a contiguous passage leading to the V-shaped entry 80 and into the containment enclosure 48. In another embodiment as shown in FIG. 22, the selective capture system 140 is anchored in deep water that utilizes a fixed in place fish guidance net 200 that comprises a pair of wing nets 205 with a parallel triangular base net 206 that are each attached to each other and at their converging ends fixed to the connector assembly 85 or 86 at the entry of the containment enclosure 48 to form a contiguous passage leading to the V-shaped entry 80 and into the containment enclosure 48. In another embodiment as shown in FIG. 23, the selective fish capture system 140 anchored in deep water that utilizes a fixed in place fish guidance net 200 that comprises a pair of wing nets 205 with deep net depth and an upwards sloping triangular base net 207 that are each attached to each other and at their converging ends fixed to the connector assembly 85 or 86 at the entry of the containment enclosure 48 to form a contiguous passage leading to the V-shaped entry 80 and into the containment enclosure 48.

Containment Net Stabilization System

Figure 50:
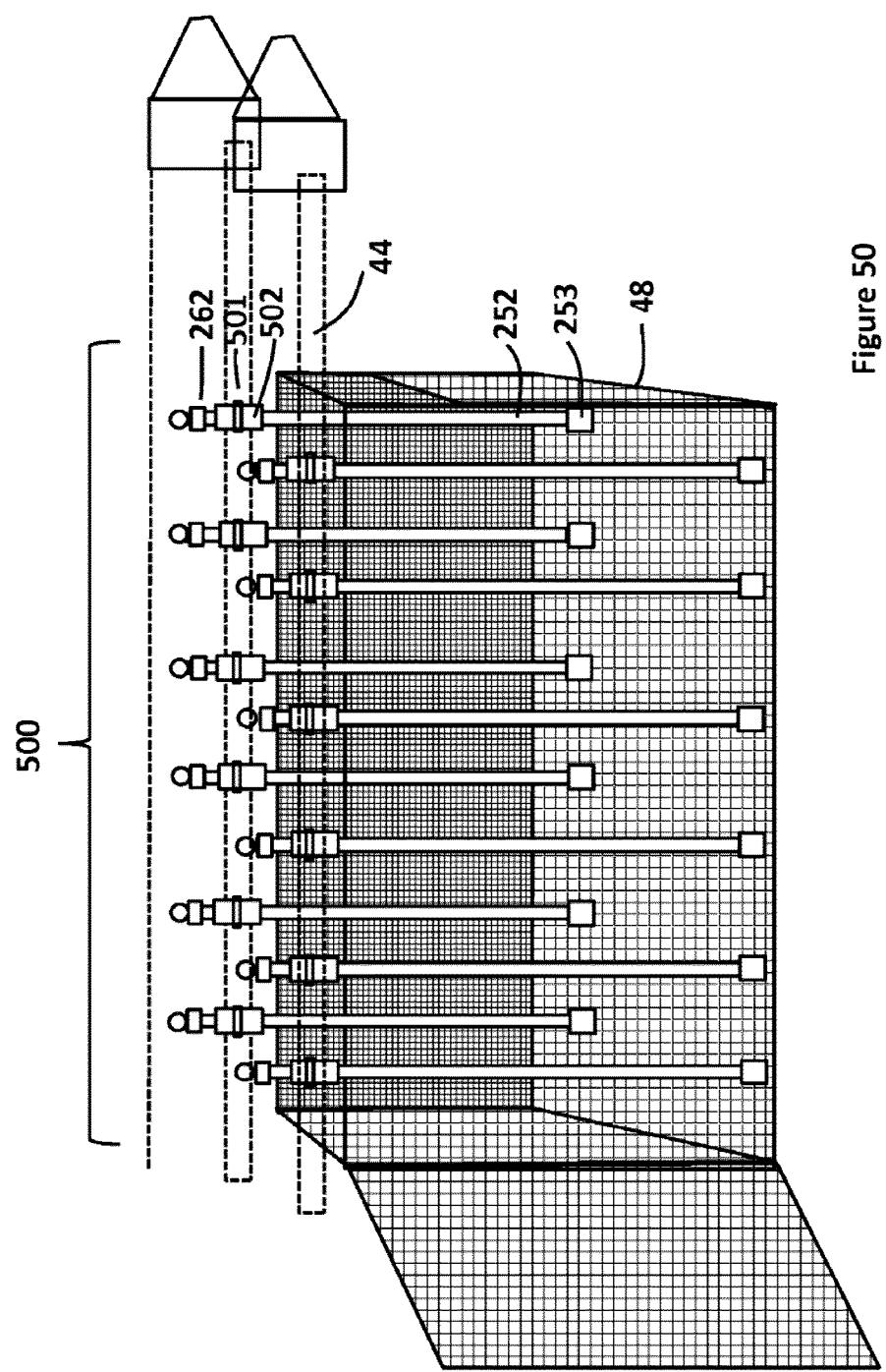
FIG. 50 is a front perspective of the containment net with a plurality of containment net stabilization posts mounted in slidable brackets which are attached to the inside surfaces of the transverse cross beams and longitudinal curtain track I beams or C Channels. The stabilization posts may be singular or multiple in number according to embodiments of the present disclosure.
Figure 51:
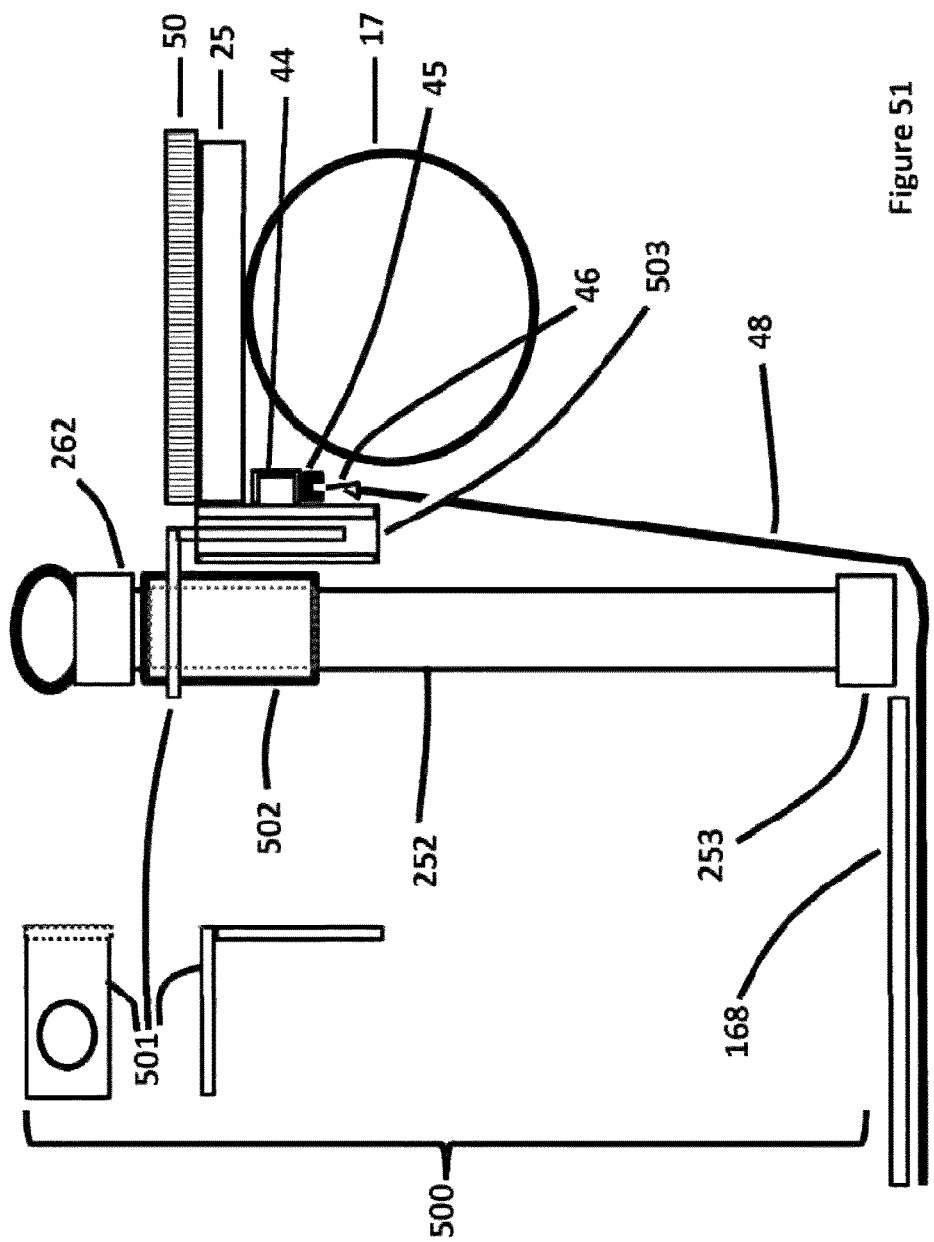
FIG. 51 is a side cross section perspective of the containment net shown in FIG. 50.

According to further embodiments, as shown in FIGS. 50 and 51, the containment enclosure 48 can be stabilized for use in faster stream currents using a net stabilization pole assembly. According to certain embodiments, the net stabilization pole assembly comprises a post 252 inserted into a sliding sleeve 502 which has a stabilization plate 501. The post 252 has a suspension cap 262 attached at the top. The post 252 is inserted into the sliding sleeve 502 and a post bottom cap 253 is attached to the bottom of the post 252 forming a stabilization pole assembly. A plurality of vertical stabilization brackets 503 are attached by welding them to the transverse cross beams 25 and curtain track I beams or C Channels 44. To stabilize the containment enclosure 48, a stabilization pole assembly 252 comprising one or a plurality of posts 252 are inserted into corresponding stabilization brackets to form the containment net stabilization system 500.

Seine Net Connector System

Figure 52:
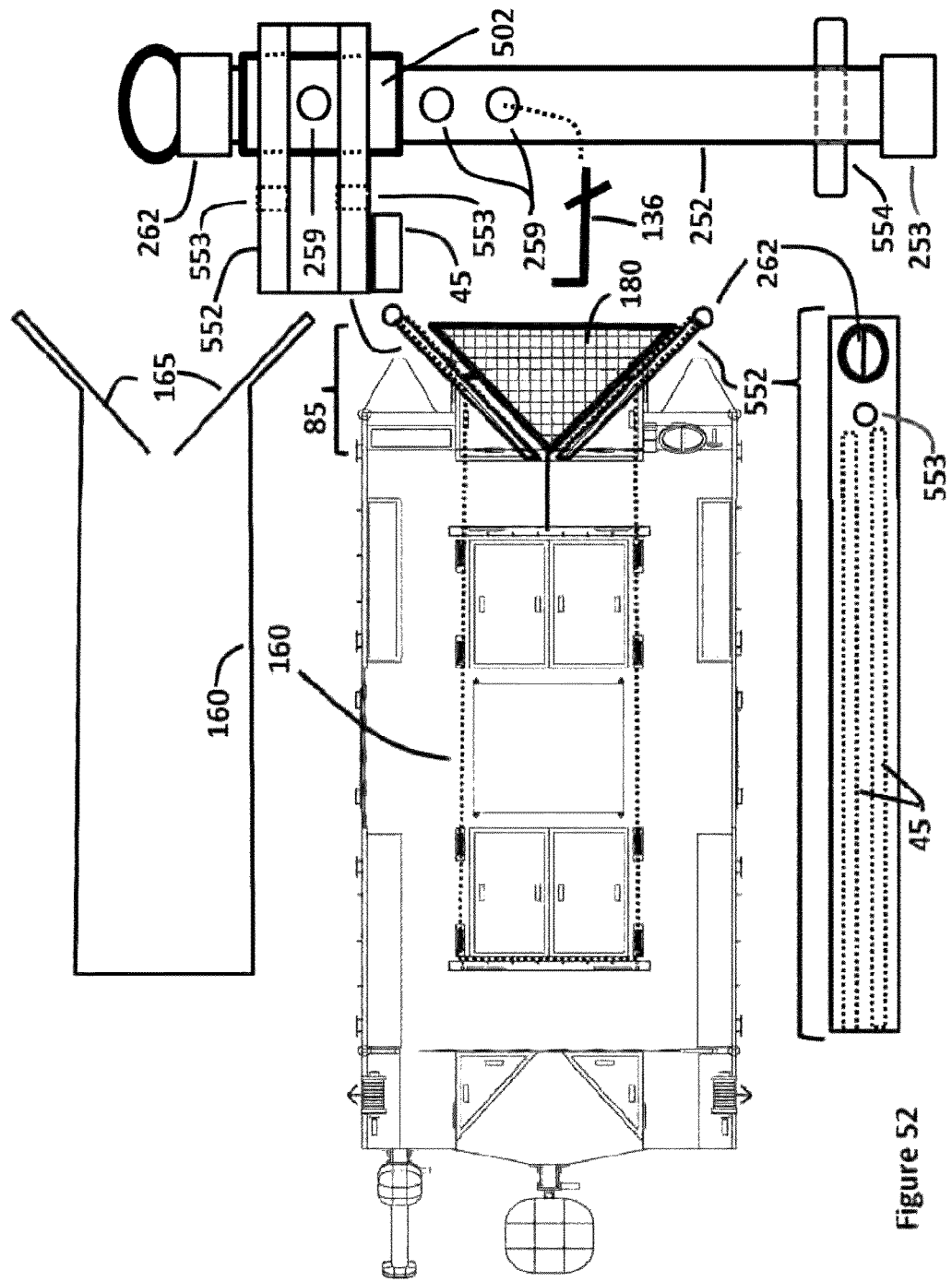
FIG. 52 is a top view perspective of the platform with the front connector modified with front connector extension bars and stabilization posts mounted in slidable brackets at the distal end of the extension bar.
Figure 53:
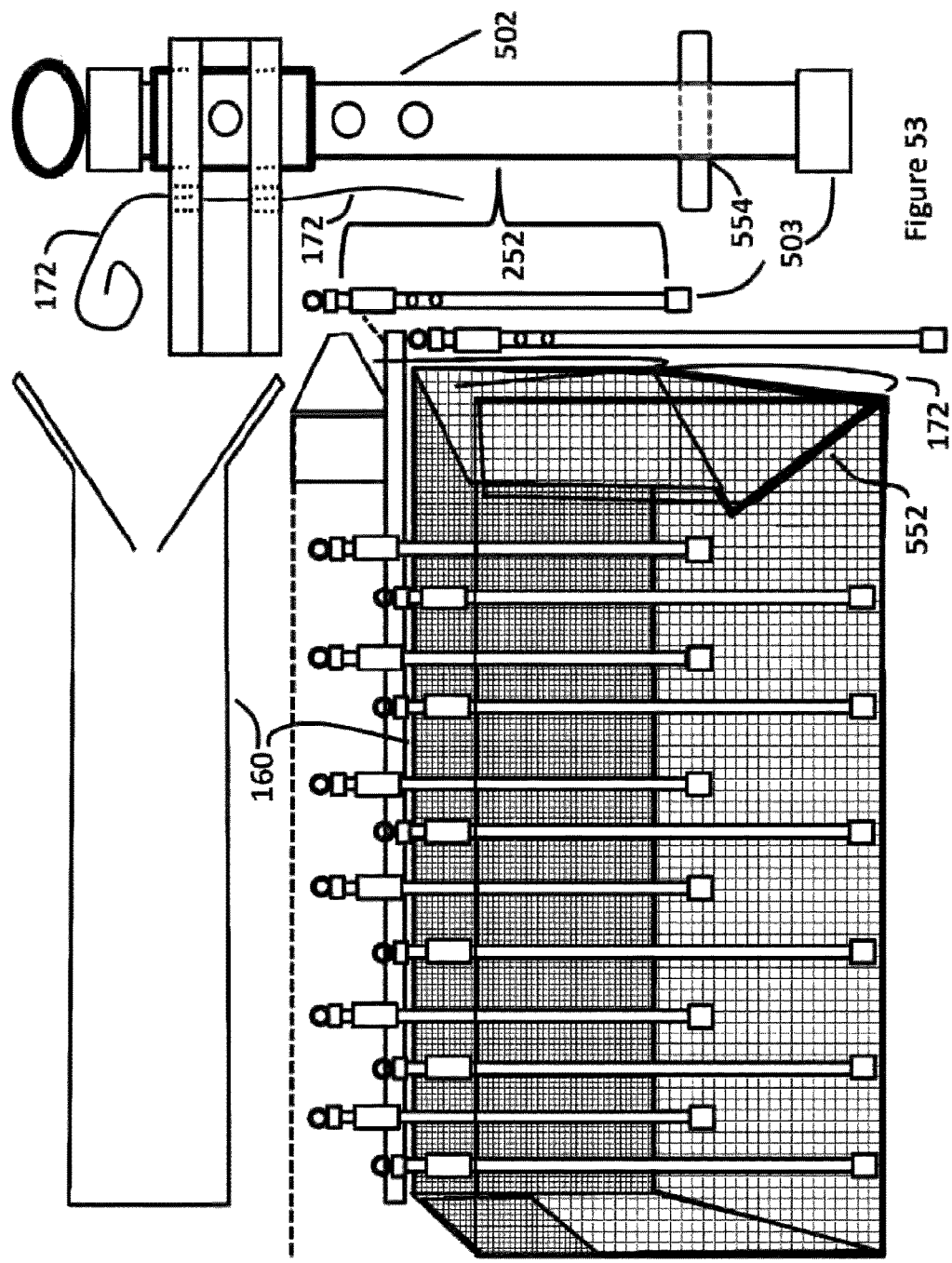
FIG. 53 is a side view perspective of the containment net shown in FIG. 52.
Figure 54:
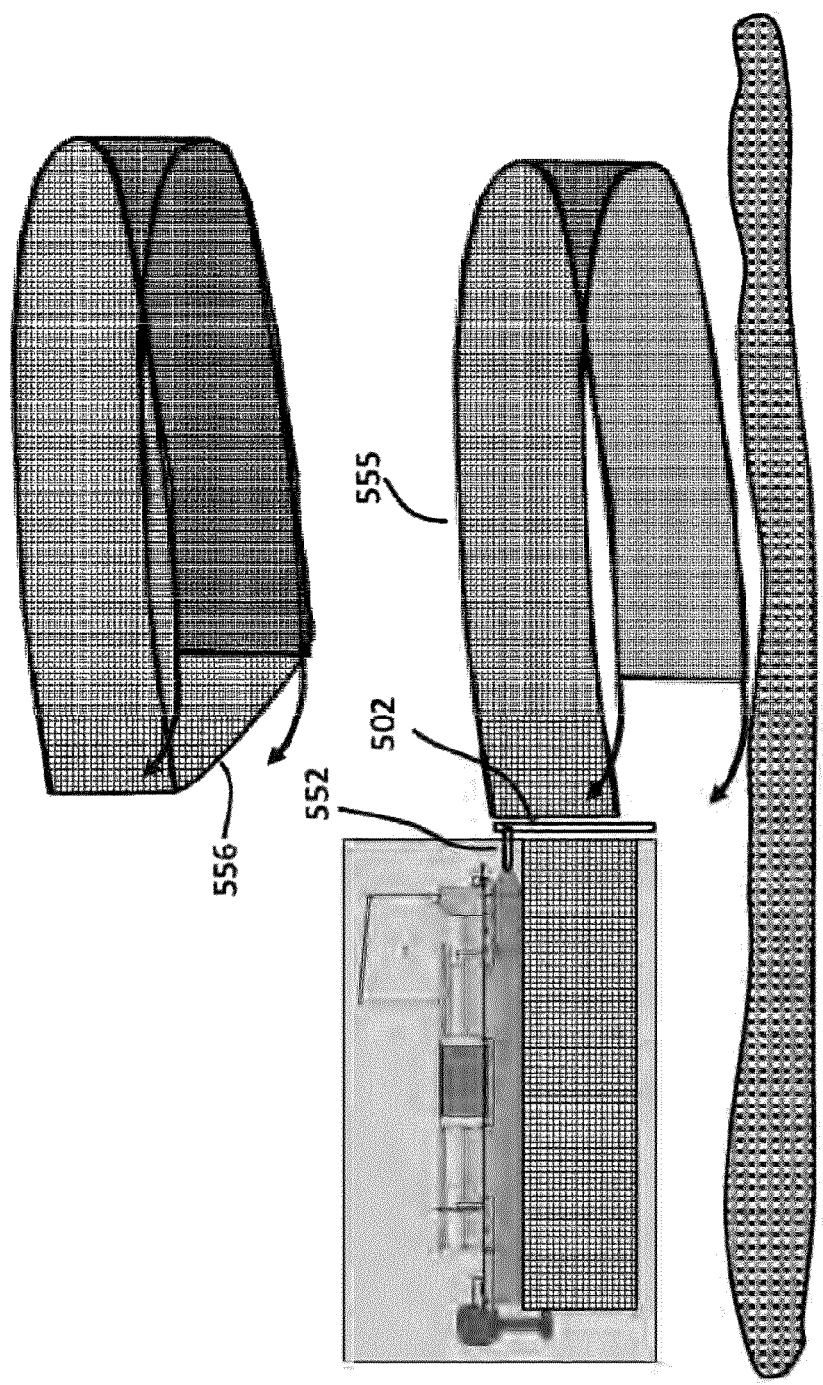
FIG. 54 is a side view of the platform shown in FIG. 52 adapted with a beach seine net having an open bottom, or a purse seine net having a closed bottom, connecting to the seine net connector system, according to embodiments of the present disclosure.

According to further embodiments, as shown in FIGS. 52 and 53 and 54, the front connector assembly 85 can be modified with a front connector extension bar 552 of variable length to allow the front connector assembly 85 to connect to a beach seine net 555 which does not have a net bottom or a purse seine net 556 which does have a net bottom. The front connector extension bar 552 will have one or two curtain track rail assemblies 45 on the underside and a spreader bar lift rope hole 553 at the distal end through which the net lift lines 172 can be inserted to allow lifting of the triangular spreader bar 180. The front connector extension bar 552 will have a stabilization sliding sleeve 502 protruding vertically through and welded to the far distal end of the front connector extension bar 552. A suspension cap 262 is attached to the top of the post 252 and then the post 252 is inserted into the top of the stabilization sliding sleeve 502. An optional seine net engagement pin 554 may be inserted into the bottom of the post 252. A post bottom cap 253 is then attached to the bottom of the post 252. The post 252 can slide down till it is suspended freely when used with a beach seine 555 where the bottom of the post will contact the bottom of the water body and can slide up and down when the platform 50 is impacted by waves. The post 252 can be allowed to lower till it is suspended in a fixed position by inserting gate frame locking pins 136 into one of the plurality of post anchor pin holes 259 when used in deep water with a purse seine 556 where the bottom of the post 252 will not contact the bottom of the water body and not be impacted by waves. The entrance panels 165 of the containment net 160 may be extended to measure the length of one or both of the curtain track rail assemblies 45 on the underside of the front connector extension bar 552.

Mobile Fish Capture System

The interconverting design of the pontoon platform 10, the suspended containment net 160, and the guidance net 200, make the selective fish capture system 140 versatile to multiple configurations. According to certain embodiments, the selective fish capture system 140 described for stationary deployment can be adapted for mobile applications. In such embodiments, the system is not anchored or fixed in any manner to the water bed but is allowed to drift or be towed through the water body. In this way, the selective fish capture system can be maneuvered through a water body to intercept travelling fish for selective capture.

The mobile deployment of the selective fish capture system 140 can be from either the bow or the stern of the pontoon platform 10 such that the entry of the containment enclosure 48 and the extending guidance net 200 is at the bow or the stern. As shown in FIGS. 29, 30, 31 and 32, the net assembly can be deployed from the bow of the pontoon platform 10 in mobile embodiments to avoid interference with the outboard engine 36 at the stern.

To adapt the selective fish capture system 140 from a stationary embodiment to a mobile embodiment, the terminal end of each wing net 205 will be adapted to include a tow pole 278 that extends the width of the terminal end of the wing net 205. The tow pole 278 includes a top end to which is attached a support float 274 and may have a weight 272 at the bottom end of the tow pole 278 to maintain the wing net 205 in the vertical position. The top end and the bottom end of the tow pole 278 are further adapted to detachably connect to tow lines 280 that connect the terminal ends of the wing nets 205 to a tow boat 282. The tow boats 282 will be positioned to maintain the wing nets 205 in the widening triangular configuration extending from the entry of the containment enclosure 48.

Figure 31:
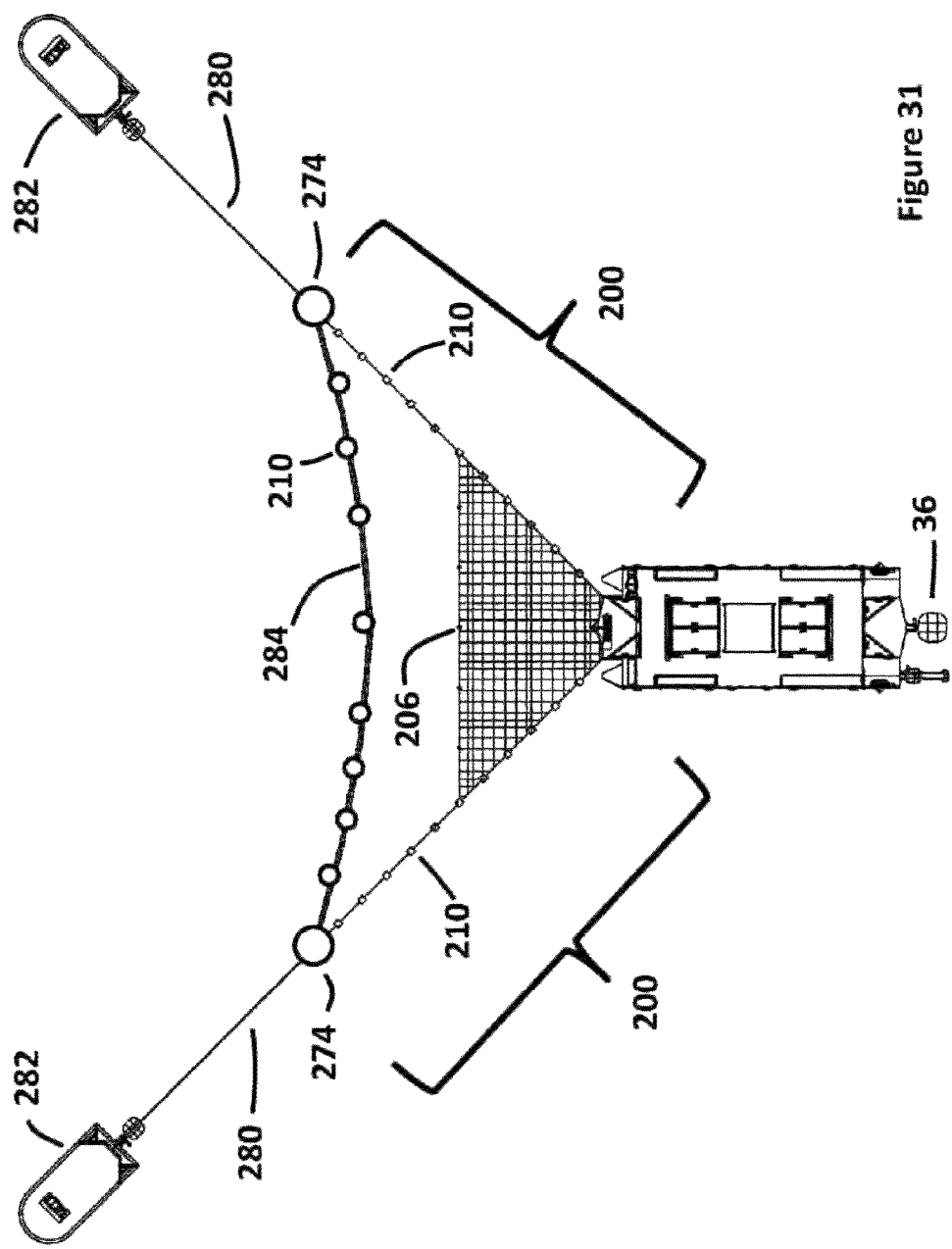
FIG. 31 is an aerial top view of a mobile selective fish capture system in operation with shallow wing nets, a triangular net bottom and a debris guard, according to a further embodiment of the present disclosure.
Figure 32:
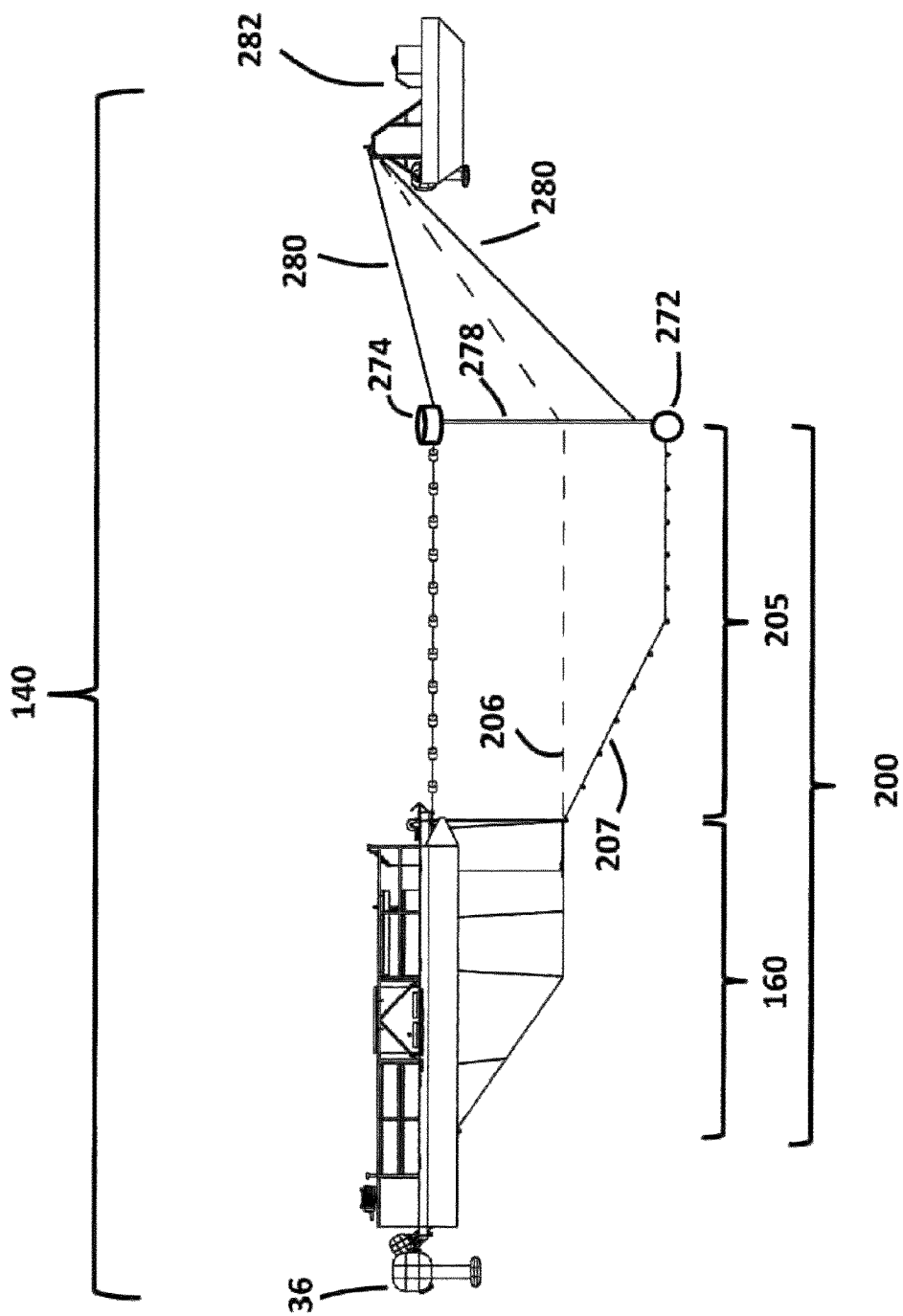
FIG. 32 is a side view schematic diagram of the mobile selective fish capture system with a shallow wing nets and deep wings net demarcation, according to a further embodiment of the present disclosure.

According to one embodiment, as shown in FIGS. 29, 30, 31 and 32, the mobile selective fish capture system 140 deployed in deep water utilizes a towed fish guidance net 200 that comprises a pair of wing nets 205 that are each attached directly to each side of the connector assembly 85 or 86 at the entry of the containment enclosure 48 to form a contiguous passage leading to the V-shaped entry 80 and into the containment enclosure 48. In another embodiment as shown in FIGS. 31 and 32, the selective fish capture system 140 towed in deep water utilizes a towed fish guidance net 200 that comprises a pair of wing nets 205 with a parallel triangular base net 206 that are each attached to each other and at their converging ends fixed to the connector assembly 85 or 86 at the entry of the containment enclosure 48 to form a contiguous passage leading to the V-shaped entry 80 and into the containment enclosure 48. In a further embodiment as shown in FIG. 32, the selective fish capture system 140 towed in deep water utilizes a towed fish guidance net 200 that comprises a pair of wing nets 205 with deep net depth and an upwards sloping triangular base net 207 that are each attached to each other and at their converging ends fixed to the connector assembly 85 or 86 at the entry of the containment enclosure 48 to form a contiguous passage leading to the V-shaped entry 80 and into the containment enclosure 48.

According to certain embodiments, particularly in conditions where changes in the water current can increase the risk of debris entering the containment enclosure 48, a debris barrier 284 can be connected between the terminal ends of the wing nets to span across the opening of the guidance net 200 (FIG. 31). The debris barrier 284, according to embodiments, consists of a rope with a plurality of floats 210 attached along its length to block debris floating on the water surface from entering the opening of the guidance net 200.

No-Touch Fish Transport System

Figure 33:
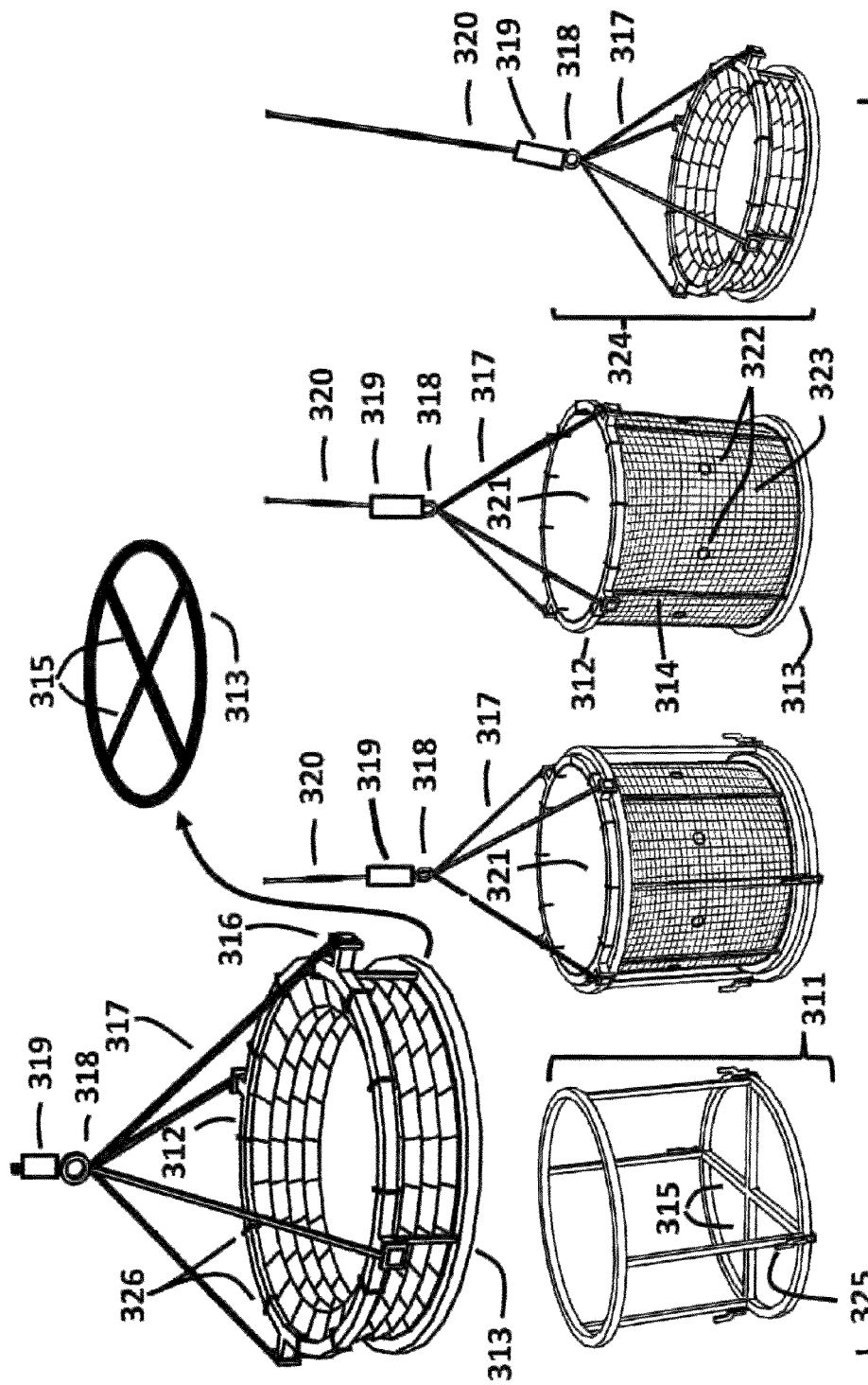
FIG. 33 is a schematic diagram of a circular collapsible fish lift basket and basket frame in separated, combined and collapsed formats according to embodiments of the present disclosure.
Figure 34:
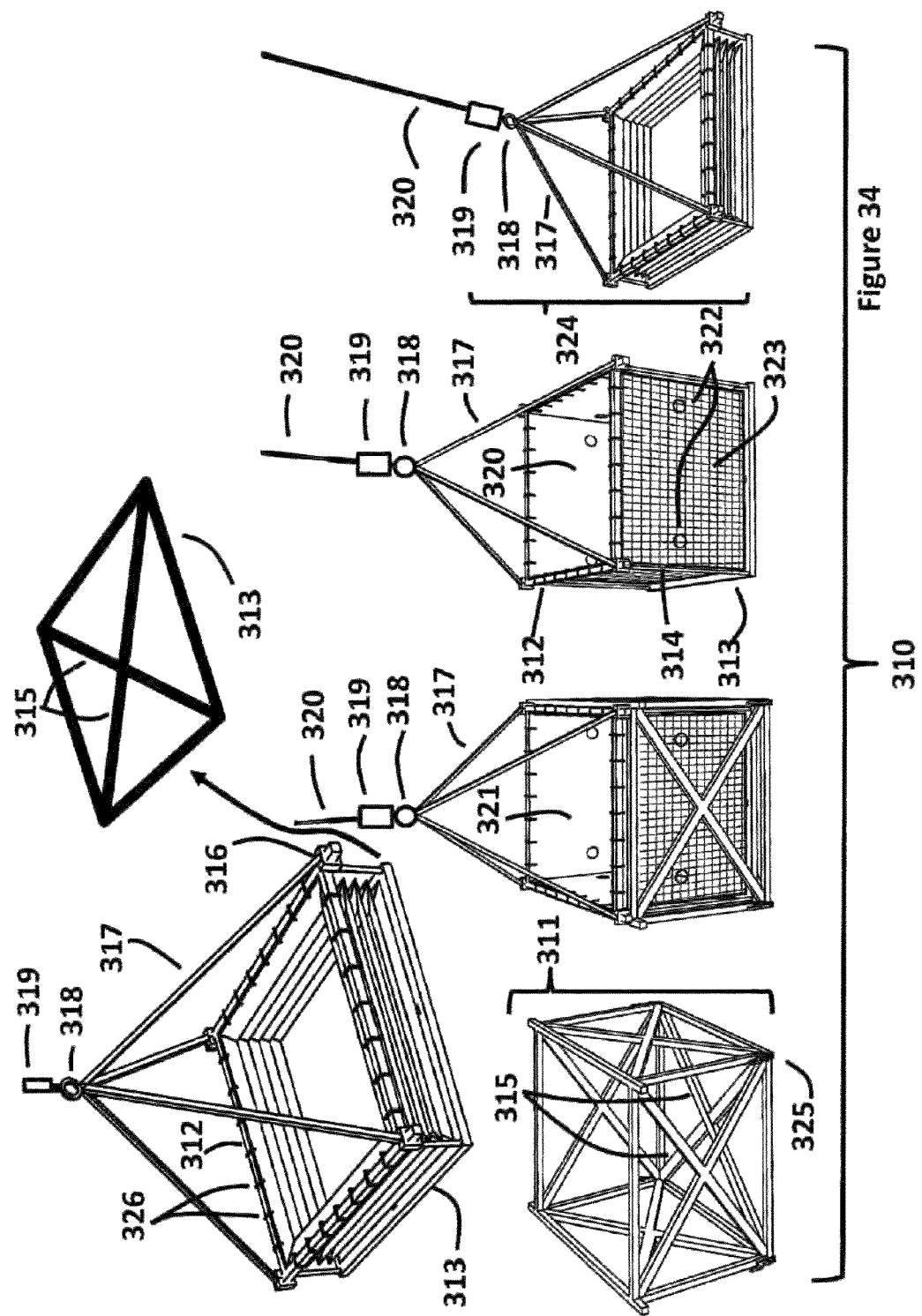
FIG. 34 is a schematic diagram of a cubical collapsible fish lift basket and basket frame in separated, combined and collapsed formats according to embodiments of the present disclosure.

The selective fish capture system 140 will typically include a no touch fish lift system 308 on the main deck plate 50 of the pontoon platform 10 to temporarily hold fish that have been selectively removed from the containment enclosure 48. In one embodiment, the no touch fish lift system may consist of a circular fish lift system 309 (FIG. 33) or in another embodiment a cubical fish lift system 310 (FIG. 34) Fish that have been captured in the containment enclosure 48 can be selectively removed by a dip net, for example, and transferred to the circular fish lift system 309 or in another embodiment a cubical fish lift system 310. In certain circumstances, it may be desired to transport the fish to other locations. It is desirable to ensure that such transport involves minimal contact and air exposure to the fish in order to minimize stress and increase survival rates of the captured fish.

According to certain embodiments, the selective fish capture system 140 can include a no-touch system 308 for removal and transport of the captured fish from the pontoon platform 10. Referring to FIGS. 33 to 38, the circular no-touch system 309 or cubical no-touch system 310 includes a circular fish lift basket system 324 or a cubical fish lift basket system 324 and their corresponding basket support frames 311.

The support frames 311 are constructed of tubular metal (aluminum or steel) welded to form a circular or cubical frame. The bottom of the support frames 311 will have equally spaced diagonal cross members 315 for a circular frame or rectangular cross members 315 for a cubical frame. The support frames 311 will have a plurality of locking clamps 325 on the base that attach to the main deck plate 50 of the pontoon platform 10 to secure the support frames 311 to the pontoon platform 10 and reduce the risk of shifting cargo when the no-touch system 308 for removal and transport of captured fish is in operation. The outside diameter of the collapsible circular or cubical lift basket system 324 will fit inside the diameter of the circular or cubical support frame 311.

The lift basket system 324 includes a top lift frame 312 and a corresponding bottom lift frame 313. The top lift frame 312 is an open circular or an open square frame with no cross members. The top lift frame 312 has at least four or more shoulder supports 316 which extend radially out from the outside of the top lift frame 312. The shoulder supports 316 rest upon the top of the support frame 311 when the collapsible lift basket system 324 is lowered into the support frame 311. The lift basket top lift frame 312 is attached to the bottom frame 313 via flexible lift frame connector cables 314 which allows the top frame 312 to collapse down onto the bottom frame 313 when it is not positioned inside the support frame 311. In certain embodiments there are at least four or more flexible lift frame connector cables 314 to link the top lift frame 312 to the bottom lift frame 313. The bottom frame 313 is an open circular or square frame with at least two cross members 315. The bottom frame 313 and cross members 315 provide support to the flexible inner water-proof liner 321 when the flexible inner waterproof liner 321 is filled with water. The flexible inner water-proof liner 321 has an open top with flexible sidewalls sealed to a flexible water-proof bottom liner of dimensions that allows it to fit inside the support frame 311. The flexible water-proof liner 321 is attached to the top lift frame 312 using industrial connector straps 119 allowing the flexible waterproof liner 321 to hang freely below the top frame 312 in order to form a continuous, collapsible, waterproof container between the top frame 312 and bottom frame 313. The bottom of the flexible waterproof liner 321 is not attached to the bottom frame 313 but rests upon it for support when the flexible waterproof liner 321 is filled with water and fish. According to certain embodiments, the flexible waterproof liner 321 includes multiple holes 322 in the side walls to allow excess water to be drained and limit the weight of the collapsible lift basket system 324. The flexible water-proof liner 321 is provided additional structural support by an outer mesh liner 323 which may be made of fish net or similar material. The outer mesh liner 323 is attached to the top lift frame 312 by industrial connector straps 119 so that it hangs freely underneath the flexible waterproof liner 321.

The top lift frame 312 has at least four basket lift cables 317 attached to it at their bottom ends and they converge and are attached to a lift clasp 318 at their top end. The lift clasp 318 is attached to a detachable connector 319 which is connected to a lift cable 320 which may be connected to a helicopter or a crane to allow the collapsible lift basket system 324 to be lifted and moved to a different location.

Figure 35:
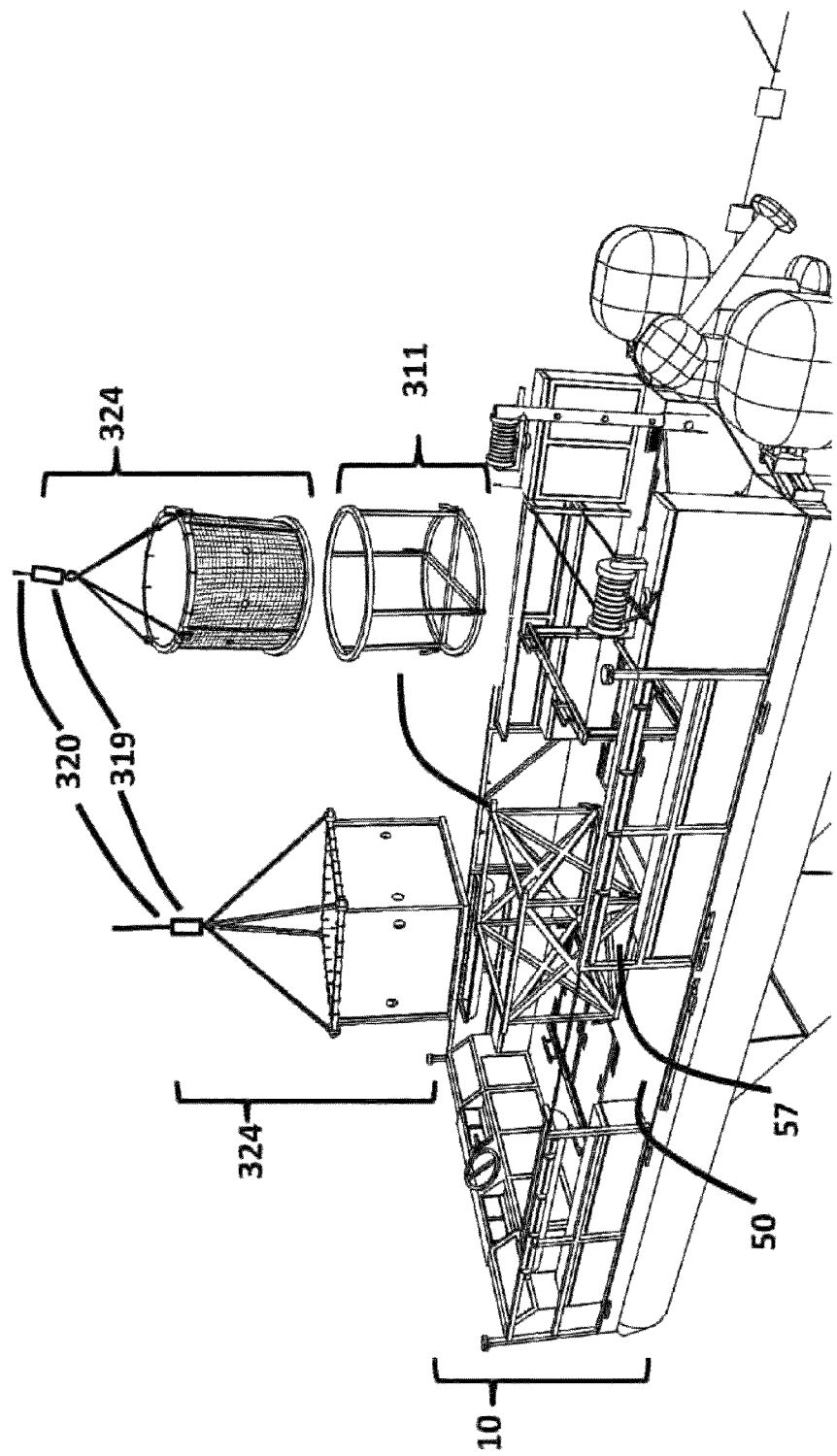
FIG. 35 is a schematic diagram of a circular and a cubical collapsible fish lift basket and basket frame in separated formats being removed from the deck of the selective fish capture system according to embodiments of the present disclosure.
Figure 36:
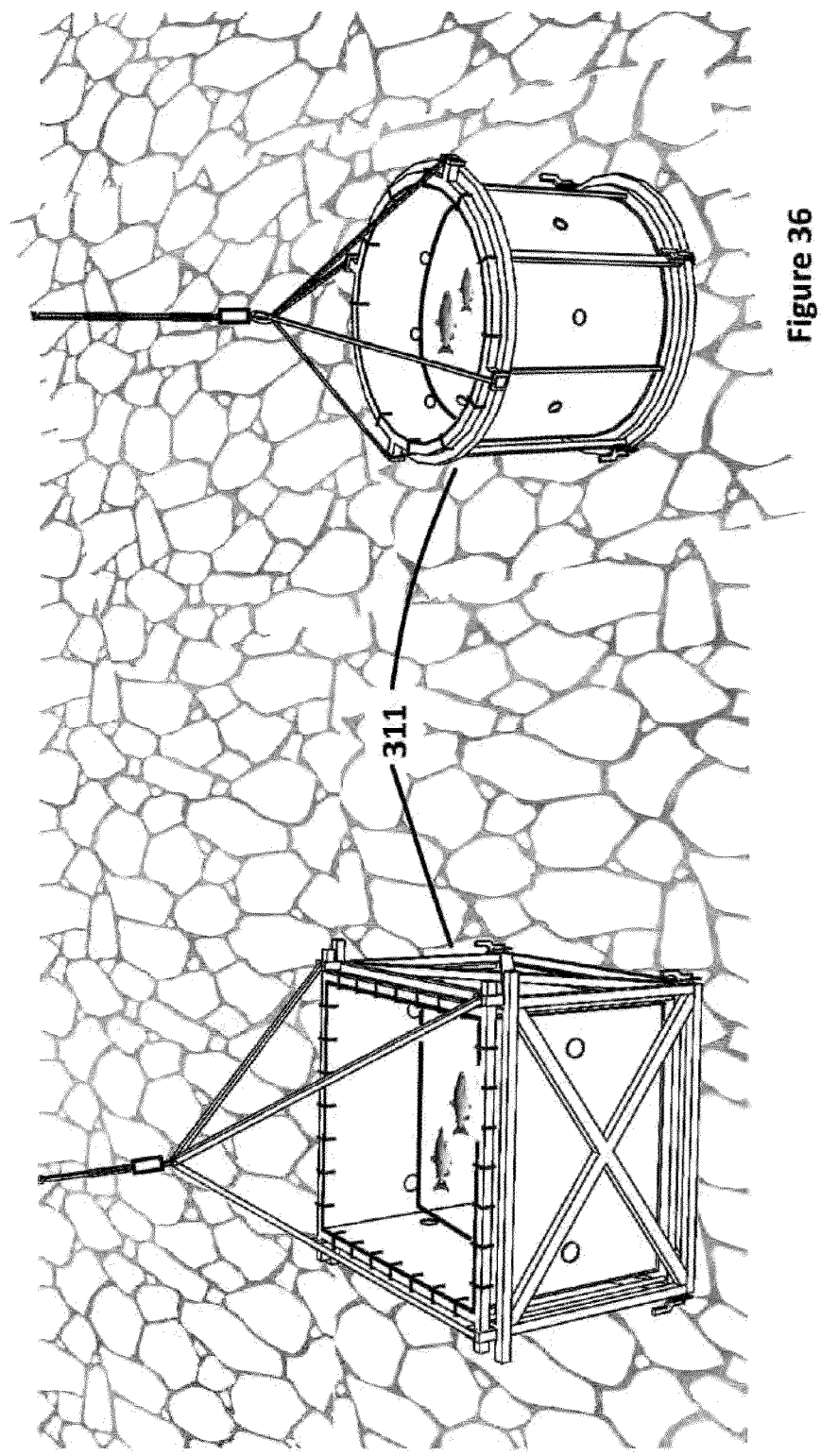
FIG. 36 is a schematic diagram of the collapsible basket in a frame, in a cubical and a circular format, in an onshore application for fish harvest and/or examination of fish according to embodiments of the disclosure.
Figure 37:
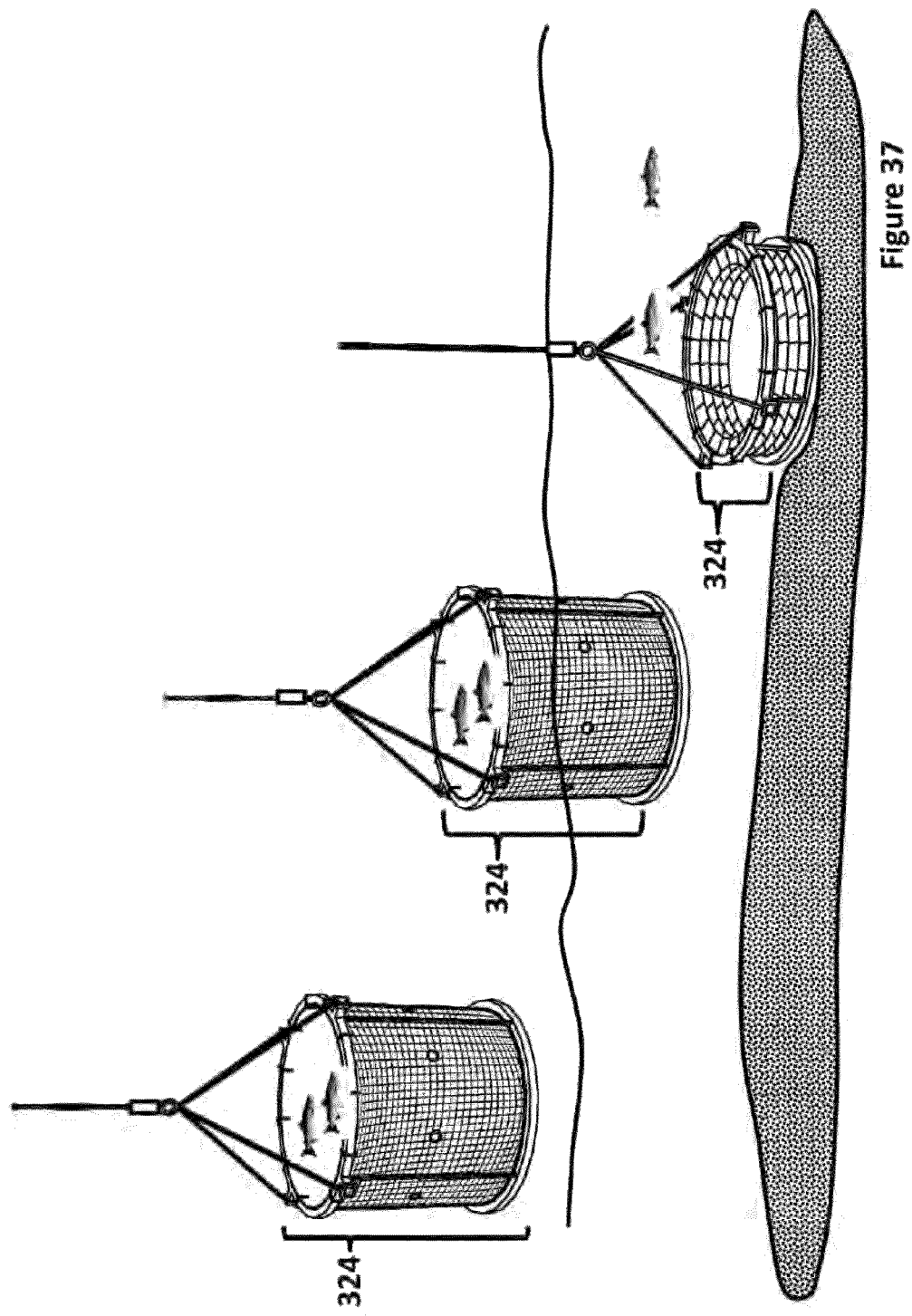
FIGS. 37 and 38 are schematic diagrams of the collapsible basket in cubical and circular format, respectively, in an in-water application for the transport and non-contact release of fish according to embodiments of the disclosure.
Figure 38:
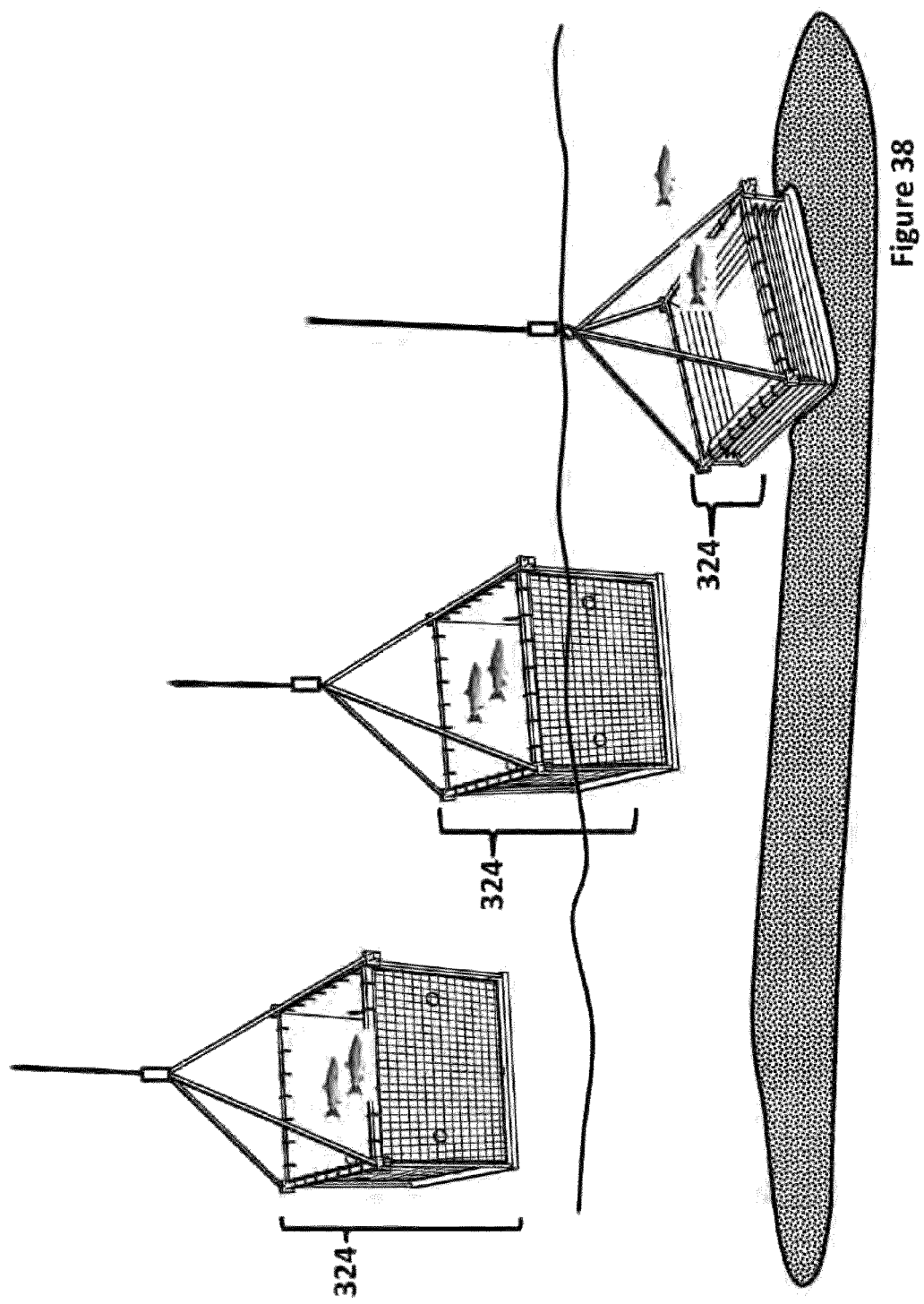

According to certain embodiments, as illustrated in FIGS. 35 and 36, the no-touch system can be used to transport fish from the pontoon platform 10 to the shore (FIG. 36), or near-shore water. For pontoon platform-to-shore transport, the lift basket system 324 is connected to a lift cable 320 mechanism to transfer the load from the support frame 311 on the main deck plate 50 of the pontoon platform 10 to a support frame 311 set up on the shore. According to other embodiments, the lift basket system 324 can be lifted from the support frame 311 on the main deck plate 50 of the pontoon platform 10 and transported to the near-shore water to rest on the water bed. When the lift cables 317 are relaxed, the side walls of the lift basket system 324 collapse to free the load of water and fish from the basket system 324 (FIGS. 37, 38).

Oil Spill Response System

Figure 41:
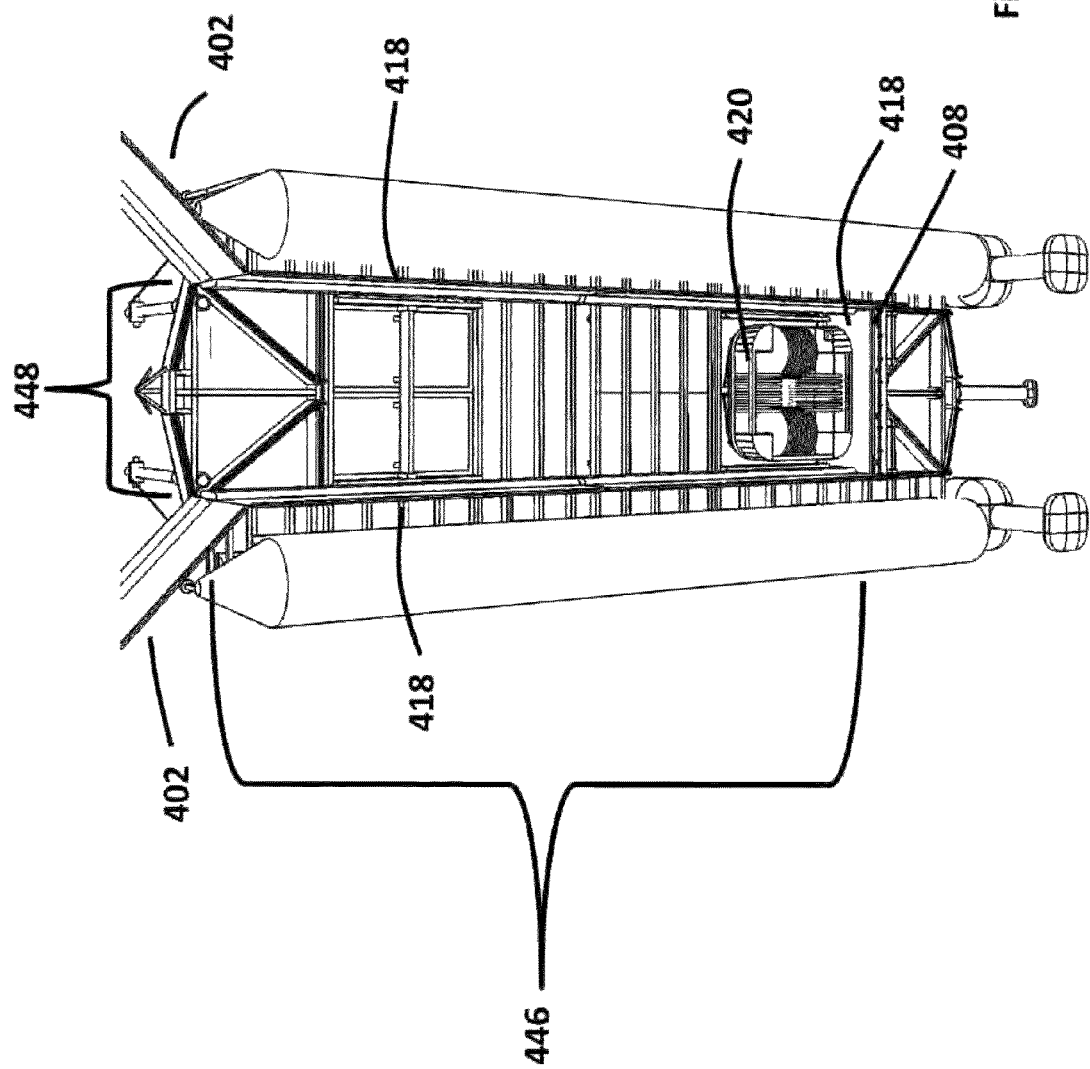
FIG. 41 is a bottom perspective view of the pontoon platform converted to an oil spill response system shown in FIG. 39.

The interconverting pontoon platform 10 can readily be converted from the selective fish capture system 140 disclosed herein to an oil spill response system 400. In such embodiments, as shown in FIGS. 39 to 45, the pontoon platform 10 is adapted to connect to a pair of oil collection booms 402 to create a V-shaped oil collection formation and collect oil into an oil containment boom located under the pontoon platform 10 and extract an oil/water emulsion via an oil skimmer system 420. The oil collection booms 402 are attached to the front connector assembly 85 at their converging point and to tow lines 280 connected to tow boats 282 at their diverging ends. The pontoon platform 10 supports an oil containment boom 418 that encircles the underside of the pontoon platform 10 and is suspended from the curtain track I beams or C Channels 44 by a pair of curtain track rail assemblies 45 and by a plurality of curtain track roller hooks 46 to form the containing walls of the oil containment enclosure 446 (FIG. 41). The pair of oil collection booms 402 are further suspended from the connector assembly 85 by a plurality of curtain track roller hooks and connected to each side of the entry end of the oil containment boom 418 to create the contiguous passage that leads to the oil skimmer 420 of the oil containment enclosure 446.

Figure 39:
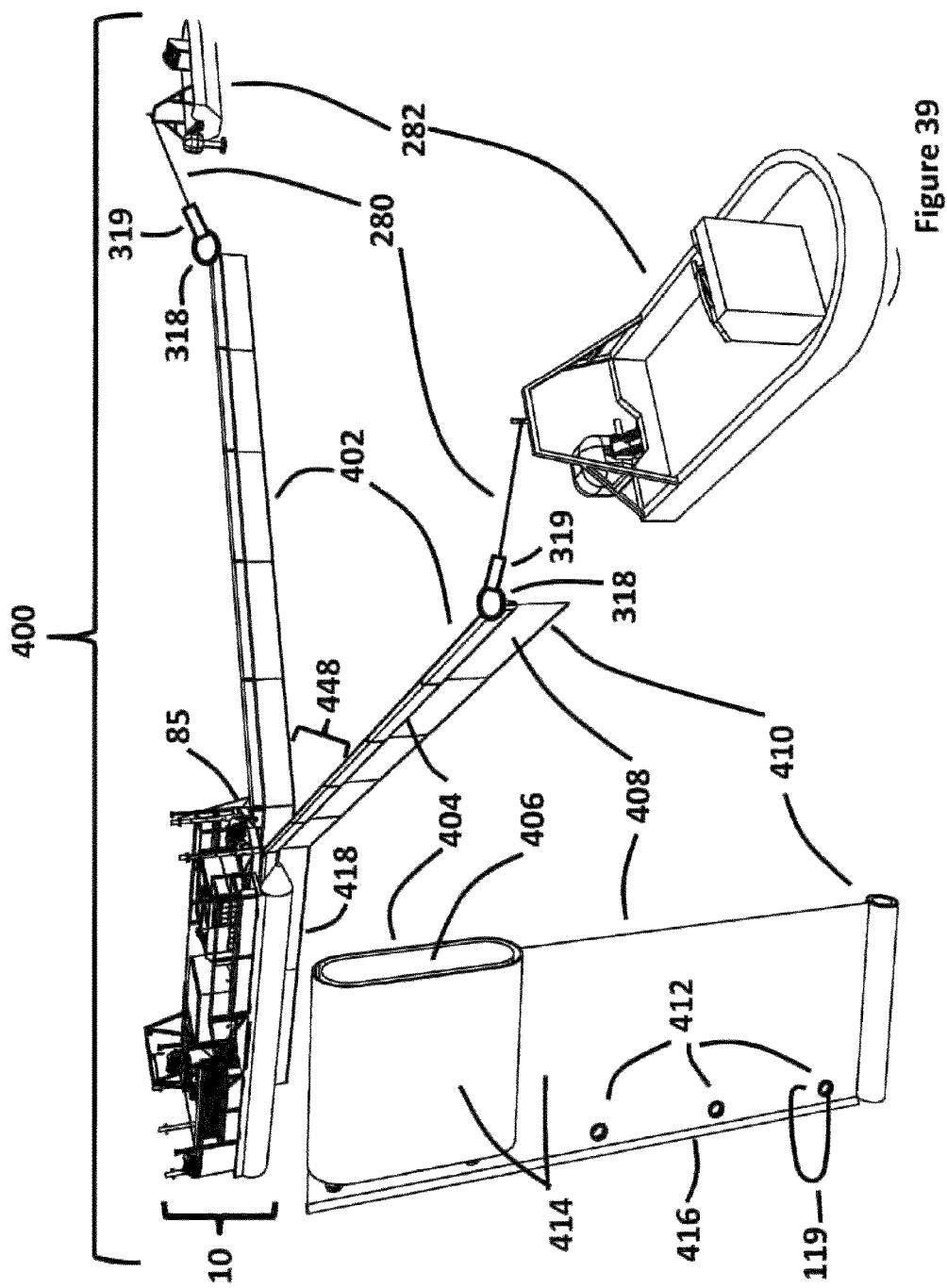
FIG. 39 is a front perspective view of a pontoon platform converted to an oil spill response and oil collection system and equipped with an oil skimmer and oil/water emulsion storage equipment and a close-up view of an oil containment boom according to an embodiment of the present disclosure.
Figure 40:
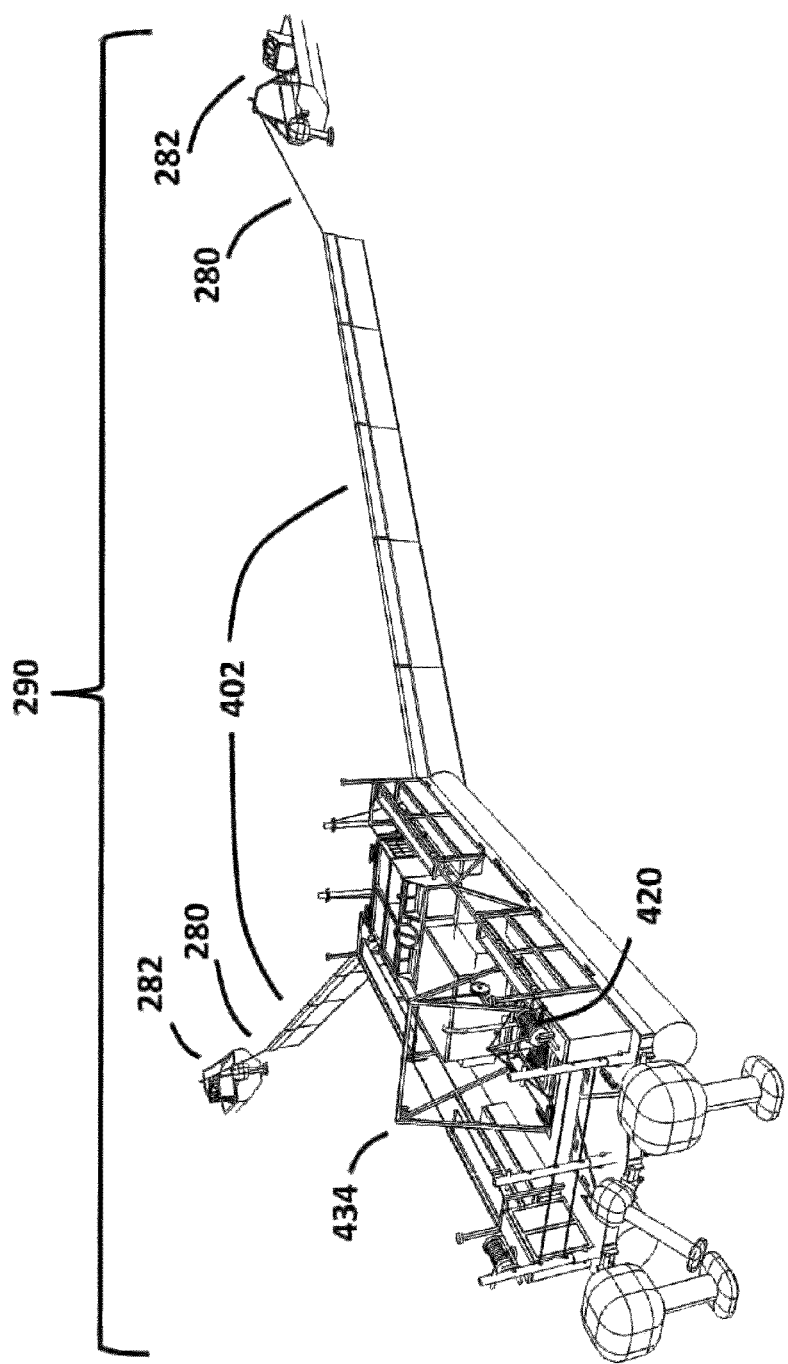
FIG. 40 is a rear perspective view of the pontoon platform converted to an oil spill response system shown in FIG. 39.

According to embodiments of the present disclosure, the oil collection booms 402 and the oil containment booms 418 are comprised of an oil-product resistant exterior 414, such as vinyl, and an inner air bladder or air-cell foam core 406 from which a boom skirt 408 extends downward (FIG. 39).

According to certain embodiments, the boom skirt 408 can further have a weighted bottom end 410 to ensure that the boom skirt 408 hangs downwards. The oil collection booms 402 and the oil containment booms 418 are constructed in flexible lengths which can be connected together by industrial connector straps 119 inserted into boom connector grommets 412 which when towed along the surface of the water by the tow boats 282 maintain the tapered V-shaped entry 448 into the oil containment enclosure 446. According to certain embodiments of the present disclosure, the retractable gate 100 at the closed end of the containment enclosure 446 may be deployed to provide additional support to the end of the oil containment boom 418 and further includes an oil-product resistant curtain 452 suspended within the frame of the retractable gate 100.

The oil collection booms 402, connected to the front connector assembly 85 at one end, will be adapted to include a suitable clasp 318 and detachable connector 319 at the terminal end of each boom 402 for connecting the boom 402 to tow lines 280 that connect the respective boom 402 to a tow boat 282. The tow boats 282 will be positioned to maintain the collection booms 402 in the widening V-shaped configuration extending from the entry of the oil containment enclosure 448. The length of the collection booms 402 will be made to suit the response situation. According to certain embodiments, the length of the oil collection booms 402 will range in length from 16' (5 m) to 66' (20 m) or greater. According to further embodiments, the depth of the oil collection booms skirt 408 will range from 0.65' to 2.0' (0.2 m to 0.6 m).

Figure 44:
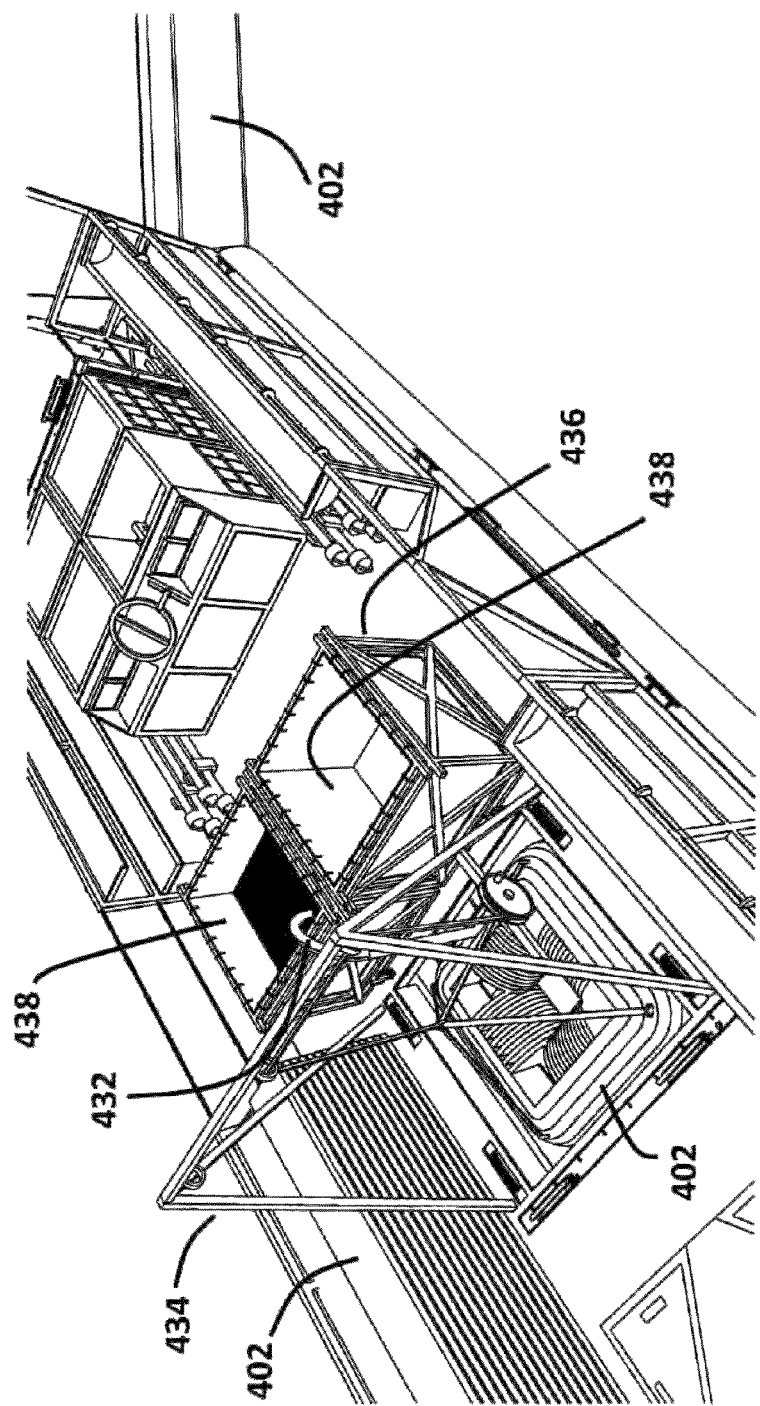
FIG. 44 is a schematic diagram of an oil skimmer lift crane, rotating disk oil skimmer, skimmer pump line, oil containment tank frame and oil containment tank for use on the pontoon platform for oil spill cleanup according to embodiments of the present disclosure.
Figure 45:
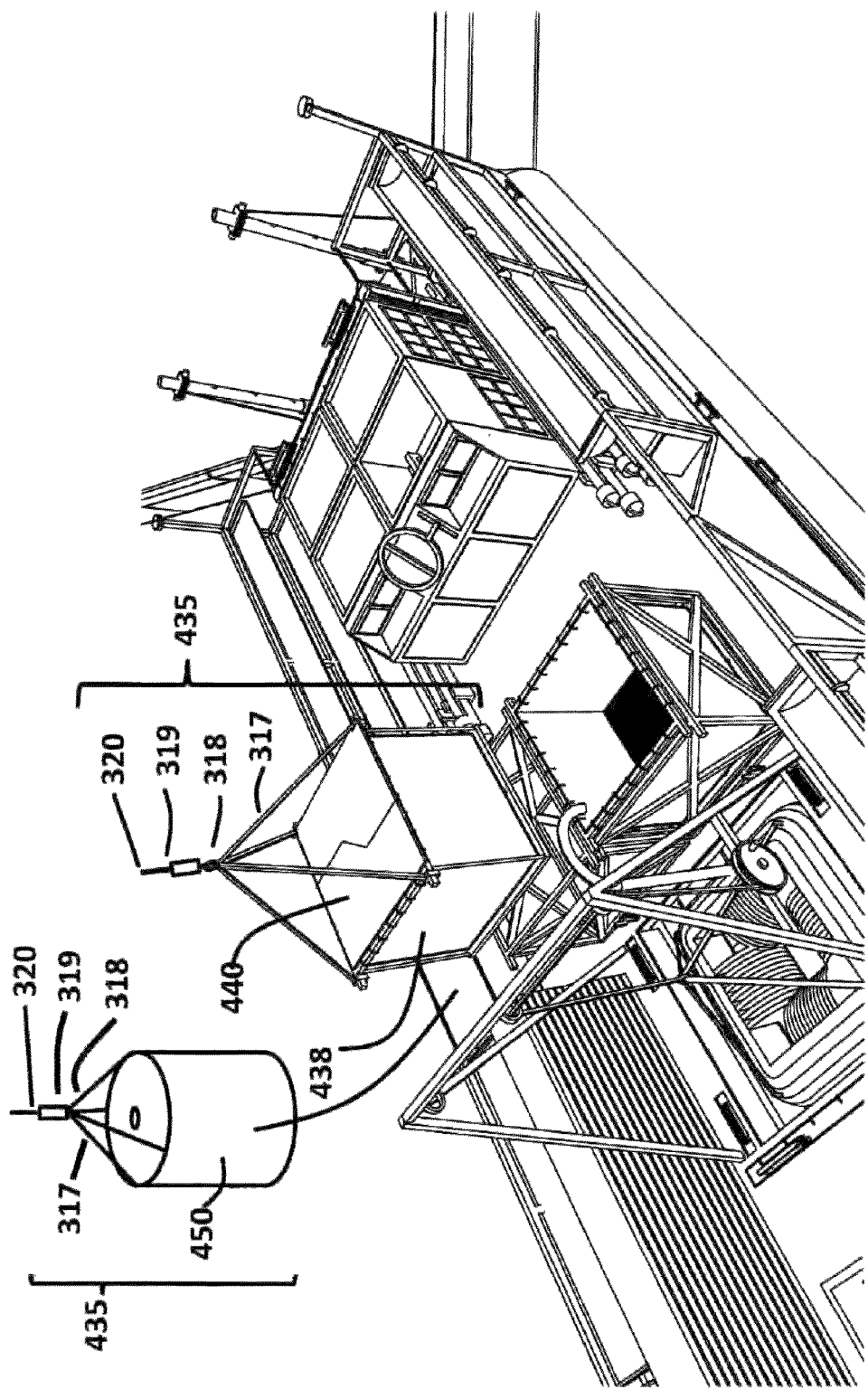
FIG. 45 is a schematic diagram of a skimmer lift crane, rotating disk oil skimmer, skimmer pump line, oil containment tank frame and oil containment tank in rectangular or barrel form lifted from the pontoon platform for oil spill cleanup according to embodiments of the present disclosure.

In further embodiments of the oil spill response system, the pontoon platform 10 will be adapted to support an oil skimmer 420 inserted in the front main deck access hatch 53H or rear main deck access hatch 54H. In most embodiments the oil skimmer 420 will be inserted in the rear main deck access hatch 54H (FIG. 44). Suitable oil skimmers 420 are commercially available and known to persons of skill in the art. As the oil spill is collected into the V-shaped entry 448 formed by the oil collection booms 402, and funneled into the oil containment enclosure 446, the oil skimmer 420 can skim the collected oil spill in the form of an oil/water emulsion from the oil containment enclosure 446 where it can be pumped through a skimmer pump line 432 into a holding tank 438 on the main deck plate 50 of the pontoon platform 10 (FIG. 44). The holding tank 438 may be of variable configurations including open tanks 438 with lids 440 or metal drums 450 suitable for containing the collected oil/water emulsion. The oil lift and transport system 435 consists of a holding tank 438 or metal drums 450 constructed to have lift cables 317 connected to a lift clasp 318 connected to a detachable connector 319 connected to a lift cable 320 to facilitate removal from the pontoon platform 10 main deck plate 50 by a crane or helicopter (FIG. 45).

Figure 46:
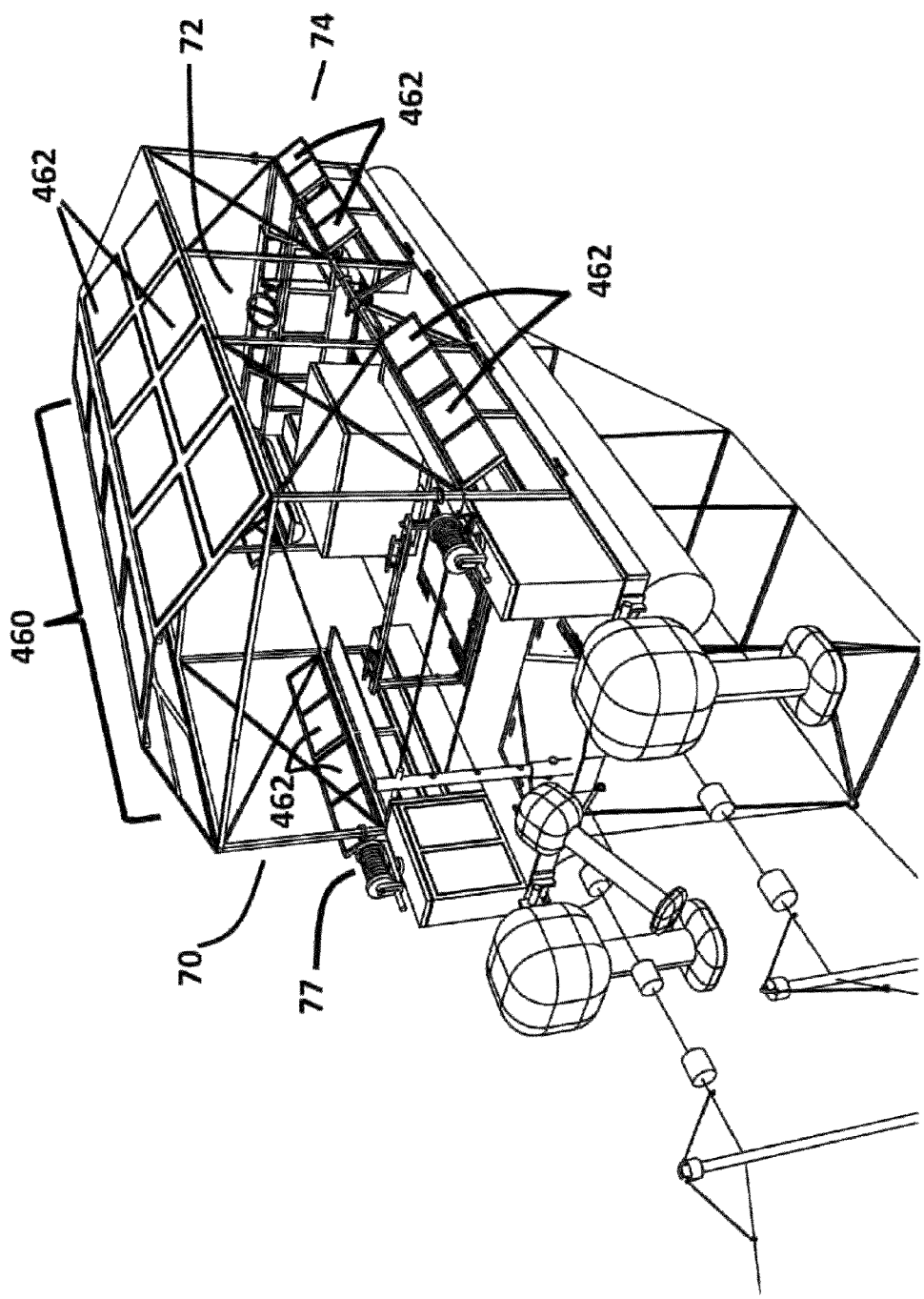
FIG. 46 is a perspective view of the canopy mounted and safety fence mounted solar electrical energy collection and electrical conversion panels according to embodiments of the present disclosure.

Persons of skill in the art will appreciate that the pontoon platform 10 can be customized to include additional features that may be desirable to the operator or for the particular operation FIG. 46. For example, according to certain embodiments, the pontoon platform 10 can be customized to include anchoring means 75 that include anchor brackets 76, anchor winches 77, metal river anchors 78, concrete anchor blocks 79, a deck canopy 70, steering and/or navigational equipment 72, safety fencing 74, navigational and/or flood lights 37, electrical power sources, heating and water systems, and examination and work benches 76. In certain embodiments, the pontoon platform 10 may also be customized to include electrical power generation via solar electric panels 462 or hydro-electric turbines 468. In certain embodiments, the shallow draft of the pontoon platform 10 and the retractable ATV access ramp 442 can allow the platform deck 50 to be converted to emergency search and rescue capability during floods or natural disasters.

Renewable Electrical Energy Generation System

The interconverting pontoon platform 10 disclosed herein can readily be converted from the selective fish capture system 140 to a combined selective fish capture and renewable electrical energy generation system 458. In such embodiments, the renewable energy generation system 458 may consist of a solar electrical generating system 460 or a hydro electrical energy generation system 464 or both. The fixed or anchored pontoon platform 10 can readily be adapted to generate electrical energy by either solar electric panels 462 or small hydro-electric turbines 468 or both (FIGS. 46 to 48).

Figure 48:
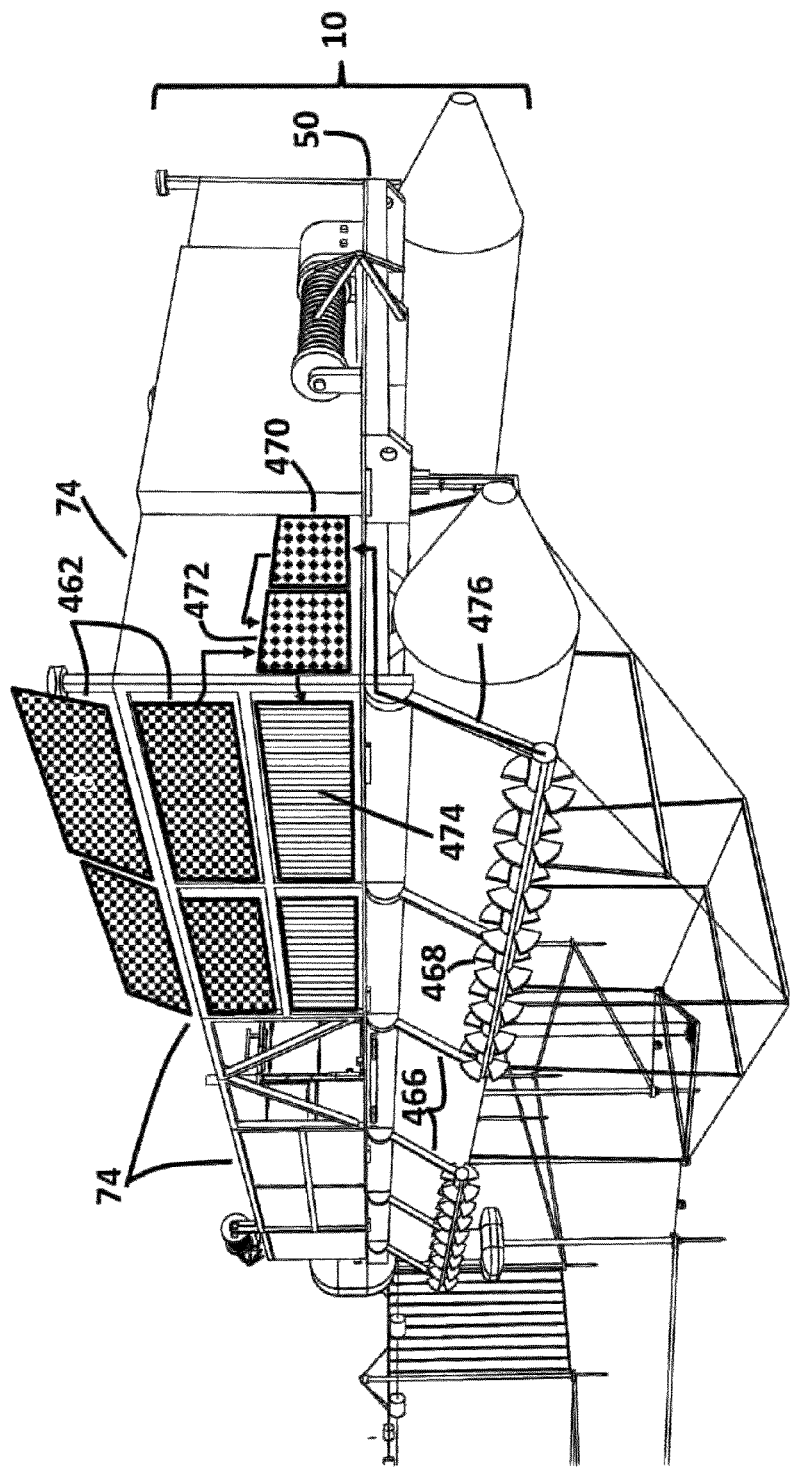
FIG. 48 is a front perspective view of the pontoon platform with side mounted articulating brackets supporting hydroelectric generating turbines in the lowered position and solar electrical energy collection panels in the stored and the deployed position in the safety fence and electrical voltage control unit and electrical conversion unit according to embodiments of the present disclosure.
Figure 49:
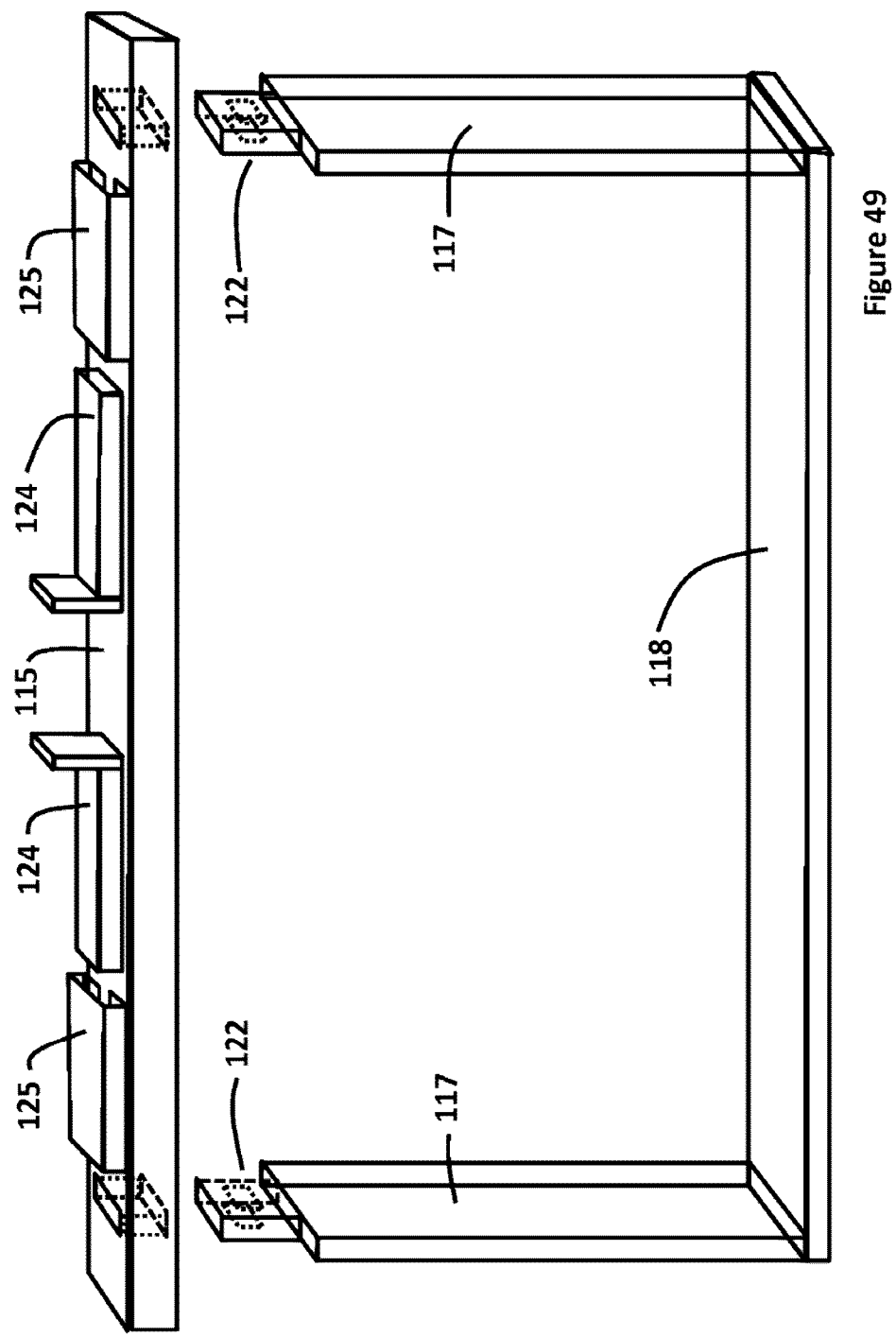
FIG. 49 is a front perspective view of the frame of the quick release gate illustrating the quick release kick plate and bracket according to embodiments of the present disclosure.

In one embodiment, the solar electric panels 462 can be stored inside the safety fences 74 mounted on the sides of the pontoon platform 10 and extracted and positioned to face maximum solar radiation (FIGS. 46, 48). The solar electric panels 462 can be mounted on the top of a canopy 70. The solar electric panels 462 are connected by electrical cables 476 to electrical Voltage converters 470 which are connected to electrical voltage controllers 472 which are in turn connected to the electrical storage batteries 474 and/or the electrical system of the platform 10 or to a shore based electrical system.

Figure 47:
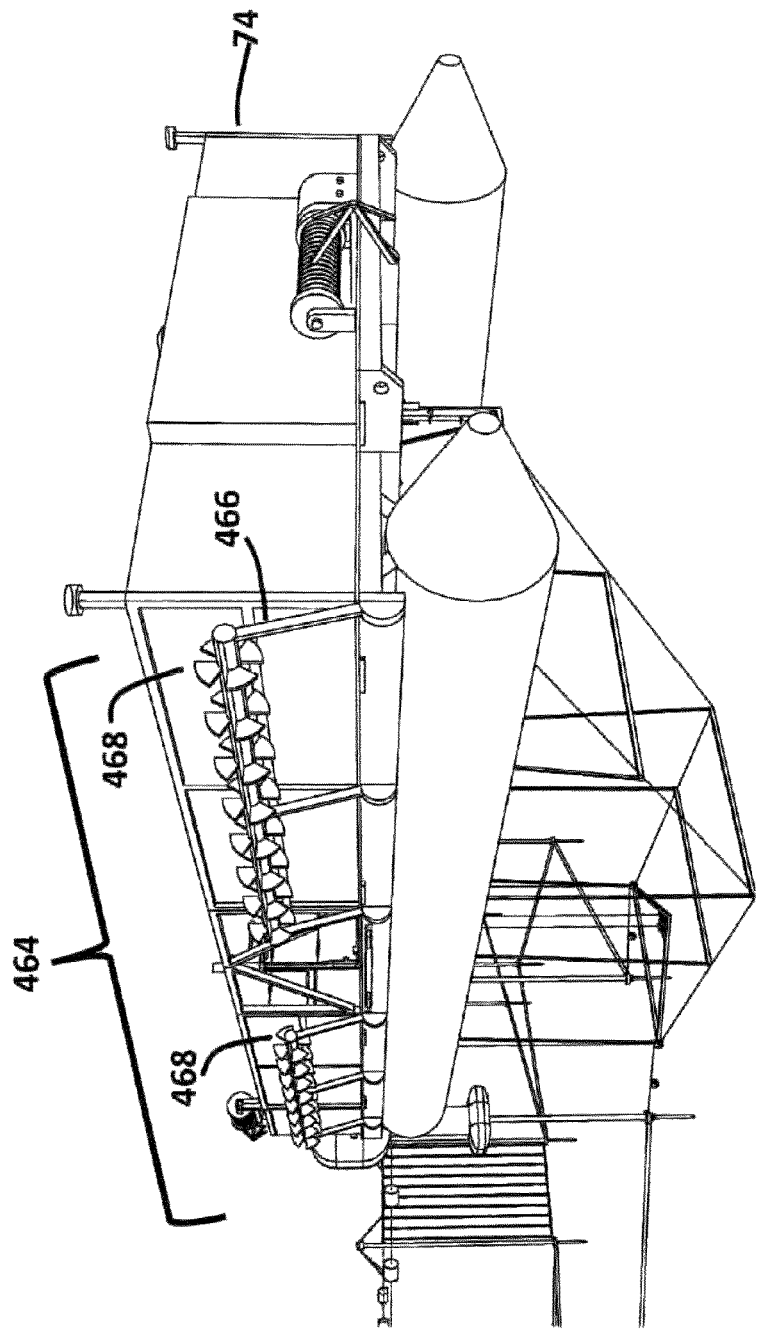
FIG. 47 is a front perspective view of the pontoon platform with side mounted articulating brackets supporting hydroelectric generating turbines in the raised position according to embodiments of the present disclosure.

In another embodiment small hydro-electric turbines 468 can be mounted on articulating brackets 466 at the sides of the deck 50 of the pontoon platform 10 (FIGS. 47 and 48). The flowing current of the water body will turn the blades on the small hydro-electric turbines 468 which produce alternating electrical current (AC). The small hydro-electric turbines 468 are connected by electrical cables 476 to electrical voltage converters 470 which are connected to electrical voltage controllers 472 which are in turn connected to the electrical storage batteries 474 and/or the electrical system of the pontoon platform 10 or to a shore based electrical system.

Equipment Storage System

Figure 55:
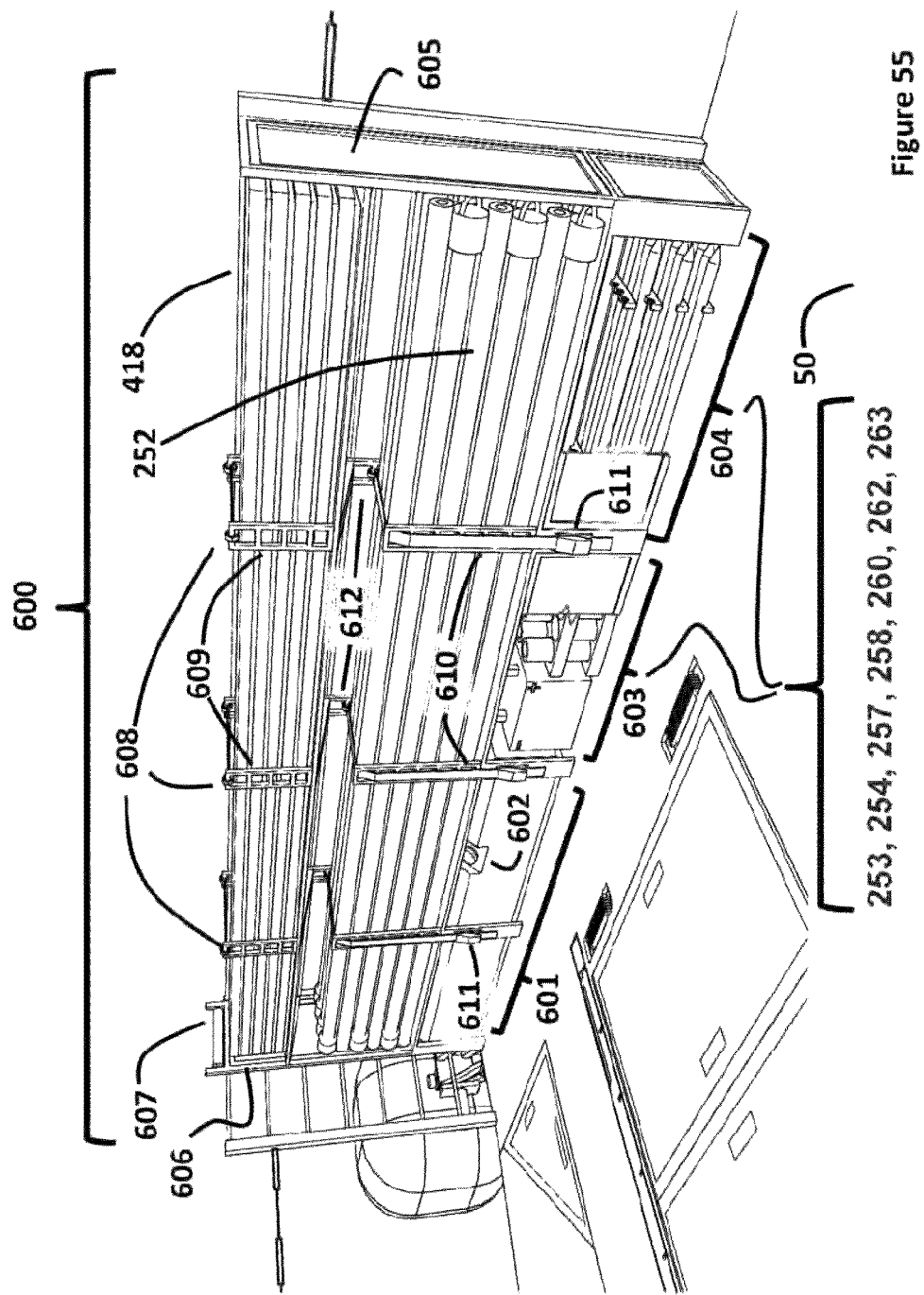
FIG. 55 is a side view of the equipment storage system including fuel storage, post anchoring system components storage, post storage and oil containment boom storage system according to embodiments of the present disclosure.

The self-contained design of the interconverting pontoon platform 10 may be adapted with equipment storage systems to house the various equipment necessary for each of the configurations of the pontoon platform 10. According to certain embodiments, as shown in FIG. 55, a plurality of equipment storage systems 600 may be located on the top along the outside edges of the main deck plate 50. The equipment storage system 600 located at the rear of the main deck plate 50 will have a plurality of compartments in the lower level including a fuel storage tank 601 with an accessible fuel storage filler spout 602. In the lower level of the equipment storage system 600, there may be a plurality of anchoring system components 253, 254, 257, 258, 260, 262, 263 storage compartments 603, 604. In the mid and upper level of the equipment storage system 600, there may be a plurality of post 252 and oil containment boom 418 storage compartments. The post 252 and the oil containment boom 418 may have continuous vertical tie down posts 608 or have lower and upper vertical tie down posts 608 separated by a tie down separation bracket 612. The equipment storage systems 600 will have a front end plate 605 and a rear end plate 606. The top of the rear end plate 606 will have an oil boom dispenser roller 607 that allows rapid deployment of the oil containment boom 418 over top and towards the rear of the platform 50. Each storage system 600 will have a plurality of tie down posts 608 that each have a plurality of rectangular tie down strap holes 609. The poles

252 and the oil containment boom 418 are retained in position by a plurality of tie down straps 610 which may be pulled across and through the tie down strap holes 609 and connected to the tie down rachets 611.

General Operation

Using the non-limiting example of a stationary selective fish capture system in a near-shore wing net 205 configuration, and referring to the schematic shown in FIG. 15, a selective fish capture system 140 is set close to shore to intercept travelling target fish and funnel the fish to the containment enclosure 48 via the tapered entry 80. According to the embodiment shown in FIG. 15, the entry of the containment enclosure 48 is set at the stern of the pontoon platform 10. In such embodiments, the retractable release gate 100 is deployed at the bow of the pontoon platform 10 to close the front end of the containment enclosure 48 and prevent escape of the captured fish.

Figure 42:
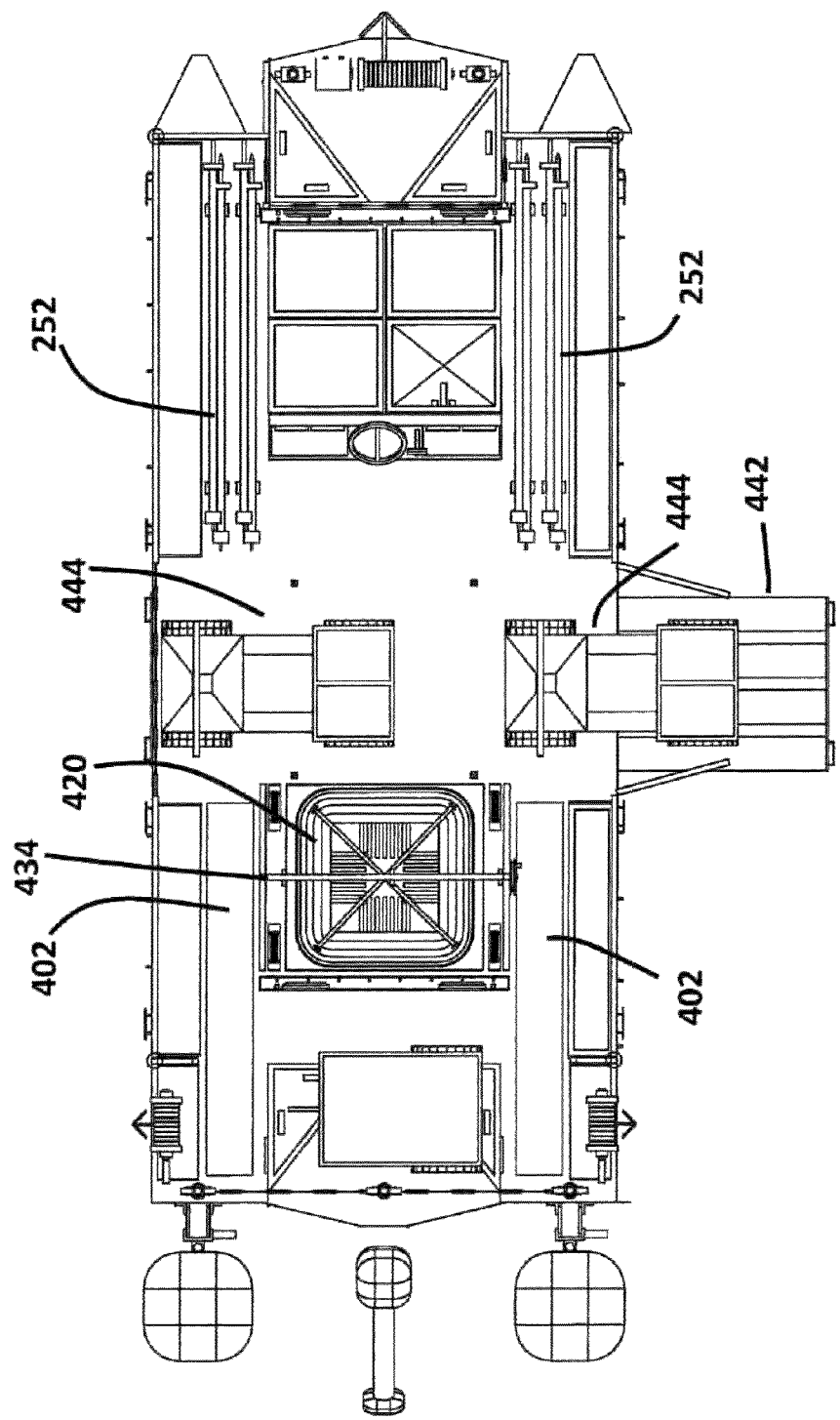
FIG. 42 is a top view schematic diagram of the pontoon platform shown in FIG. 39 converted to an oil spill response and oil collection system and equipped with a retractable loading ramp for loading All-Terrain Vehicles (ATVs) and a loaded ATV in preparation for emergency response for search and rescue or oil spill response and oil spill cleanup according to embodiments of the present disclosure.
Figure 43:
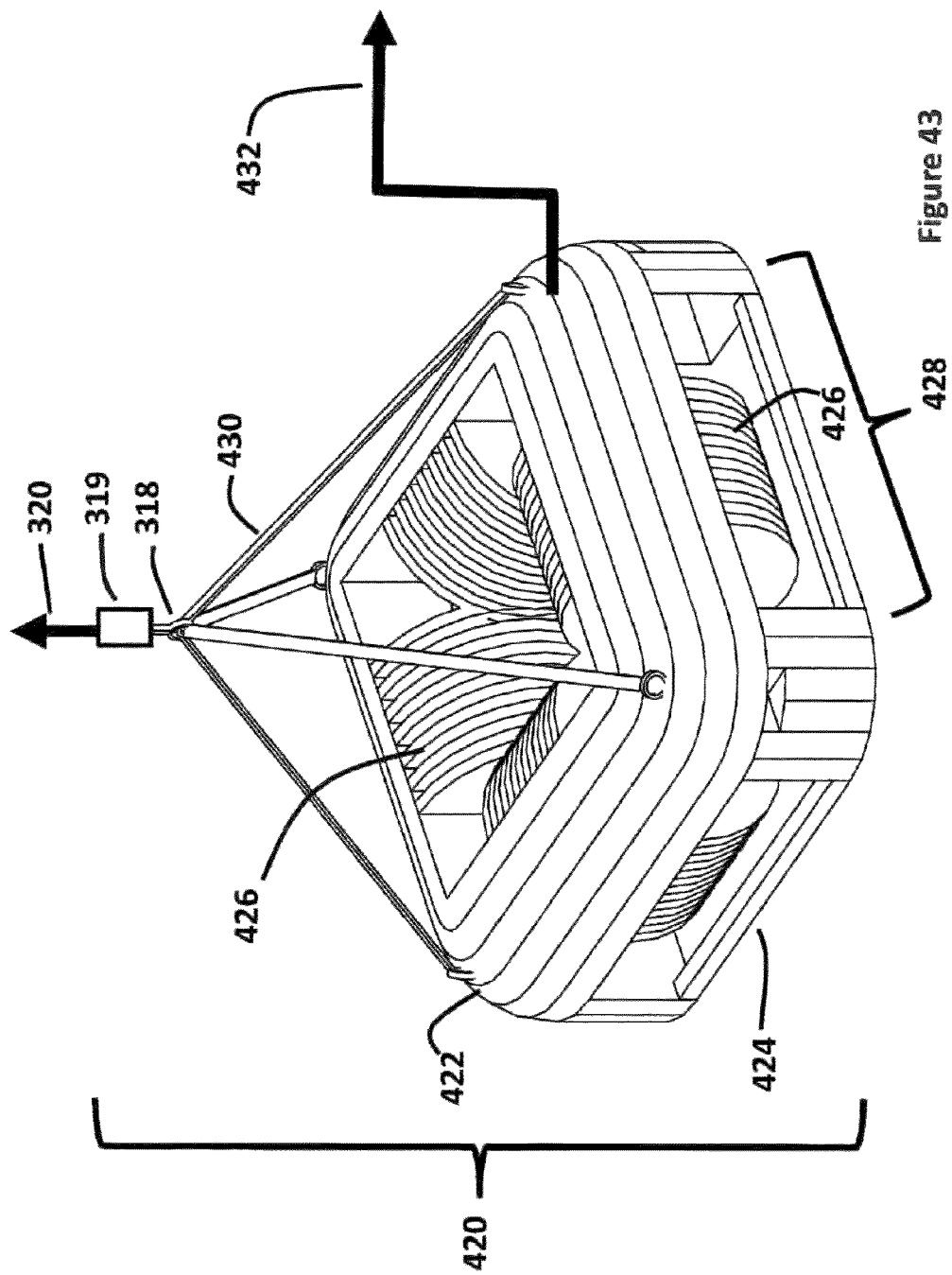
FIG. 43 is a schematic perspective view of a rotating disk oil skimmer for use on the pontoon platform for oil spill cleanup according to embodiments of the present disclosure.

Once a substantial number of fish have entered the containment enclosure 48, the lift-lines 172 at the stern triangular spreader bar 180 can then be raised to lift the attached containment net 160 to close off the rear of the containment enclosure 48. Sequential raising of the remaining linear spreader bars 168 raises the containment net 160 and reduces the internal volume from the rear towards the release gate at the exit end to crowd the fish towards the front of the containment enclosure 48 at the bow of the pontoon platform 10. In this way, selective removal of the fish through the access hatch 53H at the bow of the pontoon platform 10, using a dip net for example, is facilitated. The selected fish can be removed to a no touch fish lift system 308 erected on the main deck plate 50 of the pontoon platform 10 to be transported to a desired location. Alternatively, the pontoon platform 10 can be equipped with research equipment to perform studies and/or sampling of the captured fish on site on the pontoon platform 10. As illustrated by the schematic of FIGS. 35 and 42, the pontoon platform 10 can be adapted to carry equipment for its various applications.

Once the selected fish are removed from the containment enclosure 48, the remaining fish in the containment enclosure 48 can be released without human contact by pulling up the release gate net pull chords 114 and raising the release gate net 110 within the frame of the retractable gate 100. Once the containment enclosure has been emptied by releasing the fish, the release gate net pull chords 114 are released and the release gate net 110 drops into the release gate anchor bar brackets 113 at the bottom of the retractable gate 100. The net lift lines 172 connected to the linear spreader bars 168 and the triangular spreader bar 180 are released to lower the linear spreader bars 168 and the triangular spreader bar 180 which re-establishes the volume of the containment net 160 and re-connects the containment net 160 to the wing nets 205.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the disclosure has been described with reference to certain specific embodiments, various modifications thereof will be apparent to those skilled in the art without departing from the spirit and scope of the disclosure. All such modifications as would be apparent to one skilled in the art are intended to be included within the scope of the following claims.

The various implementations described above can be combined to provide further implementations. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the implementations can be modified, if necessary to employ concepts of the various patents, applications and publications to provide yet further embodiments.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The embodiments of the invention in which an exclusive property or privilege is claimed are defined as follows:

1. An interconverting pontoon platform adapted to convert between a selective fish capture system and an oil spill response system comprising:

a pair of opposing pontoon floats arranged in parallel and having an upper surface and a lower surface, the upper surface of each float configured to support a mounting riser extending the length of each float;

a support frame having an upper surface and a lower surface, the support frame comprising a series of parallel beams arranged transverse to the pair of opposing floats and mounted on the mounting risers, wherein the series of beams maintain the distance between each float to the other;

a rail assembly attached to the lower surface of the support frame, the rail assembly comprising a pair of curtain track I beams or C Channels that support a pair of curtain track rail assemblies that contain a plurality of curtain track roller hooks, the curtain track I beams or C Channels arranged in parallel to each other and extending the length of the interior facing side of each float to define a containment enclosure therebetween;

a deck mounted on the upper surface of the support frame, the deck sized to provide a working surface and comprising at least one access hatch centrally located on the deck to provide access to the containment enclosure below the deck, the access hatch having an end-facing side;

a retractable and removable release gate containing a raisable release gate net and emergency release mechanism positioned at the end-facing side of the access hatch, wherein the retractable and removable release gate extends below deck to close off one end of the containment enclosure when in the deployed position and the raisable release gate net is retracted to a raised position to open the containment enclosure to allow release of its contents;

at least one connector assembly attached to the underside of the deck, the connector assembly comprising a pair of inner curtain track beams and a pair of outer curtain track beams that each supports a curtain track rail assembly that contains a plurality of curtain track roller hooks, the inner curtain track beams are configured to have an apex that points towards the containment enclosure, the outer curtain track beams are configured to have an apex that points away from the containment enclosure;

a series of net lift-line access hatches equally distributed along each opposing side of the platform, wherein the net lift-line access hatch comprises a corresponding cleat on or below the working surface of the deck; and at least one mounting bracket at one or both ends of the deck to receive a corresponding outboard motor.

2. The pontoon platform according to claim 1, wherein the pontoon platform comprises two access hatches centrally located on the deck and a retractable gate positioned at the end-facing side of each access hatch.

3. The pontoon platform according to claim 1, wherein the pontoon platform comprises a triangular connector assembly attached to each end of the deck.

4. The pontoon platform according to claim 1, wherein the pontoon platform comprises a tow post centrally located at one or both ends of the deck.

5. The pontoon platform according to claim 1, wherein the pontoon platform is converted to a selective fish capture system, further comprising:

a containment net suspended from the rail assembly to hang vertically below the deck to form opposing side walls and a bottom floor for the containment enclosure, the containment net extending the length of the platform from an entry end to an exit end wherein the interior volume of the containment enclosure gradually decreases at the exit end, and wherein the containment net is suspended at the entry end by the connector assembly on the underside of the deck to form a pair of entry panels that form a tapered V-shaped entry into the containment enclosure; and a guidance net comprising a pair of wing nets, wherein each wing net is attached at a fixed end to the connector assembly to form a passage leading to the entry of the containment enclosure, and wherein each wing net has a terminal end that extends outwards from the entry of the containment enclosure to form a progressively widening configuration.

6. The pontoon platform according to claim 5, wherein the containment net comprises:

a retraction line attached to the top of the containment net for removable attachment of the containment net to the curtain track beam roller hooks on the rail assembly and the connector assembly;

a plurality of spreader bars attached to the bottom of the containment net arranged in a parallel series to maintain the configuration of the bottom floor of the containment enclosure, wherein each spreader bar spans the width of the bottom floor of the containment enclosure defined by the I beam or C channel rail assembly;

a pair of net lift-lines attached to opposing ends of each spreader bar and extending up to the working surface of the deck through the respective net lift-line access hatch; and a triangular spreader bar having dimensions that correspond to the connector assembly, the triangular spreader bar attached at the bottom of the containment net to the bottom ends of the entry panels to maintain the tapered V-shaped entry into the containment enclosure defined by the connector assembly.

7. The pontoon platform according to claim 6, wherein the containment net further comprises a passive integrated transponder attached to a triangular plate located at the apex of the triangular spreader bar at the bottom of the containment net or a circular passive integrated transponder antennae attached on the inside circumference of the triangular spreader bar at the bottom of the containment net.

8. The pontoon platform according to claim 5, wherein each wing net comprises:

a plurality of floats attached along the length of the top of the wing net;

a triangular bottom net attached at the converging end of the wing net;

a weighted line attached along the length of the bottom of the wing net;

a support float at the top of the terminal end of each wing net; and a tow pole vertically attached to each terminal end of the wing net to which a tow line is attached at the upper end and the lower end of the tow pole to allow each wing net to be connected to a respective tow boat for setting and maintaining the progressively widening configuration of the guidance net.

9. The pontoon platform according to claim 5, wherein each wing net comprises:

a plurality of floats attached along the length of the top of the wing net;

a triangular bottom net attached at the converging end of the wing net;

a weighted line attached along the length of the bottom of the wing net;

a support float at the top of the terminal end of each wing net; and an anchor at the bottom of the terminal end of each wing net for setting and maintaining the progressively widening configuration of the guidance net.

10. The pontoon platform according to claim 5, wherein each wing net comprises:

a plurality of floats attached along the length of the top of the wing net;

a weighted line attached along the length of the bottom of the wing net; and a plurality of additional weights which may be attached to increase the weight of the weighted line, and a protection gate at the connection between the wing net and the containment net, and a plurality of posts vertically attached along the length of each wing net for temporarily fixing the wing net in place at a site and for setting and maintaining the progressively widening configuration of the guidance net.

11. The pontoon platform according to claim 1, wherein the pontoon platform is converted to an oil spill response system, further comprising:

a pair of oil containment booms suspended from the rail assembly to hang vertically below the deck to form opposing side walls for the containment enclosure, the containment booms extending the length of the platform from an entry end to a rear end, across the rear end and back to the entry end, wherein the rear end of the containment enclosure may be supported by the deployed retractable gate;

a pair of oil collection booms, wherein each oil collection boom is attached at a fixed end to the connector assembly to form a widening V-formation that leads to the entry of the containment enclosure, and wherein each oil collection boom has a terminal end that extends outwards from the entry of the containment enclosure to form a progressively widening configuration; and a tow line attached at the terminal end of each oil collection boom adapted for connection to a respective tow boat for setting and maintaining the progressively widening configuration.

12. The pontoon platform according to claim 11, further comprising:
- an oil skimmer positioned in the access hatch to remove oil/water emulsion collected in the containment enclosure;
- an oil holding tank on the deck, the oil holding tank in fluid connection with the oil skimmer to collect the oil/water emulsion removed by the oil skimmer which is removable by crane and/or helicopter; and
- a retractable ATV access ramp allowing the platform to be converted to an emergency search and rescue platform and facilitate oil spill response and support.

13. The pontoon platform according to claim 1, further comprising a containment net stabilization system, wherein the containment net stabilization system comprises a front connector extension bar connected to the connector assembly at the front end of the deck for attachment of net stabilization posts for connecting a beach seine net or purse seine net.

14. The pontoon platform according to claim 1, further comprising one or more equipment storage systems, wherein said storage systems are adapted to hold equipment and allow the distribution of weight for a lower center of gravity.

15. The pontoon platform according to claim 10, wherein each post of the plurality of posts comprises:
- a post with a connecting thread at its top end and at its bottom end;
- a removable suspension cap with a loop on top and an internal thread on the bottom which connects to the connecting thread at the top end of the post to which a cable can be attached to the loop for the raising and lowering of the post and for connecting a snubber cable with detachable connectors to connect the loop to the wing net;
- a detachable lift cable with a detachable connector which connects to the loop on the removable suspension cap;
- a removable slide hammer having connection clip on its outer circumference and a concentric longitudinal bore through which the post is received, the removable slide hammer being slidable along the length of the post;
- a detachable lift cable attached to the removable slide hammer connection clip to permit lifting of the removable slide hammer along at least a portion of the length of the post so that the lift cable can be released so that the slide hammer free falls and imparts a percussive force onto a percussion plate for the purpose of inserting the post in the substrate of the water bottom, or, so that the lift cable can be rapidly raised so that the slide hammer strikes the suspension cap and imparts a percussive force into the suspension cap which aides in extraction of the post from the substrate of the water bottom;
- a percussion plate with an affixed concentric threaded coupling flush mounted at its top and at its center to receive the threaded bottom end of the post and; to receive an anchor tip adapted with an upper threaded end to connect to the bottom of the threaded coupling and; to receive percussive driving force from the free fall impact of the removable slide hammer;
- an anchor tip adapted with an upper threaded end to connect to the bottom end of the concentrically mounted coupling in the percussion plate and with a pointed tip at its bottom end, wherein the anchor tip can be driven into the substrate under the water body to a depth that does not exceed the percussion plate;
- a threaded post bottom cap which can connect to the bottom of any post to provide protection from the post passing through the containment net or from damaging the bottom of the post by impact on the bottom of the water body; and
- a seine net engagement pin which can engage either a beach seine net or a purse seine net to prevent the net from bypassing the platform when the nets are being contracted.

16. The pontoon platform according to claim 1 wherein the pontoon platform is adapted to include;
(i) a solar electrical generating system further comprising;
- a plurality of solar energy to electrical energy conversion panels mounted on extractable frames stored within safety fencing that can be extracted and positioned for maximum collection of available solar energy and conversion to direct current (DC) electrical energy; and
- a plurality of solar energy to electrical energy conversion panels mounted on the exterior of a deck canopy and positioned for maximum collection of available solar energy and conversion to direct current (DC) electrical energy; or (ii) a hydro-electrical generating system further comprising a plurality of hydro-electric turbines mounted on articulating brackets to allow efficient storage of the hydro-electric turbines or positioning of the hydro-electric turbines into the current flow of a water body for maximum collection of hydro-energy and conversion to Alternating Current (AC) electrical energy.

17. The pontoon platform according to claim 16 wherein an electrical energy conversion system converts alternating current (AC) to Direct Current (DC) and stores the electrical energy in electrical storage batteries.

18. The pontoon platform according to claim 16 wherein an electrical energy conversion system converts Direct Current (DC) to Alternating Current (AC) and transmits that AC electrical energy to a shore based electrical system.

* * * * *

UNITED STATES PATENT AND TRADEMARK OFFICE
CERTIFICATE OF CORRECTION

| | | |
|---|---|---|
| PATENT NO. | : 12,351,281 B2 | Page 1 of 1 |
| APPLICATION NO. | : 17/921944 | |
| DATED | : July 8, 2025 | |
| INVENTOR(S) | : Peter Karlheinz Krahn | |

It is certified that error appears in the above-identified patent and that said Letters Patent is hereby corrected as shown below:

In the Claims

<u>Column 38, Claim 10, Line 35:</u>
"wing net; and" should read: --wing net;--.

Signed and Sealed this
Second Day of December, 2025

John A. Squires
*Director of the United States Patent and Trademark Office*